(12) United States Patent
Bellman et al.

(10) Patent No.: US 9,079,802 B2
(45) Date of Patent: *Jul. 14, 2015

(54) LOW-COLOR SCRATCH-RESISTANT ARTICLES WITH A MULTILAYER OPTICAL FILM

(71) Applicant: CORNING INCORPORATED, Corning, NY (US)

(72) Inventors: Robert Alan Bellman, Painted Post, NY (US); Shandon Dee Hart, Corning, NY (US); Karl William Koch, III, Elmira, NY (US); Charles Andrew Paulson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,656

(22) Filed: Jul. 15, 2014

(65) Prior Publication Data

US 2014/0335332 A1 Nov. 13, 2014

Related U.S. Application Data

(63) Continuation of application No. 14/262,066, filed on Apr. 25, 2014.

(60) Provisional application No. 61/954,697, filed on Mar. 18, 2014, provisional application No. 61/877,568, filed on Sep. 13, 2013, provisional application No. 61/820,407, filed on May 7, 2013.

(51) Int. Cl.
*C04B 35/597* (2006.01)
*G02B 1/10* (2015.01)
(Continued)

(52) U.S. Cl.
CPC ............... *C04B 35/597* (2013.01); *C04B 35/58* (2013.01); *G02B 1/105* (2013.01); *G02B 1/113* (2013.01);
(Continued)

(58) Field of Classification Search
CPC .................................................. C03C 2217/734
See application file for complete search history.

(56) References Cited

U.S. PATENT DOCUMENTS

| 3,934,961 A | 1/1976 | Itoh et al. |
| 3,989,350 A | 11/1976 | Cohen et al. |

(Continued)

FOREIGN PATENT DOCUMENTS

| AU | 766773 B2 | 5/2001 | ............. C03C 17/34 |
| AU | 2002341016 A1 | 5/2003 | ............... B32B 7/02 |

(Continued)

OTHER PUBLICATIONS

Moghal et al, Nanomechanical study of thin film nanocomposite and PVD thin films on polymer substrates for optical applications, J. Phys. D: Appl. Phys., vol. 46, 2013.*

(Continued)

*Primary Examiner* — Aaron Austin
*Assistant Examiner* — Zheren J Yang
(74) *Attorney, Agent, or Firm* — Payal A. Patel

(57) ABSTRACT

Embodiments of this disclosure pertain to articles exhibiting scratch-resistance and improved optical properties. In some examples, the article exhibits a color shift of about 2 or less, when viewed at an incident illumination angle from about 0 degrees to about 60 degrees from normal under an illuminant, and hardness of at least 14 GPa at an indentation depth of at least 100 nm from the surface of the article. In one or more embodiments, the articles include a substrate, and an optical film disposed on the substrate. The optical film includes a scratch-resistant layer and an optical interference layer. The optical interference layer may include one or more sub-layers that exhibit different refractive indices. In one example, the optical interference layer includes a first low refractive index sub-layer and a second a second high refractive index sub-layer. In some instances, the optical interference layer may include a third sub-layer.

27 Claims, 32 Drawing Sheets

(51) Int. Cl.
*C04B 35/58* (2006.01)
*G02B 1/113* (2015.01)
*G02B 1/115* (2015.01)
*G02B 1/11* (2015.01)

(52) U.S. Cl.
CPC ....... *C03C 2217/734* (2013.01); *C03C 2217/78* (2013.01); *G02B 1/11* (2013.01); *G02B 1/115* (2013.01); *Y10T 428/24942* (2015.01); *Y10T 428/249921* (2015.04); *Y10T 428/265* (2015.01)

(56) References Cited

U.S. PATENT DOCUMENTS

| | | |
|---|---|---|
| 4,033,667 A | 7/1977 | Fleming |
| 4,137,365 A | 1/1979 | Wydeven et al. ............. 428/412 |
| 4,298,366 A | 11/1981 | Dabby et al. |
| 4,310,595 A | 1/1982 | Beall et al. .................... 428/332 |
| 4,423,925 A | 1/1984 | Dabby et al. |
| 4,537,814 A | 8/1985 | Itoh et al. ...................... 428/217 |
| 4,571,519 A | 2/1986 | Kawabata et al. ............ 310/313 |
| 4,995,684 A | 2/1991 | Tustison et al. ............... 350/1.6 |
| 5,178,911 A | 1/1993 | Gordon et al. ................ 427/255 |
| 5,300,951 A * | 4/1994 | Yamazaki .................... 347/263 |
| 5,332,888 A | 7/1994 | Tausch .................... H05B 3/86 |
| 5,390,274 A | 2/1995 | Toyoda et al. |
| 5,393,574 A | 2/1995 | Sulzbach ...................... 427/530 |
| 5,508,092 A | 4/1996 | Kimock et al. ............... 428/216 |
| 5,567,363 A | 10/1996 | Jung et al. |
| 5,635,245 A | 6/1997 | Kimock et al. ............... 427/249 |
| 5,637,353 A | 6/1997 | Kimock et al. ............ 427/255.3 |
| 5,643,638 A | 7/1997 | Otto et al. ..................... 427/569 |
| 5,718,773 A | 2/1998 | Shiozaki ....................... 136/256 |
| 5,766,783 A | 6/1998 | Utsumi et al. ................ 428/698 |
| 5,772,862 A | 6/1998 | Ando ........................ B32B 17/10 |
| 5,773,148 A | 6/1998 | Charrue et al. ............... 428/410 |
| 5,846,650 A | 12/1998 | Ko et al. ....................... 428/336 |
| 6,074,730 A | 6/2000 | Laird et al. ................... 428/212 |
| 6,088,166 A | 7/2000 | Lee |
| 6,114,043 A | 9/2000 | Joret ............................. 428/428 |
| 6,132,650 A | 10/2000 | Nakamura |
| 6,165,598 A | 12/2000 | Nelson .......................... 428/212 |
| 6,166,125 A | 12/2000 | Sugiyama et al. |
| 6,238,781 B1 | 5/2001 | Anderson et al. |
| 6,267,915 B1 | 7/2001 | Park et al. |
| 6,337,771 B1 | 1/2002 | Chu et al. |
| 6,344,288 B1 | 2/2002 | Oyama et al. ................ 428/701 |
| 6,355,334 B1 | 3/2002 | Rondeau et al. ............. 428/212 |
| 6,395,333 B2 | 5/2002 | Veerasamy ................ 427/249.7 |
| 6,416,872 B1 | 7/2002 | Maschwitz ............. B32B 17/10 |
| 6,495,251 B1 | 12/2002 | Arbab et al. ................. 428/336 |
| 6,503,557 B1 | 1/2003 | Joret ............................. 427/167 |
| 6,524,714 B1 | 2/2003 | Neuman .................. C03C 17/34 |
| 6,570,709 B2 | 5/2003 | Katayama et al. ........... 359/586 |
| 6,572,990 B1 | 6/2003 | Oyama et al. ................ 428/698 |
| 6,605,358 B1 | 8/2003 | Stachowiak .............. C03C 17/36 |
| 6,707,610 B1 | 3/2004 | Woodard et al. ............. 359/582 |
| 6,730,352 B2 | 5/2004 | Stachowiak .............. C03C 17/36 |
| 6,746,775 B1 | 6/2004 | Boire et al. ................... 428/432 |
| 6,838,179 B1 | 1/2005 | Legrand ........................ 428/432 |
| 6,875,468 B2 | 4/2005 | Kunz et al. ............... 427/255.28 |
| 6,924,037 B1 | 8/2005 | Joret et al. .................... 428/432 |
| 6,950,236 B2 | 9/2005 | Hokazono ................. G02B 1/11 |
| 6,998,177 B2 | 2/2006 | Krzyzak et al. .............. 428/428 |
| 7,005,188 B2 | 2/2006 | Anderson et al. ............ 428/432 |
| 7,018,727 B2 | 3/2006 | Dzick ........................... 428/699 |
| 7,055,954 B2 * | 6/2006 | Marechal ................. 351/159.57 |
| 7,156,533 B2 * | 1/2007 | Hoeing .......................... 359/883 |
| 7,166,360 B2 | 1/2007 | Coustet et al. ................ 428/432 |
| 7,189,456 B2 | 3/2007 | King ............................. 428/412 |
| 7,229,684 B2 | 6/2007 | Enniss ...................... B32B 27/20 |
| 7,351,447 B2 | 4/2008 | Nishida et al. ............... 427/162 |
| 7,381,469 B2 | 6/2008 | Moelle et al. ................ 428/432 |
| 7,405,005 B2 | 7/2008 | Watanabe ..................... 428/432 |
| 7,426,328 B2 | 9/2008 | Zhou et al. .................... 385/124 |
| 7,521,123 B2 | 4/2009 | Hattori et al. |
| 7,541,102 B2 | 6/2009 | Klippe et al. ................. 428/701 |
| 7,643,719 B1 | 1/2010 | Zhou et al. .................... 385/131 |
| 7,655,298 B2 | 2/2010 | Thies et al. ................... 428/325 |
| 7,736,728 B2 | 6/2010 | Loboda et al. ............... 428/218 |
| 7,736,824 B2 | 6/2010 | Yoshikawa ................ G03F 1/00 |
| 7,910,215 B2 | 3/2011 | Reymond et al. ............ 428/428 |
| 7,926,939 B2 | 4/2011 | Kato ......................... G02C 7/10 |
| 7,978,402 B2 | 7/2011 | Sweeney .................. G02B 5/08 |
| 8,062,749 B2 | 11/2011 | Shelestak et al. ............ 428/410 |
| 8,088,502 B2 | 1/2012 | Martin et al. |
| 8,118,896 B2 | 2/2012 | Can et al. ........................ 51/295 |
| 8,187,671 B2 | 5/2012 | Sol ................................ 427/165 |
| 8,304,078 B2 | 11/2012 | Varshneya .................... 428/410 |
| 8,360,574 B2 | 1/2013 | Ishak ........................ G02C 7/02 |
| 8,383,214 B2 | 2/2013 | Schaepkens et al. ........ 428/34.7 |
| 8,409,716 B2 | 4/2013 | Schultz et al. ............... 428/428 |
| 8,425,035 B2 | 4/2013 | Von Blanckenhagen G02C 7/02 |
| 8,445,112 B2 | 5/2013 | Di Stefano ................... 428/432 |
| 8,446,673 B2 | 5/2013 | Yoshihara ..................... 359/585 |
| 8,679,631 B2 | 3/2014 | Murata ......................... 428/410 |
| 8,753,744 B2 | 6/2014 | Borrelli et al. ............... 428/410 |
| 2001/0002295 A1 | 5/2001 | Anderson et al. ............ 428/432 |
| 2001/0016262 A1 | 8/2001 | Toyoshima et al. .......... 428/428 |
| 2001/0017452 A1 | 8/2001 | Bernard ..................... B60R 3/00 |
| 2001/0031365 A1 * | 10/2001 | Anderson et al. ............ 428/432 |
| 2002/0009593 A1 | 1/2002 | Veerasamy ................... 428/408 |
| 2002/0017452 A1 | 2/2002 | Zimmermann et al. ... 204/192.1 |
| 2002/0051274 A1 | 5/2002 | Kim et al. ..................... 359/237 |
| 2002/0051294 A1 * | 5/2002 | Katayama et al. ........... 359/586 |
| 2002/0136908 A1 | 9/2002 | Komatsu et al. ............. 428/446 |
| 2003/0031879 A1 | 2/2003 | Neuman et al. .............. 428/428 |
| 2003/0035044 A1 | 2/2003 | Nakayama et al. .......... 347/203 |
| 2003/0193636 A1 | 10/2003 | Allen et al. ................... 349/117 |
| 2004/0147185 A1 | 7/2004 | Decroupet ...................... 442/59 |
| 2004/0258947 A1 | 12/2004 | Moelle et al. ................ 428/627 |
| 2005/0012569 A1 | 1/2005 | Sasaki .......................... 333/189 |
| 2005/0084705 A1 | 4/2005 | Klippe et al. ................. 428/633 |
| 2005/0123772 A1 | 6/2005 | Coustet et al. ................ 428/432 |
| 2005/0233091 A1 | 10/2005 | Kumar et al. ................. 427/569 |
| 2006/0008656 A1 | 1/2006 | Veerasamy |
| 2006/0093833 A1 | 5/2006 | Meyer et al. ................. 428/432 |
| 2006/0134436 A1 | 6/2006 | Maschwitz .................. 428/426 |
| 2006/0139783 A1 | 6/2006 | Decroupet .................... 359/883 |
| 2006/0165963 A1 | 7/2006 | Fleury et al. ................. 428/212 |
| 2006/0197096 A1 | 9/2006 | Kerdiles et al. ................ 257/79 |
| 2006/0240266 A1 | 10/2006 | Schicht et al. ............... 428/426 |
| 2007/0030569 A1 | 2/2007 | Lu et al. |
| 2007/0128528 A1 | 6/2007 | Hess et al. ........................ 430/5 |
| 2007/0237918 A1 | 10/2007 | Jonza et al. |
| 2007/0285776 A1 * | 12/2007 | Nakamura et al. ........... 359/485 |
| 2008/0032157 A1 | 2/2008 | Koekert et al. ............... 428/701 |
| 2009/0017314 A1 | 1/2009 | Nadaud et al. ............... 428/446 |
| 2009/0104385 A1 * | 4/2009 | Reymond et al. .............. 428/34 |
| 2009/0141357 A1 | 6/2009 | Kamura et al. ............... 359/585 |
| 2009/0155490 A1 | 6/2009 | Bicker et al. ................. 427/576 |
| 2009/0195865 A1 | 8/2009 | Kleideiter et al. ............ 359/360 |
| 2009/0197048 A1 | 8/2009 | Amin et al. ................... 428/142 |
| 2009/0223437 A1 | 9/2009 | Ballard ......................... 116/288 |
| 2009/0297877 A1 * | 12/2009 | Chang et al. ................. 428/627 |
| 2009/0298669 A1 | 12/2009 | Akiba et al. .................... 501/70 |
| 2009/0324844 A1 | 12/2009 | Haoto et al. .................. 427/527 |
| 2010/0009154 A1 | 1/2010 | Allan et al. ................... 428/220 |
| 2010/0047521 A1 | 2/2010 | Amin et al. ................... 428/141 |
| 2010/0062245 A1 | 3/2010 | Martin et al. ................. 428/336 |
| 2010/0196685 A1 * | 8/2010 | Murata et al. ................ 428/216 |
| 2010/0215950 A1 | 8/2010 | Schultz et al. ............... 428/336 |
| 2010/0247745 A1 | 9/2010 | Rudman et al. ................. 427/9 |
| 2010/0291353 A1 | 11/2010 | Dejneka et al. .............. 428/192 |
| 2010/0304090 A1 | 12/2010 | Henn et al. ................... 428/172 |
| 2010/0311868 A1 | 12/2010 | Bekiarian et al. ............ 523/218 |
| 2010/0313875 A1 | 12/2010 | Kennedy |
| 2011/0033681 A1 | 2/2011 | Adachi et al. ................ 428/212 |
| 2011/0114160 A1 | 5/2011 | Murashige et al. ........... 136/252 |
| 2011/0151173 A1 | 6/2011 | Ramadas .................... B32B 1/06 |
| 2011/0157703 A1 | 6/2011 | Broadway et al. |
| 2011/0177241 A1 | 7/2011 | Lee et al. |
| 2011/0235181 A1 | 9/2011 | Hayashibe et al. ........... 359/577 |
| 2011/0262754 A1 | 10/2011 | Zehentmaier ............ B32B 27/00 |
| 2012/0008217 A1 | 1/2012 | Ishak ......................... G02C 7/10 |

(56) References Cited

U.S. PATENT DOCUMENTS

| | | | |
|---|---|---|---|
| 2012/0027968 A1 | 2/2012 | Chang et al. | 428/34.1 |
| 2012/0040179 A1 | 2/2012 | Dave | 428/336 |
| 2012/0099323 A1 | 4/2012 | Thompson | F21V 11/00 |
| 2012/0135153 A1 | 5/2012 | Osakabe et al. | 427/399 |
| 2012/0196103 A1 | 8/2012 | Murashige et al. | 428/213 |
| 2012/0212826 A1 | 8/2012 | Henn et al. | 359/586 |
| 2012/0219792 A1 | 8/2012 | Yamamoto et al. | 428/336 |
| 2012/0250314 A1 | 10/2012 | Malkowski et al. | |
| 2012/0321898 A1 | 12/2012 | Meinhardt et al. | 428/410 |
| 2012/0327568 A1 | 12/2012 | Shedletsky et al. | 361/679.01 |
| 2013/0021669 A1 | 1/2013 | Xi et al. | 359/578 |
| 2013/0022798 A1* | 1/2013 | Fukawa et al. | 428/212 |
| 2013/0029118 A1 | 1/2013 | Kishi et al. | |
| 2013/0059137 A1* | 3/2013 | Hevesi et al. | 428/213 |
| 2013/0120842 A1* | 5/2013 | Moens et al. | 359/585 |
| 2013/0128342 A1* | 5/2013 | Mitarai et al. | 359/359 |
| 2013/0170044 A1 | 7/2013 | Mont et al. | 359/580 |
| 2013/0176615 A1 | 7/2013 | Uefugi et al. | 359/359 |
| 2013/0177751 A1 | 7/2013 | Oh et al. | 428/216 |
| 2013/0187185 A1 | 7/2013 | Deshazer et al. | 257/98 |
| 2013/0209762 A1 | 8/2013 | Damm et al. | 428/212 |
| 2013/0271836 A1* | 10/2013 | Fukaya et al. | 359/507 |
| 2014/0022630 A1* | 1/2014 | Reymond et al. | 359/360 |
| 2014/0087101 A1* | 3/2014 | Tixhon et al. | 428/34 |
| 2014/0090864 A1 | 4/2014 | Paulson | |
| 2014/0090974 A1 | 4/2014 | Ballet et al. | 204/192.15 |
| 2014/0113120 A1* | 4/2014 | Thiel | 428/212 |
| 2014/0139978 A1 | 5/2014 | Kwong | H05K 5/03 |
| 2014/0186615 A1 | 7/2014 | An et al. | 428/332 |
| 2014/0261615 A1 | 9/2014 | Nair et al. | 136/244 |
| 2014/0295330 A1 | 10/2014 | Pruneri et al. | 430/5 |

FOREIGN PATENT DOCUMENTS

| | | | |
|---|---|---|---|
| CA | 2141536 C | 2/1994 | B32B 17/06 |
| CN | 100360449 C | 1/2008 | C03C 17/22 |
| CN | 101349769 A | 1/2009 | G02B 1/10 |
| CN | 101356455 A | 1/2009 | G02B 5/28 |
| CN | WO2012144499 A1 | 10/2012 | B32B 9/00 |
| CN | 103073196 A | 5/2013 | C03C 17/36 |
| CN | 103395247 A | 11/2013 | B32B 17/06 |
| CN | 103508678 | 1/2014 | C03C 17/23 |
| CN | 103707578 A | 4/2014 | B32B 17/06 |
| EP | 0566271 A2 | 10/1993 | C03C 17/22 |
| EP | 592986 B1 | 8/1998 | B32B 15/04 |
| EP | 1289898 B1 | 8/2012 | C03C 17/22 |
| EP | 1490715 B1 | 2/2013 | G02B 5/08 |
| JP | 63238260 A | 10/1988 | C23C 14/06 |
| JP | 02974879 B2 | 11/1999 | C23C 16/06 |
| JP | 2000171601 A | 6/2000 | C03C 17/34 |
| JP | 2000171605 A | 6/2000 | H04N 5/65 |
| JP | 2000214302 | 8/2000 | G02B 1/11 |
| JP | 2001303246 A | 10/2001 | C03C 17/22 |
| JP | 2002174810 A | 6/2002 | G02F 1/1333 |
| JP | 2003131011 A | 5/2003 | G02F 1/1335 |
| JP | 2005274527 | 10/2005 | G04B 39/00 |
| JP | 2007099557 A | 4/2007 | C03C 21/00 |
| JP | 2007156017 A | 6/2007 | G02B 1/11 |
| JP | 2007527328 A | 9/2007 | B32B 18/00 |
| JP | 2007271958 | 10/2007 | G02B 1/11 |
| JP | 04250834 B2 | 4/2009 | C23C 14/34 |
| JP | 2009116218 A | 5/2009 | G02B 1/11 |
| JP | 2009116219 A | 5/2009 | G02B 1/11 |
| JP | 2009116220 A | 5/2009 | G02B 1/11 |
| JP | 2009265601 A | 11/2009 | G02B 6/40 |
| JP | 2010202514 A | 9/2010 | C03C 3/083 |
| JP | 2011017782 | 1/2011 | |
| JP | 2011017782 A | 1/2011 | G02B 1/11 |
| JP | 2011057547 A | 3/2011 | C03C 3/083 |
| JP | 2011093728 A | 5/2011 | C03B 23/203 |
| JP | 04707656 B2 | 6/2011 | G02B 1/11 |
| JP | 2011133800 A | 7/2011 | G09F 9/00 |
| JP | 2011134464 | 7/2011 | H01B 5/14 |
| JP | 04765069 B2 | 9/2011 | C23C 24/08 |
| JP | 04790396 B2 | 10/2011 | G02B 1/11 |
| JP | 2012171866 A | 9/2012 | C03C 17/34 |
| JP | 2013252992 A | 12/2013 | C03C 17/34 |
| KR | 2014034172 A | 3/2004 | C08L 83/10 |
| KR | 1103041 B1 | 1/2012 | G02B 1/11 |
| KR | 1194257 B1 | 10/2012 | H01L 31/04 |
| KR | 2013031689 A | 3/2013 | B32B 17/06 |
| WO | WO97/13003 A2 | 4/1997 | C23C 14/00 |
| WO | 9837254 A2 | 8/1998 | C23C 14/00 |
| WO | WO98/37254 | 8/1998 | C23C 14/00 |
| WO | 00/37384 | 6/2000 | |
| WO | 02/42843 | 6/2000 | |
| WO | 2006099765 A1 | 9/2006 | C03C 17/00 |
| WO | 2013001023 A1 | 1/2013 | C03C 17/00 |
| WO | 2013/088856 A1 | 6/2013 | G09F 9/00 |
| WO | 2013098641 A2 | 7/2013 | |
| WO | WO2013098641 A2 | 7/2013 | |
| WO | 2013/160233 | 10/2013 | G02B 1/10 |
| WO | WO2014167293 | 10/2014 | C03C 17/34 |

OTHER PUBLICATIONS

Portinha, et al, Hard ZrO2/Al2O3 nanolaminated PVD coatings evaluated by nanoindentation, Surface & Coating Technology, 2005 p. 765-768.*

Li et al, Low-temperature magnetron sputter-deposition, hardness, and electrical resistivity of amorphous and crystalline alumina thin films, J.Vac. Sci. technol. A. vol. 18, 2000 p. 2333.*

Carneiro et al, Hardness Evaluation of Nanolayered PVD Coatings Using Nanoindentation, Rev. Adv. Mater. Sci., 2004 p. 83-90.*

Jonghoon Baek, James Ma, Michael F. Becker, John W.Keto, Desiderio Kovar. "Correlations between optical properties, microstructure, and processing conditions of Aluminum nitride thin films fabricated by pulsed laser deposition." Elsevier, Thin Solid Films 515 (2007) 7096 -7104.

B. Bitterlich, K. Friederich. "Particle-reinforced SiAlONs for Cutting Tools." Materials Science Forum vol. 554 (2007) pp. 129-134.

R. Boichot, N. Coudurier, F. Mercier, S. Lay, A. Crisci, S. Coindeau, A. Claudel, E. Blanquet, M. Pons. "Epitaxial growth of AlN on c-plane sapphire by High Temperature Hydride Vapor Phase Epitaxy: Incluence of the gas phase N/Al ratio and low temperature protective layer." Elsevier, Surface & Coatings Technology 237 (2013) 118-125.

D. Chen, X.L. Ma, Y.M. Wang. "Thickness-dependent structural transformation in the AlN film." Elsevier, Acta Materialia 53 (2005) 5223-5227.

Cinzia Caliendo and Patrizia Imperatori. "Structural, optical, and acoustic characterization of high-quality AlN thick films sputtered on Al2O3 (001) at temperature for GHz-band electroacoustic devices applications." Journal of Applied Physics 96, No. 5, 2610 (2004).

K. Ait Aissa, A. Achour, J. Camus, L. Le Brizoual, P.-Y. Jouan, M.-A. Djouadi. "Comparison of the structural properties and residual stress of AlN films deposited by dc magnetron sputtering and high power impulse magnetron sputtering at different working pressures." Elsevier, Thin Solid Films, 550 (2014) 264-267.

T. Easwarakhanthan, S.S. Hussain, and P. Pigeat. "Spectroellipsometric investigation of optical, morphological, and structural properties of reactively sputtered polycrystalline AlN films." J. Vac. Sci. Technology A 28 (3), pp. 495-501, May/Jun. 2010.

J. Gazda, J. Zhao, P.Smith, and R.A. White. "Formation of ALN films on Ti/TiN Arc-Layer Interface with Al-0.5% Cu Interconects evaluated by XPS and Energy-filtered-TEM." Mat. Res. Soc. Symp. Proc. vol. 589, 365-370, 2001.

Fatemeh Hajakbari, Majid Mojtahedzadeh Larijani, Mahmood Ghoranneviss, Morteza Aslaninejad, and alireza Hojabri. "Optical Properties of Amorphous AlN Thin Films on Glass and Silicon Substrates Grown by Single Ion Beam Sputtering." Jpn. J. Appl. Phys. 49, 095802 (2010).

VN Inkin, GG Kirpilenko, AJ Kolpakov. "Properties of aluminium nitride coating obtained by vacuum arc discharge method with plasma flow separation." Elsevier, Diamond and Related Materials, 10 (2001) 1314-1316.

(56) References Cited

OTHER PUBLICATIONS

Takashi Ishiguro, Masato Nishimura and Takashi Yamazaki. "Solar Light Absorption Property of Sputtered Al-N Films with Enhanced Surface Roughness during Film Growth." Jpn. J. Appl. Phys. vol. 41 (2002) pp. 292-300.
XS Miao and YC Chan. "Optical Properties and Reactive Sputtering Conditions of AlN and AlSiN Thin Films for Magneto-Optical Applications." Journal of Electronic Materials, vol. 26, No. 1, 1997.
JA Savage. "Preparation and properties of hard crystalline materials for optical applications—a review." Journal of Crystal Growth 113 (1991) 698-715.
Krupitskaya, Auner. "Optical Characatization of Inn Films Grown by Plasma Source Molecular Beam Epitaxy." Journal of Applied Physices 84, 2861-2865, 1998.
Yamashita, Michihiro; Okuda, Kazuhid; Watanabe, Yasumitsu. "Preparation and Properties of AlON-SiAlON Composites." Jpn. Kokai Tokkyo Koho, 109, 434-439, 2001.
Bernd Schroter, Aimo Winkelmann, Wolfgang Richter. "X-ray photoelectron diffraction on SiC and AlN epitaxial films: polytype structure and polarity." Elsevier, Journal of Electron Spectroscopy and Related Phenomena. 114-116 (2001) 443-450.
Atul Vir Singh, Sudhir Chandra, AK Srivastava, BR Chakroborty, G Sehgal, MK Dalai, G Bose. "Structural and optical properties of RF magnetron sputtered aluminium nitride films without external substrate heating." Elsevier, Applied Surface Sceince 257 (2011) 9568-9573.
Tsui, et al., "Effects of Adhesion on the Measurement of Thin Film Mechanical Properties by Nanoindentation." Mat. Res. Soc. Symp. Proc. vol. 473 1997.
X Wang, A Kolitsch, and W Moller. "Roughness Improvement and Hardness Enhancement in Nanoscale Al/AlN Multilayered Thin Films." Applied Physics Letters vol. 71, No. 14, 1951-1953, Oct. 6, 1997.
Yoshihisa Watanabe, Yuji Hara, Takeshi Tokuda, Nobuaki Kitazawa, and Yoshikazu Nakamura. "Surface Oxidation of Aluminum Nitride Thin Films." Surface Modification Technologies XIII, Edited by Sudarshan, Khor, Jeandin, ASM International, Materials Park, Ohio, 1999. pp. 209-215.
Hiroshi Yamashita and Akira Yamaguchi. "Preparation and Properties of AlON-SiAlON Composites." Journal of the Ceramic Society of Japan 109, pp. 434-439, 2001.
JS Zabinski, JJ Hu, JE Bultman, NA Pierce, AA Voevodin. "Stoichiometry and characterization of aluminium oxynitride thin films grown by ion-beam assisted pulsed laser deposition." Elsevier, Thin Solid Films, 516, pp. 6215-6219, 2008.
Shyang-ho Chi, Yen-Ling Chung. "Cracking in coating-substrate composites with multi-layered and FGM coatings." Engineering Fracture Mechanics, vol. 70, 1227-1243, 2003.
B. Reinhold, H.J. Spies. "Plasma Nitriding of Aluminum Alloys." Proceedings of the 1st International Automotive Heat Treating Conference. Jul. 13-15, 1998.
Wang,Qimin;Wu, Yingna; Ji, Ailing; Ke, Peiling; Sun, Chao; Huang, Rongfang; Wen, Lishi. "Study of ALON and CRON films deposited by arc ion plating as diffusion barriers." Jinshu Xuebao (2004), 40, 1, 83-87.
Hirai, Shinji; Miwa, Tetsuya; Iwata, Tsutomu; Ozawa, Masayoshi; Katayama, Hiroshi G."Formation of Aluminum Nitride by Carbothermic Reduction of Alumina in a Flowing Nitrogen Atmosphere."Nippon Kinzoku Gakkaishi (1989, 53 (10), 1035-40.
Xi, Zhong-hong, Li, Hai-Yi. "The Preparation and Optical properties of AlN Thin Films." Diwen Wuli Xuebao (2012), 34)6), 467-470.
Urushidani, Tanio; Kasahara, Takashi. "Etalon-Type Optical Filters, Their Modules, Spectrometers, and Optical Devices." Jpn. Kokai Tokkyo Koho, 2012.
Urushidani, Tanio; Kigahara, Koji. "Optical Filters Including Optical Films Covered with Thickness-Controlled Dielectric Films, and Optical Filter Modules, Spectrometers and Optical Apparatus Containing Them." 2012.
Yamamoto, Yuji; Hashizume, Harm). "Manufacture of IR-Reflecting Bent Plate Glass." Jpn. Kokai Tokkyo Koho, 1988.
Xi, Zhong-hong; Li, Hai-yi. "The Preparation and Optical Properties of AlN Thin Films." Diwen Wuli Xuebao, 34, 467-470, 2012.
Wen, Mao et al. "The AlN layer thickness dependent coherent epitaxial growth, stress and hardness in NbN/AlN nanostructured multilayer films." Surface and Coatings Technology 235 (2013) 367-375.
Yan, Feng, Liu, Zhengtang, Liu, Wenting. "The Preparation and Properties of Y2O3/AlN Anti Reflection Films on Chemical Vapor Deposition Diamond."Elsevier, Thin Solid Films, 520, pp. 734-738, 2011.
Huang, Meidong; Zhang, Linlin; Wang, Lige; Tong, Lina; Li, Xiaona; Dong, Chuang. "Effects of Substrate Temperature on Aluminum Nitride Films by Reactive Magnetron Sputtering." Xiyou Jinshu, 35 (5), pp. 715-718, 2011.
Borges, J.; Alves, E.: Vax, F.; Marques, L. "Optical Properties of AlNxOy Thin Films Deposited by DC Magnetron Sputtering." Proceedings of SPIE, 2011.
Yang, Shi-cai; Abduleziz, Ablat; Jian, Ji-Kang; Zheng, Yu-feng; Sun, Yan-fei; Wu, Rong. "Preparation and Properties of AlN Thin Films by Pure Nitrogen Reactive Sputtering." Rengong Jingti Xuebao, 39 (1), pp. 190-196, 2010.
Yang, Shi-cai; Abduleziz, Ablat; Jian, Ji-Kang; Zheng, Yu-feng; Sun, Yan-fei; Wu, Rong. "Preparation and Properties of C-Axis Preferred Orientation AlN Thin Films by Pure Nitrogen Reactive Sputtering." Xianjiang Daxue Xuebao, Ziran Kexueban, 26 (4), pp. 444-449, 2009.
Zayats, Boiko, Gentsar, Litvin, Papusha, Sopinskii. "Optical Studies of AlN/n-Si(100) Films Obtained by the Method of High-Frequency Magnetron Sputtering.".
M.B. Assouar; O. Elmazria; M El Hakiki; and P. Alnot. "Study of Acoustical and Optical Properties of AlN Films for SAW and BAW Devices: Correlation Between These Properties." Integrated Ferroelectrics, 82: 45-54, 2006.
Chen, Skromme, Chen, Sun, Yang, Khan, Nakarmi, Lin, Jiang, Reitmeyer, Davis, Dalmau, Schlesser, and Sitar. "Optical Reflectance of Bulk AlN Crystals and AlN Epitaxial Films." AIP Conference Proceedings, 772, 297-298, 2005.
Yun, F., et al.. "Optical and Structural Investigation of AlN Grown on Sapphire with Reactive MBE Using RF Nitrogen or Ammonia." Mat. Res. Soc. Symp. Proc., vol. 764, 2003.
Danylyuk, et al.. "Optical and Electrical Properties of Al 1-x InxN Films Grown on Sapphire (0001) by Plasma Source Molecular Beam Epitaxy." Mat. Res. Soc. Symp., vol. 639, 2001.
Mania, Ryszard. "Magnetron Sputtering for Deposition of Aluminum Nitride Thin Films." Prace Komisji Nauk Ceramiczynych, 54, 429-433, 1997.
Chi et. al. "Cracking in coating-substrate composites with multi-layered and FGM coatings," Engineering Fracture Mechanics 70 (2003) p. 1227.
Southwell, "Coating design using very thin high-and low-index layers," Applied Optics, vol. 24, Issue 4, pp. 457, (1985).
Pantano, Carlo G. "Al2O3 Coating by Atomic Layer Deposition (ALD) on various glass substrates for Surface Strength Improvement".
Patent Cooperation Treaty International Notification of Transmittal of the International Search Report and The Written Opinion of the International Searching Authority, international application No. PCT/US2014/036873: mailing date Aug. 26, 2014, 13 pages.
Patent Cooperation Treaty International Notification of Transmittal of the International Search Report and The Written Opinion of the International Searching Authority, international application No. PCT/US2014/036090: mailing date Aug. 22, 2014, 12 pages.
Duncan T. Moore, "Gradient Index Optics: A Review," Applied Optics, vol. 19, No. 7, Apr. 1, 1980.
Portinha et al., "Hard ZrO2/Al2O3 nanolamianted PVD coatings evaluated by nanoindentation", Surface & Coatings Technology 200 (2005) 765-768.
Li et al, "Low-temperature magnetron sputter deposition, hardness and electrical resistivity of amorphous and crystalline alumina thin films" Journal of Vacuum Science & Technology A 18, 2333 (2000).
Moghal et al., "Nanomechanical study of thin film nanocomposite and PVD thin films on polymer substrate for optical applications", J. Phys. D: Appl. Phys. 46 (2013).

(56) References Cited

OTHER PUBLICATIONS

Normand D. Corbin, Aluminum Oxynitride Spinel (ALON): A Review, Jul. 1987. Journal of the European Ceramic Society vol. 5, Issue 3, 1989, pp. 143-154.

Patent Cooperation Treaty International Notification of Transmittal of the International Search Report and The Written Opinion of the International Searching Authority, international application No. PCT/US2014/036872: mailing date Aug. 26, 2014, 13 pages.

Patent Cooperation Treaty International Notification of Transmittal of the International Search Report and The Written Opinion of the International Searching Authority, international application No. PCT/US2014/055282: mailing date Nov. 20, 2014, 14 pages.

Lee M. Goldman et al., "Scale Up of Large ALON Windows", Window and Dome Technologies and Materials XIII, edited by Randal W. Tustison, Brian J. Zelinski,Proc. of SPIE vol. 8708, 870804.

James W. McCauley, et al, "AlON: A brief history of its emergence and evolution." Journal of the European Ceramic Society 29 (2009), 223-236.

* cited by examiner

LOW-COLOR SCRATCH-RESISTANT ARTICLES WITH A MULTILAYER OPTICAL FILM

This application is a continuation application under 35 U.S.C. §120 of U.S. application Ser. No. 14/262,066, filed on Apr. 25, 2014, which claims the benefit of priority under 35 U.S.C. §119 of U.S. Provisional Application Ser. No. 61/954,697, filed on Mar. 18, 2014, U.S. Provisional Application Ser. No. 61/877,568, filed on Sep. 13, 2013, and U.S. Provisional Application Ser. No. 61/820,407, filed on May 7, 2013, the contents of which are relied upon and incorporated herein by reference in their entirety.

BACKGROUND

The disclosure relates to scratch-resistant articles with retained optical properties and more particularly to articles that exhibit low color shift when viewed at different incident illumination angles and a high hardness.

Cover substrates are often used in consumer electronic products to protect critical devices within the product, to provide a user interface for input and/or display, and/or many other functions. Such consumer electronic products include mobile devices, such as smart phones, mp3 players and computer tablets. These applications and others also often demand durable (e.g., scratch-resistant) cover substrate, which also has strong optical performance characteristics. Often, the cover substrate includes glass for this purpose.

Strong optical performance in terms of maximum light transmission and minimum reflectivity are required in cover substrate applications. Furthermore, cover substrate applications require that the color exhibited or perceived, in reflection and/or transmission, does not change appreciably as the viewing angle (or incident illumination angle) is changed. This is because, if the color, reflectivity or transmission changes with viewing angle to an appreciable degree, the user of the product incorporating the cover glass will perceive a change in the color or brightness of the display, which can diminish the perceived quality of the display. Of these changes, a change in color is often the most noticeable and objectionable to users.

Known cover substrates include glass and film combinations that often exhibit scratches after use in harsh operating conditions. Evidence suggests that the damage caused by sharp contact that occurs in a single event is a primary source of visible scratches in such glass-film cover substrates used in mobile devices. Once a significant scratch appears on the cover substrate, the appearance of the product is degraded since the scratch causes an increase in light scattering, which may cause significant reduction in brightness, clarity and contrast of images on the display. Significant scratches can also affect the accuracy and reliability of touch sensitive displays. These scratches, and even less significant scratches, are unsightly and can affect product performance.

Single event scratch damage can be contrasted with abrasion damage. Cover substrates do not typically experience abrasion damage because abrasion damage is typically caused by reciprocating sliding contact from hard counter face objects (e.g., sand, gravel and sandpaper). Instead, cover substrates used in display applications typically endure only reciprocating sliding contact from soft objects, such as fingers. In addition, abrasion damage can generate heat, which can degrade chemical bonds in the film materials and cause flaking and other types of damage to the cover glass. In addition, since abrasion damage is often experienced over a longer term than the single events that cause scratches, the film material experiencing abrasion damage can also oxidize, which further degrades the durability of the film and thus the glass-film laminate. The single events that cause scratches generally do not involve the same conditions as the events that cause abrasion damage and therefore, the solutions often utilized to prevent abrasion damage may not be applicable to prevent scratches in cover substrates. Moreover, known scratch and abrasion damage solutions often compromise the optical properties.

Accordingly, there is a need for new cover substrates, and methods for their manufacture, which are scratch resistant and have good optical performance.

SUMMARY

One aspect of the present disclosure pertains to an article including a substrate with a surface and an optical film disposed on the surface of the substrate forming a coated surface. The article of one or more embodiments exhibits a color shift of about 2 or less or a color shift of about 0.5 or less, when viewed at an incident illumination angle in the range from about 0 degrees to about 60 degrees from normal incidence under an illuminant. Exemplary illuminants include International Commission on Illumination ("CIE") F2 or CIE F10.

The article of some embodiments exhibits a surface hardness of about 8 GPa or greater, as measured on the coated surface by indenting the coated surface with a Berkovitch indenter to form an indent having an indentation depth of at least about 100 nm from the surface of the coated surface. In some instances, the article may exhibit a surface hardness of up to about 500 GPa. The article may optionally include a crack mitigating layer disposed between the optical film and the substrate or within the optical film.

In one or more embodiments, the optical film includes a scratch-resistant layer. The scratch-resistant layer may exhibit a hardness of about 8 GPa or greater. The scratch-resistant layer of some embodiments may exhibit a refractive index of about 1.7 or greater. The scratch-resistant layer may include one or more of AlN, $Si_3N_4$, $AlO_xN_y$, $SiO_xN_y$, $Al_2O_3$, SixCy, $Si_xO_yC_z$, $ZrO_2$, $TiO_xN_y$, diamond, diamond-like carbon, and $Si_uAl_vO_xN_y$.

The optical film of one or more embodiments includes an optical interference layer disposed between the scratch-resistant layer and the substrate. The optical interference layer may include a first low refractive index (RI) sub-layer and a second high RI sub-layer. The difference between the refractive index of the first low RI sub-layer and the refractive index of the second high RI sub-layer may be about 0.01 or greater. In one or more embodiments, the optical interference layer includes a plurality of sub-layer sets (e.g., up to about 10 sub-layer sets), which can include a first low RI sub-layer and a second high RI sub-layer. The first low RI sub-layer may include one or more of $SiO_2$, $Al_2O_3$, $GeO_2$, SiO, $AlO_xN_y$, $SiO_xN_y$, $Si_uAl_vO_xN_y$, MgO, $MgF_2$, $BaF_2$, $CaF_2$, $DyF_3$, $YbF_3$, $YF_3$, and $CeF_3$. The second high RI sub-layer may include at least one of $Si_uAl_vO_xN_y$, $Ta_2O_5$, $Nb_2O_5$, MN, $Si_3N_4$, $AlO_xN_y$, $SiO_xN_y$, $HfO_2$, $TiO_2$, $ZrO_2$, $Y_2O_3$, $Al_2O_3$, and $MoO_3$.

In some instances, the optical interference layer includes a third sub-layer. The third sub-layer may be disposed between the plurality of sub-layer sets and the scratch-resistant layer. Alternatively, the third sub-layer may be disposed between the substrate and the plurality of sub-layer sets. The third sub-layer of one or more embodiments may have a RI between the refractive index of the first low RI sub-layer and the refractive index of the second high RI sub-layer. The optical film of some embodiments may include a capping layer disposed on the scratch-resistant layer.

The first low RI sub-layer and/or the second high RI sub-layer of the optical interference layer may have an optical thickness (n*d) in the range from about 2 nm to about 200 nm. The optical interference layer may exhibit a thickness of about 800 nm or less.

In some embodiments, the optical interference layer exhibits an average light reflection of about 0.5% or less over the optical wavelength regime. In some embodiments, the article exhibits an average transmittance or average reflectance having an average oscillation amplitude of about 5 percentage points or less over the optical wavelength regime.

The substrate of one or more embodiments may include an amorphous substrate or a crystalline substrate. The amorphous substrate can include a glass selected from the group consisting of soda lime glass, alkali aluminosilicate glass, alkali containing borosilicate glass and alkali aluminoborosilicate glass. The glass may be optionally chemically strengthened and/or may include a compressive stress (CS) layer with a surface CS of at least 250 MPa extending within the chemically strengthened glass from a surface of the chemically strengthened glass to a depth of layer (DOL). The DOL exhibited by such substrates may be at least about 10 μm.

Additional features and advantages will be set forth in the detailed description which follows. Additional features and advantages will be readily apparent to those skilled in the art from that description or recognized by practicing the embodiments described herein and in the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description, serve to explain principles and operation of the various embodiments.

DETAILED DESCRIPTION

Figure 1:
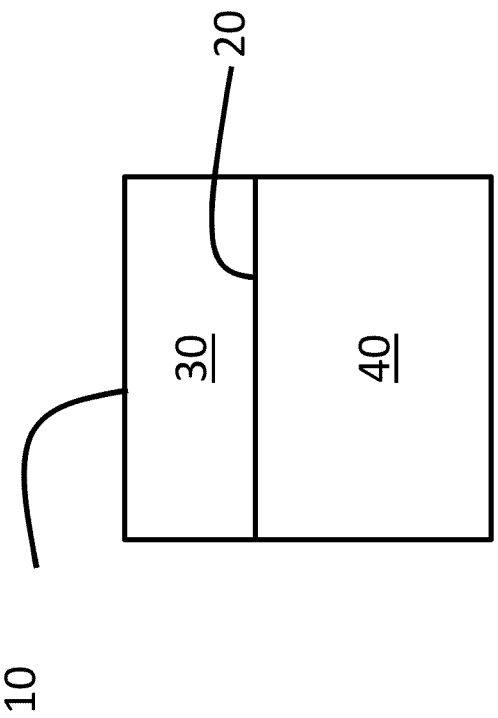
FIG. 1 is an illustration of a known substrate and a scratch-resistant material embodiment.

Reference will now be made in detail to various embodiment(s), examples of which are illustrated in the accompanying drawings. Whenever possible, the same reference numerals will be used throughout the drawings to refer to the same or like parts.

Known scratch-resistant materials, such as MN, $Si_3N_4$, $AlO_xN_y$, and $SiO_xN_y$, have high refractive indices, for example, in the range from about 1.7 to about 2.1. Common substrates that include scratch-resistant materials are glass and plastic substrates. Glass and plastic materials typically have refractive indices in the range from about 1.45 to about 1.65. This difference in the refractive index of the scratch-resistant materials and the substrate can contribute to undesirable optical interference effects. These undesirable optical interference effects may be more pronounced where the scratch-resistant materials have a physical thickness in the range from about 0.05 to about 10 microns. Optical interference between reflected waves from the scratch-resistant material/air interface 10 (as shown in FIG. 1) and the scratch-resistant material/substrate interface 20 (as shown in FIG. 1) can lead to spectral reflectance oscillations that create apparent color in the scratch-resistant materials 30 (and/or the combination of the scratch-resistant materials 30 and substrate 40), particularly in reflection. The color shifts in reflection with viewing angle due to a shift in the spectral reflectance oscillations with incident illumination angle. The observed color and color shifts with incident illumination angle are often distracting or objectionable to device users, particularly under illumination with sharp spectral features such as fluorescent lighting and some LED lighting.

Figure 2:
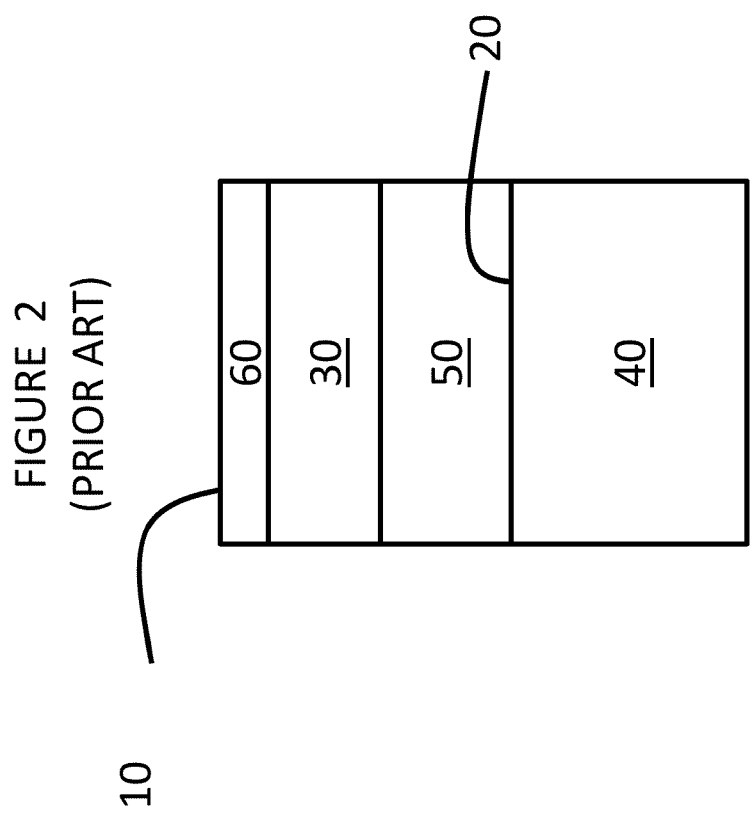
FIG. 2 is an illustration of a known article including a single layer interference layer.
Figure 3:
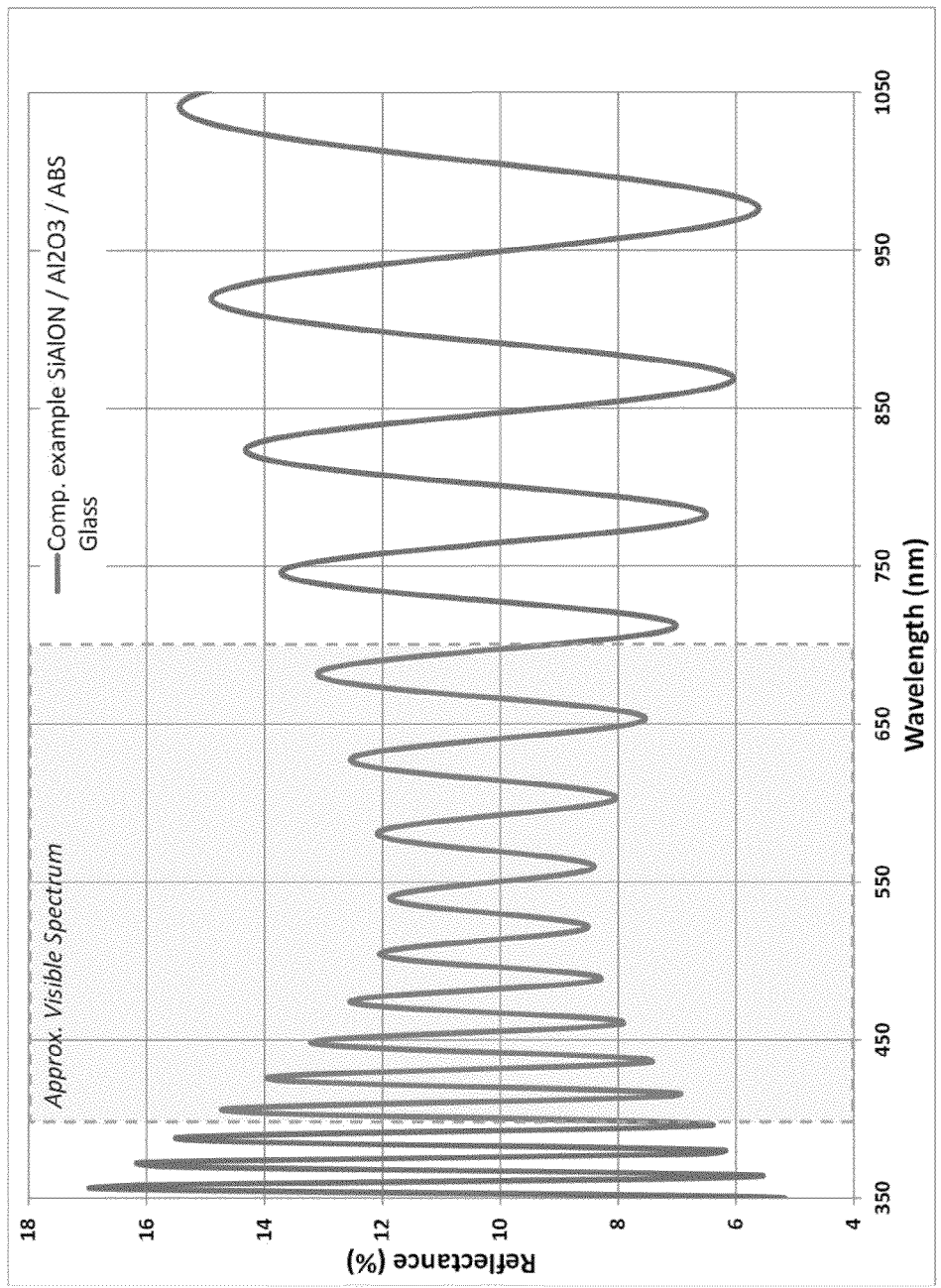
FIG. 3 is a reflectance spectra for the article shown in FIG. 2.

Observed color and color shifts can be reduced by minimizing the reflectance at one or both interfaces 10, 20, thus reducing reflectance oscillations and reflected color shifts for the entire article. For scratch-resistant materials, the reduction in reflectance is often most feasible at the scratch-material/substrate interface 20, while simultaneously retaining the high durability or scratch resistance of the scratch-resistant materials/air interface 10. Various ways to reduce reflectance include the use of a single optical interference layer (as shown in FIG. 2) or a layer having a monotonic gradient in refractive index at the scratch-resistant material/substrate interface 20. Such options, however, often exhibit large oscillations in the transmittance and/or reflectance spectra under various illuminants. A single layer interference layer is included in the article shown in FIG. 2. The article includes an alkali aluminoborosilicate glass substrate 10, a single layer interference layer 50 of $Al_2O_3$ having a physical thickness of about 80 nanometers (nm), an scratch-resistant layer 30 of $Si_uAl_vO_xN_y$ having a physical thickness of about 2000 nm, and a layer 60 of $SiO_2$ having a physical thickness of about 10 nm. FIG. 3 shows a modeled reflectance spectrum for the article illustrated in FIG. 2. The spectrum exhibits oscillations over the optical wavelength regime having amplitudes in the range from about 3.5 percentage points (e.g., a low reflectance of about 8.5% and a peak reflectance of about 12%, at the wavelength range from about 520 nm to 540 nm) to about 8 percentage points (e.g., a low reflectance of about 6.5% and a peak reflectance to about 14.5%, at the wavelength of about 400 nm to 410 nm). As used herein, the term "amplitude" includes the peak-to-valley change in reflectance or transmittance. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. In one or more embodiments, the spectral resolution of the characterization of the transmittance and reflectance is less than 5 nm or 0.02 eV.

Figure 4:
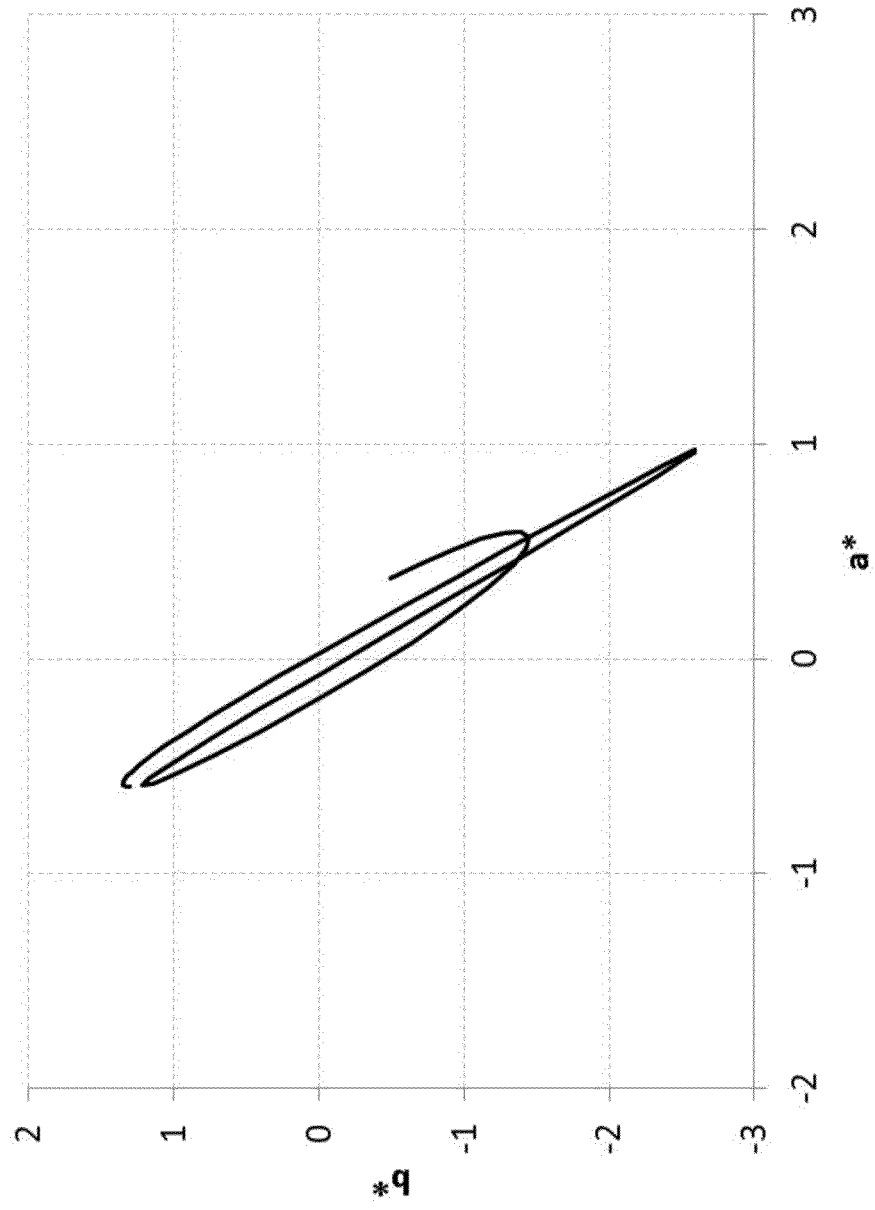
FIG. 4 is a graph showing the range of calculated a* and b* color shifts based on the reflectance spectra shown in FIG. 3.

The phrase "average amplitude" includes the peak-to-valley change in reflectance or transmittance averaged over every possible 100 nm wavelength range within the optical wavelength regime. As used herein, the "optical wavelength regime" includes the wavelength range from about 420 nm to about 700 nm. From this information, it can be predicted that the article shown in FIGS. 2 and 3 will exhibit relatively large color shifts when viewed at different incident illumination angles from normal incidence under different illuminants, as shown in FIG. 4.

The embodiments of this disclosure utilize an optical interference layer including multiple layers disposed between the substrate and the scratch-resistant materials. The optical interference layer achieves improved optical performance, in terms of colorlessness and/or smaller color shifts with viewed at varying incident illumination angles from normal incidence under different illuminants. Such optical interference layers are amenable to faster manufacturing over monotonic gradient designs, and articles incorporating optical interference layers provide scratch-resistance and superior optical properties.

A first aspect of this disclosure pertains to an article that exhibits colorlessness even when viewed at different incident illumination angles under an illuminant. In one or more embodiments, the article exhibits a color shift of about 2 or less for any incidental illumination angles in the ranges provided herein. As used herein, the phrase "color shift" refers to the change in both a* and b*, under the CIE L*, a*, b* colorimetry system. For example, color shift may be determined using the following equation: $\sqrt{((a^*_2-a^*_1)^2+(b^*_2-b^*_1)^2)}$, a* and b* coordinates of the article when viewed at normal incidence (i.e., $a^*_1$, and $b^*_1$) and at an incident illumination angle away from normal incidence (i.e., $a^*_2$, and $b^*_2$), provided that the incident illumination angle is different from normal incidence and in some cases differs from normal incidence by at least about 2 degrees or about 5 degrees. Measurements of the various colors over a collection of different observers indicates that the average observer sees a just-noticeable difference in the two colors when the color shift is of about 2. In some instances, a color shift of about 2 or less is exhibited by the article when viewed at various incident illumination angles from normal incidence, under an illuminant. In some instances the color shift is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit a color shift of about 2 or less when viewed at incident illumination angle from normal incidence under a CIE F2, F10, F11, F12 or D65 illuminant. The incident illumination angle may be in the range from about 0 degrees to about 80 degrees, from about 0 degrees to about 75 degrees, from about 0 degrees to about 70 degrees, from about 0 degrees to about 65 degrees, from about 0 degrees to about 60 degrees, from about 0 degrees to about 55 degrees, from about 0 degrees to about 50 degrees, from about 0 degrees to about 45 degrees, from about 0 degrees to about 40 degrees, from about 0 degrees to about 35 degrees, from about 0 degrees to about 30 degrees, from about 0 degrees to about 25 degrees, from about 0 degrees to about 20 degrees, from about 0 degrees to about 15 degrees, from about 5 degrees to about 80 degrees, from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence. The article may exhibit the maximum color shifts described herein at and along all the incident illumination angles in the range from about 0 degrees to about 80 degrees away from normal incidence. In one example, the article may exhibit a color shift of 2 or less at any incident illumination angle in the range from about 0 degrees to about 60 degrees, from about 2 degrees to about 60 degrees, or from about 5 degrees to about 60 degrees away from normal incidence.

Figure 5:
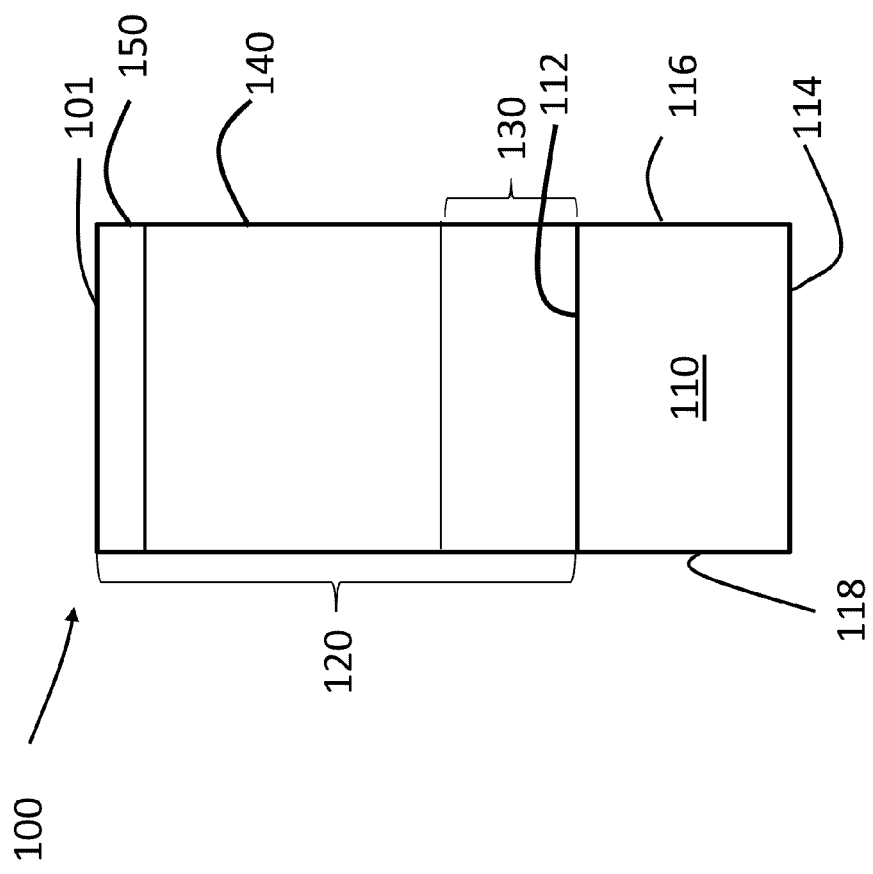
FIG. 5 is illustration of an article according to one or more embodiments.

Referring to FIG. 5, the article 100 according to one or more embodiments may include a substrate 110, and an optical film 120 disposed on the substrate. The substrate 110 includes opposing major surfaces 112, 114 and opposing minor surfaces 116, 118. The optical film 120 is shown in FIG. 5 as being disposed on a first opposing major surface 112; however, the optical film 120 may be disposed on the second opposing major surface 114 and/or one or both of the opposing minor surfaces, in addition to or instead of being disposed on the first opposing major surface 112. The article 100 includes a coated surface 101.

The optical film 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

In one or more embodiments, the article 100 exhibits an average hardness of about 8 GPa or greater, about 10 GPa or greater, about 14 GPa or greater, about 18 GPa or greater, as measured on the coated surface 101 by indenting the coated surface with a Berkovitch indenter to form an indent having an indentation depth of at least about 100 nm from the surface of the coated surface. In some embodiments, the average hardness of the article may be in the range from about 5 GPa to about 30 GPa, from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 5 GPa to about 28 GPa, from about 5 GPa to about 26 GPa, from about 5 GPa to about 24 GPa, from about 5 GPa to about 22 GPa, from about 5 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween.

In one or more embodiments, article 100 also exhibits abrasion resistance. In some embodiments, abrasion resistance is measured by known tests in the art such as those using a Crockmeter, a Taber abraser and other similar standard instruments. For example, Crockmeters are used to determine the Crock resistance of a surface subjected to such rubbing. The Crockmeter subjects a surface to direct contact with a rubbing tip or "finger" mounted on the end of a weighted arm. The standard finger supplied with the Crockmeter is a 15 millimeter (mm) diameter solid acrylic rod. A clean piece of standard crocking cloth is mounted to this acrylic finger. The finger then rests on the sample with a pressure of 900 g and the arm is mechanically moved back and forth repeatedly across the sample in an attempt to observe a change in the durability/crock resistance. The Crockmeter used in the tests described herein is a motorized model that provides a uniform stroke rate of 60 revolutions per minute. The Crockmeter test is described in ASTM test procedure F1319-94, entitled "Standard Test Method for Determination of Abrasion and Smudge Resistance of Images Produced from Business Copy Products," the contents of which are incorporated herein by reference in their entirety. Crock resistance or durability of the coated articles described herein is determined by optical (e.g., reflectance, haze, or transmittance) measurements after a specified number of wipes as defined by ASTM test procedure F1319-94. A "wipe" is defined as two strokes or one cycle, of the rubbing tip or finger.

According to one or more embodiments, the article 100 exhibits an average light transmission of about 80% or greater. The term "light transmission" refers to the amount of light that is transmitted through a medium. The measure of light transmission is the difference between the amount of light that enters the medium and the amount of light that exits the medium. In other words, light transmission is the light that has traveled through a medium without being absorbed or scattered. The term "average light transmission" refers to spectral average of the light transmission multiplied by the luminous efficiency function, as described by CIE standard observer. The article 100 of specific embodiments may exhibit an average light transmission of 80% or greater, 82% or greater, 85% or greater, 90% or greater, 90.5% or greater, 91% or greater, 91.5% or greater, 92% or greater, 92.5% or greater, 93% or greater, 93.5% or greater, 94% or greater, 94.5% or greater, or 95% or greater.

In one or more embodiments, the article 100 has a total reflectivity that 20% or less. For example, the article may have a total reflectivity of 20% or less, 15%, or less, 10% or less, 9% or less, 8% or less, 7% or less, 6% or less. In some specific embodiments, the article has a total reflectivity of 6.9% or less, 6.8% or less, 6.7% or less, 6.6% or less, 6.5% or less, 6.4% or less, 6.3% or less, 6.2% or less, 6.1% or less, 6.0% or less, 5.9% or less, 5.8% or less, 5.7% or less, 5.6% or less, or 5.5% or less. In accordance with one or more embodiments, the article 100 has a total reflectivity that is the same or less than the total reflectivity of the substrate 110.

In one or more embodiments, the article 100 exhibits a relatively flat transmittance spectrum, reflectance spectrum or transmittance and reflectance spectrum over the optical wavelength regime. In some embodiments, the relatively flat transmittance and/or reflectance spectrum includes an average oscillation amplitude of about 5 percentage points or less along the entire optical wavelength regime or wavelength range segments in the optical wavelength regime. Wavelength range segments may be about 50 nm, about 100 nm, about 200 nm or about 300 nm. In some embodiments, the average oscillation amplitude may be about 4.5 percentage points or less, about 4 percentage points or less, about 3.5 percentage points or less, about 3 percentage points or less, about 2.5 percentage points or less, about 2 percentage points or less, about 1.75 percentage points or less, about 1.5 percentage points or less, about 1.25 percentage points or less, about 1 percentage point or less, about 0.75 percentage points or less, about 0.5 percentage points of less, about 0.25 percentage points or less, or about 0 percentage points, and all ranges and sub-ranges therebetween. In one or more specific embodiments, the article exhibits a transmittance over a selected wavelength range segment of about 100 nm or 200 nm over the optical wavelength regime, wherein the oscillations from the spectra have a maximum peak of about 80%, about 82%, about 84%, about 86%, about 87%, about 88%, about 89%, about 90%, about 91%, about 92%, about 93%, about 94%, or about 95%, and all ranges and sub-ranges therebetween.

In some embodiments, the relatively flat average transmittance and/or average reflectance includes maximum oscillation amplitude, expressed as a percent of the average transmittance or average reflectance, along a specified wavelength range segment in the optical wavelength regime. The average transmittance or average reflectance would also be measured along the same specified wavelength range segment in the optical wavelength regime. The wavelength range segment may be about 50 nm, about 100 nm or about 200 nm. In one or more embodiments, the article 100 exhibits an average transmittance and/or average reflectance with an average oscillation amplitude of about 10% or less, about 5% or less, about 4.5% of less, about 4% or less, about 3.5% or less, about 3% or less, about 2.5% or less, about 2% or less, about 1.75% or less, about 1.5% or less, about 1.25% or less, about 1% or less, about 0.75% or less, about 0.5% or less, about 0.25% or less, or about 0.1% or less, and all ranges and sub-ranges therebetween. Such percent-based average oscillation amplitude may be exhibited by the article along wavelength ranges segments of about 50 nm, about 100 nm, about 200 nm or about 300 nm, in the optical wavelength regime. For example, an article may exhibit an average transmittance of about 85% along the wavelength range from about 500 nm to about 600 nm, which is a wavelength range segment of about 100 nm, within the optical wavelength regime. The article may also exhibit a percent-based oscillation amplitude of about 3% along the same wavelength range (500 nm to about 600 nm), which means that along the wavelength range from 500 nm to 600 nm, the absolute (non-percent-based) oscillation amplitude is about 2.55 percentage points.

Substrate

The substrate 110 may include an amorphous substrate, a crystalline substrate or a combination thereof. The substrate 110 may be formed from man-made materials and/or naturally occurring materials. In some specific embodiments, the substrate 110 may specifically exclude plastic and/or metal substrates. In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface ($CS_S$) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression (1):

$$CT=(CS \cdot DOL)/(t-2DOL) \quad (1),$$

wherein t is the physical thickness (μm) of the glass article. In various sections of the disclosure, CT and CS are expressed herein in megaPascals (MPa), physical thickness t is expressed in either micrometers (μm) or millimeters (mm) and DOL is expressed in micrometers (μm).

In one embodiment, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $SP_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $SP_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)–$Al_2O_3$≤2 mol. %; 2 mol. %≤$Na_2O$–$Al_2O_3$≤6 mol. %; and 4 mol. %≤($Na_2O$+$K_2O$)–$Al_2O_3$≤10 mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 µm to about 5 mm. Example substrate 110 physical thicknesses range from about 100 µm to about 500 µm (e.g., 100, 200, 300, 400 or 500 µm). Further example substrate 110 physical thicknesses range from about 500 µm to about 1000 µm (e.g., 500, 600, 700, 800, 900 or 1000 µm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Optical Film

Figure 6:
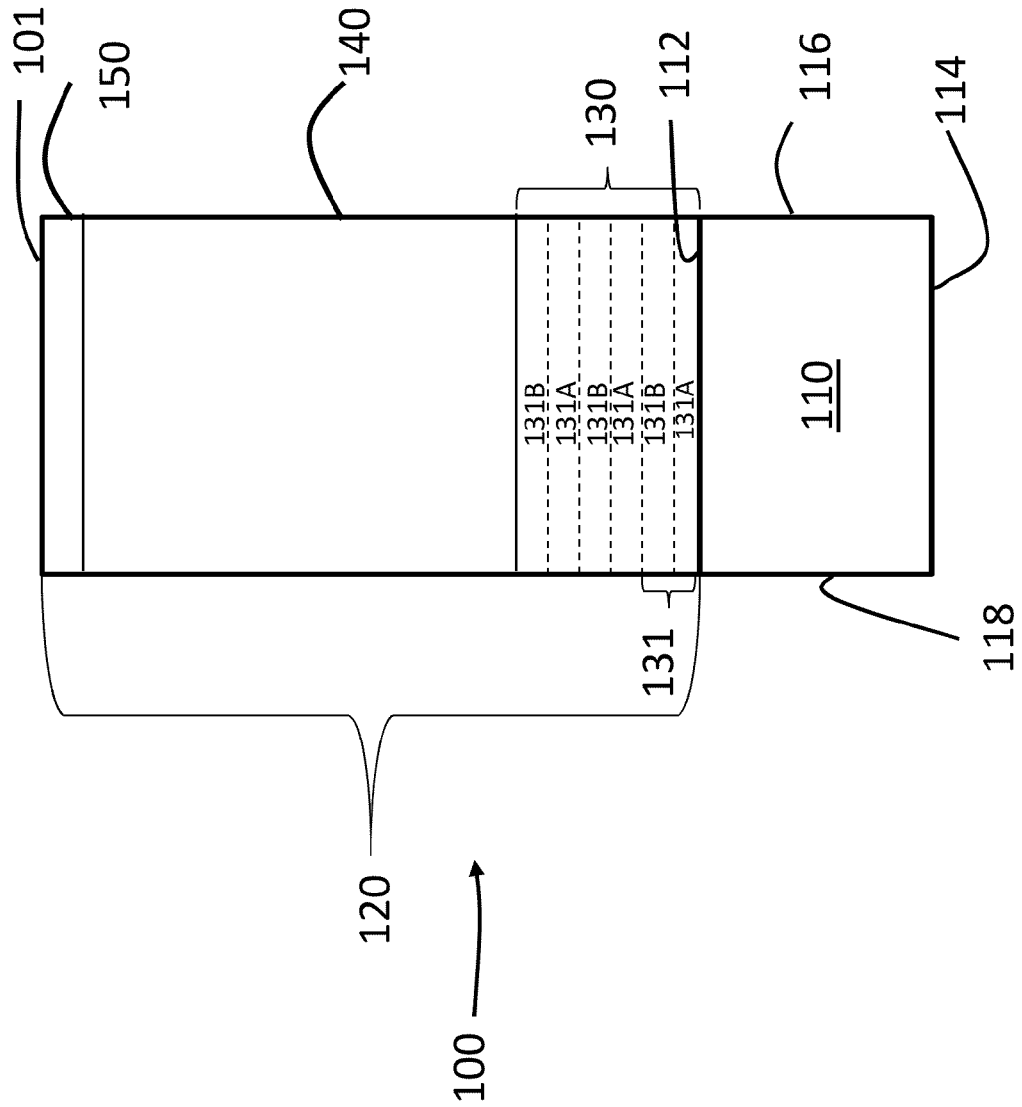
FIG. 6 is a more detailed illustration of the article shown in FIG. 5.

As shown in FIG. 5-6, the optical film 120 may include a plurality of layers 130, 140, 150. Additional layers may also be included in optical film 120. Moreover, in some embodiments, one or more films or layers may be disposed on the opposite side of the substrate 110 from the optical film 120 (i.e., on major surface 114).

The physical thickness of the optical film 120 may be in the range from about 0.1 µm to about 3 µm. In some instances, the physical thickness of the optical film 120 may be in the range from about 0.1 µm to about 2.9 µm, from about 0.1 µm to about 2.8 µm, from about 0.1 µm to about 2.7 µm, from about 0.1 µm to about 2.6 µm, from about 0.1 µm to about 2.5 µm, from about 0.1 µm to about 2.4 µm, from about 0.1 µm to about 2.3 µm, from about 0.1 µm to about 2.2 µm, from about 0.1 µm to about 2.1 µm, from about 0.1 µm to about 2 µm, from about 0.5 µm to about 3 µm, from about 1 µm to about 3 µm, from about 1.1 µm to about 3 µm, from about 1.2 µm to about 3 µm, from about 1.3 µm to about 3 µm, from about 1.4 µm to about 3 µm, or from about 1.5 µm to about 3 µm, and all ranges and sub-ranges therebetween.

The optical film 120 may exhibit an average hardness of greater than about 5 GPa, as measured on the coated surface 101, by indenting that surface with a Berkovitch indenter to form an indent having an indentation depth of at least about 100 nm (measured from the coated surface 101). For example, the optical film 120 may exhibit an average hardness in the range from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 5 GPa to about 28 GPa, from about 5 GPa to about 26 GPa, from about 5 GPa to about 24 GPa, from about 5 GPa to about 22 GPa, from about 5 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween.

In one or more embodiments, the optical film includes an optical interference layer 130 disposed on major surface 112 of the substrate 110, a scratch-resistant layer 140 disposed on the optical interference layer 130 and an optional capping layer 150 disposed on the scratch resistant layer 140. In the embodiment shown, the optical interference layer 130 is disposed between the substrate 110 and the scratch-resistant layer 140, thus modifying the interface between the substrate 110 and the scratch-resistant layer 140.

The optical interference layer 130 may include two or more sub-layers. In one or more embodiments, the two or more sub-layers may be characterized as having a different refractive index. In embodiment, the optical interference layer 130 includes a first low RI sub-layer and a second high RI sub-layer. The difference in the refractive index of the first low RI sub-layer and the second high RI sub-layer may be about 0.01 or greater, 0.05 or greater, 0.1 or greater or even 0.2 or greater.

As shown in FIG. 6, the optical interference layer may include a plurality of sub-layer sets (131). A single sub-layer set may include a first low RI sub-layer and a second high RI sub-layer. For example, sub-layer set 131 includes a first low RI sub-layer 131A and a second high RI sub-layer 131B. In some embodiments, the optical interference layer may include a plurality of sub-layer sets such that the first low RI sub-layer (designated for illustration as "L") and the second high RI sub-layer (designated for illustration as "H") may be provide the following sequence of sub-layers: L/H/L/H or H/L/H/L, such that the first low RI sub-layer and the second high RI sub-layer appear to alternate along the physical thickness of the optical interference layer. In the example in FIG. 6, the optical interference layer 130 includes three sub-layer sets. In some embodiments, the optical interference layer 130 may include up to 10 sub-layer sets. For example, the optical interference layer 130 may include from about 2 to about 12 sub-layer sets, from about 3 to about 8 sub-layer sets, from about 3 to about 6 sub-layer sets.

In some embodiments, the optical interference layer may include one or more third sub-layers. The third sub-layer(s) may have a low RI, a high RI or a medium RI. In some embodiments, the third sub-layer(s) may have the same RI as the first low RI sub-layer 131A or the second high RI sub-layer 131B. In other embodiments, the third sub-layer(s) may have a medium RI that is between the RI of the first low RI sub-layer 131A and the RI of the second high RI sub-layer 131B. The third sub-layer(s) may be disposed between the plurality of sub-layer sets and the scratch-resistant layer 140 (see FIG. 12, 231C) or between the substrate and the plurality of sub-layer sets (see FIG. 12, 231D). Alternatively, the third sub-layer may be included in the plurality of sub-layer sets (not shown). The third sub-layer may be provided in the optical interference layer in the following exemplary configurations: $L_{third\ sub-layer}$/H/L/H/L; $H_{third\ sub-layer}$/L/H/L/H; L/H/L/H/$L_{third\ sub-layer}$; H/L/H/L/$H_{third\ sub-layer}$; $L_{third\ sub-layer}$/H/L/H/L/$H_{third\ sub-layer}$; $H_{third\ sub-layer}$/L/H/L/H/$L_{third\ sub-layer}$; $L_{third\ sub-layer}$/L/H/L/H; $H_{third\ sub-layer}$/H/L/H/L; H/L/H/L/$L_{third\ sub-layer}$; L/H/L/H/$H_{third\ sub-layer}$; $L_{third\ sub-layer}$/L/H/L/H/$H_{third\ sub-layer}$; $H_{third\ sub-layer}$/H/L/H/L/$L_{third\ sub-layer}$; L/M/H/L/M/H; H/M/L/H/M/L; M/L/H/L/M; and other combinations. In these configurations, "L" without any subscript refers to the first low RI sub-layer and "H" without any subscript refers to the second high RI sub-layer. Reference to "$L_{third\ sub-layer}$" refers to a third sub-layer having a low RI, "$H_{third\ sub-layer}$" refers to a third sub-layer having a high RI and "M" refers to a third sub-layer having a medium RI.

As used herein, the terms "low RI", "high RI" and "medium RI" refer to the relative values for the RI to another (e.g., low RI<medium RI<high RI). In one or more embodiments, the term "low RI" when used with the first low RI sub-layer or with the third sub-layer, includes a range from about 1.3 to about 1.7. In one or more embodiments, the term "high RI" when used with the second high RI sub-layer or with the third sub-layer, includes a range from about 1.6 to about 2.5. In some embodiments, the term "medium RI" when used with the third sub-layer, includes a range from about 1.55 to about 1.8. In some instances, the ranges for low RI, high RI and medium RI may overlap; however, in most instances, the sub-layers of the optical interference layer have the general relationship regarding RI of: low RI<medium RI<high RI.

Exemplary materials suitable for use in the optical interference layer 130 include: $SiO_2$, $Al_2O_3$, $GeO_2$, SiO, $AlO_xN_y$, AlN, $Si_3N_4$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI sub-layer include $SiO_2$, $Al_2O_3$, $GeO_2$, SiO, $AlO_xN_y$, $SiO_xN_y$, $Si_uAl_vO_xN_y$, MgO, $MgF_2$, $BaF_2$, $CaF_2$, $DyF_3$, $YbF_3$, $YF_3$, and $CeF_3$. Some examples of suitable materials for use in the second high RI sub-layer include $Si_uAl_vO_xN_y$, $Ta_2O_5$, $Nb_2O_5$, MN, $Si_3N_4$, $AlO_xN_y$, $SiO_xN_y$, $HfO_2$, $TiO_2$, $ZrO_2$, $Y_2O_3$, $Al_2O_3$, and $MoO_3$.

In one or more embodiments at least one of the sub-layer(s) of the optical interference layer may include a specific optical thickness range. As used herein, the term "optical thickness" is determined by (n*d), where "n" refers to the RI of the sub-layer and "d" refers to the physical thickness of the sub-layer. In one or more embodiments, at least one of the sub-layers of the optical interference layer may include an optical thickness in the range from about 2 nm to about 200 nm, from about 10 nm to about 100 nm, or from about 15 nm to about 100 nm. In some embodiments, all of the sub-layers in the optical interference layer 130 may each have an optical thickness in the range from about 2 nm to about 200 nm, from about 10 nm to about 100 nm or from about 15 nm to about 100 nm. In some cases, at least one sub-layer of the optical interference layer 130 has an optical thickness of about 50 nm or greater. In some cases, each of the first low RI sub-layers have an optical thickness in the range from about 2 nm to about 200 nm, from about 10 nm to about 100 nm, or from about 15 nm to about 100 nm. In other cases, each of the second high RI sub-layers have an optical thickness in the range from about 2 nm to about 200 nm, from about 10 nm to about 100 nm, or from about 15 nm to about 100 nm. In yet other cases, each of the third sub-layers have an optical thickness in the range from about 2 nm to about 200 nm, from about 10 nm to about 100 nm, or from about 15 nm to about 100 nm.

In one or more embodiments, the optical interference layer 130 has a physical thickness of about 800 nm or less. The optical interference layer 130 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 to about 300, and all ranges and sub-ranges therebetween.

In some embodiments, the optical interference layer exhibits an average light reflectance of about 2% or less, 1.5% or less, 0.75% or less, 0.5% or less, 0.25% or less, 0.1% or less, or even 0.05% or less over the optical wavelength regime, when measured in an immersed state. As used herein, the phrase "immersed state" includes the measurement of the average reflectance by subtracting or otherwise removing reflections created by the article at interfaces other than those involving the optical interference layer. In some instances, the optical interference layer may exhibit such average light reflectance over other wavelength ranges such as from about 450 nm to about 650 nm, from about 420 nm to about 680 nm, from about 420 nm to about 740 nm, from about 420 nm to about 850 nm, or from about 420 nm to about 950 nm. In some embodiments, the optical interference layer exhibits an average light transmission of about 90% or greater, 92% or greater, 94% or greater, 96% or greater, or 98% or greater, over the optical wavelength regime.

The optical interference layer 130 of the embodiments described herein may be distinguished from layers that have a monotonic refractive index gradient. Articles that include the optical interference layer 130 between a scratch-resistant layer 140 and the substrate 110 exhibit improved optical performance (e.g., high average light transmission, low average light reflectance, low color shift as described herein), while reducing the physical thickness of the optical film 120. Monotonic refractive index gradient layers provide similar optical properties but may require greater physical thicknesses.

The scratch-resistant layer 140 of one or more embodiments may include an inorganic carbide, nitride, oxide, diamond-like material, or combination of these. Examples of suitable materials for the scratch-resistant layer 140 include metal oxides, metal nitrides, metal oxynitride, metal carbides, metal oxycarbides, and/or combinations thereof combination thereof. Exemplary metals include B, Al, Si, Ti, V, Cr, Y, Zr, Nb, Mo, Sn, Hf, Ta and W. Specific examples of materials that may be utilized in the scratch-resistant layer 140 may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof. The scratch resistant layer may also comprise nanocomposite materials, or materials with a controlled microstructure to improve hardness, toughness, or abrasion/wear resistance. For example the scratch resistant layer may comprise nanocrystallites in the size range from about 5 nm to about 30 nm. In embodiments, the scratch resistant layer may comprise transformation-toughened zirconia, partially stabilized zirconia, or zirconia-toughened alumina. In embodiments, the scratch-resistant layer exhibits a fracture toughness value greater than about 1 MPa√m and simultaneously exhibits a hardness value greater than about 8 GPa.

The composition of the scratch-resistant layer 140 may be modified to provide specific properties (e.g., hardness). In one or more embodiments, the scratch-resistant layer 140 exhibits an average hardness in the range from about 5GPa to about 30 GPa as measured on a major surface of the scratch-resistant layer, by indenting that surface with a Berkovitch indenter to form an indent having an indentation depth of at least about 100 nm (measured from the major surface of the scratch-resistant layer). In one or more embodiments, the scratch-resistant layer 140 exhibits an average hardness in the range from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 5 GPa to about 28 GPa, from about 5 GPa to about 26 GPa, from about 5 GPa to about 24 GPa, from about 5 GPa to about 22 GPa, from about 5 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. In one or more embodiments, the scratch-resistant layer 140 may exhibit an average hardness that is greater than 15 GPa, greater than 20 GPa, or greater than 25 GPa. In one or more embodiments, the scratch-resistant layer exhibits an average hardness in the range from about 15 GPa to about 150 GPa, from about 15 GPa to about 100 GPa, or from about 18 GPa to about 100 GPa.

The physical thickness of the scratch-resistant layer 140 may be in the range from about 1.5 μm to about 3 μm. In some embodiments, the physical thickness of the scratch-resistant layer 140 may be in the range from about 1.5 μm to about 3 μm, from about 1.5 μm to about 2.8 μm, from about 1.5 μm to about 2.6 μm, from about 1.5 μm to about 2.4 μm, from about 1.5 μm to about 2.2 μm, from about 1.5 μm to about 2 μm, from about 1.6 μm to about 3 μm, from about 1.7 μm to about 3 μm, from about 1.8 μm to about 3 μm, from about 1.9 μm to about 3 μm, from about 2 μm to about 3 μm, from about 2.1 μm to about 3 μm, from about 2.2 μm to about 3 μm, from about 2.3 μm to about 3 μm, and all ranges and sub-ranges therebetween. In some embodiments, the physical thickness of the scratch-resistant layer 140 may be in the range from about 0.1 μm to about 2 μm, or from about 0.1 μm to about 1 μm, or from 0.2 μm to about 1 μm.

In one or more embodiments, the scratch-resistant layer 140 has a refractive index of about 1.6 or greater. In some instances, the refractive index of the scratch-resistant layer 140 may be about 1.65 or greater, 1.7 or greater, 1.8 or greater, 1.9 or greater, 2 or greater, or 2.1 or greater. The scratch-resistant layer may have a refractive index that is greater than the refractive index of the substrate 110. In specific embodiments, the scratch-resistant layer has a refractive index that is about 0.05 index units greater or about 0.2 index units greater than the refractive index of the substrate, when measured at a wavelength of about 550 nm.

The capping layer 150 of one or more embodiments may include a low refractive index material, such as $SiO_2$, $Al_2O_3$, $GeO_2$, $SiO$, $AlO_xN_y$, $SiO_xN_y$, $Si_uAl_vO_xN_y$, $MgO$, $MgF_2$, $BaF_2$, $CaF_2$, $DyF_3$, $YbF_3$, $YF_3$, and $CeF_3$ and other such materials. The physical thickness of the capping layer may be in the range from about 0 to about 100 nm, from about 0.1 nm to about 50 nm, from about 1 nm to about 50 nm, from about 5 nm to about 50 nm, from about 10 nm to about 50 nm, from about 0 nm to about 40, from about 0 nm to about 30, from about 0 nm to about 20 nm, from about 0 nm to about 10 nm, from about 0.1 nm to about 15 nm, from about 0.1 nm to about 12 nm, from about 0.1 nm to about 10 nm, from about 0.1 nm to about 8 nm, from about 4 nm to about 30 nm, from about 4 nm to about 20 nm, from about 8 nm to about 12 nm, from about 9 nm to about 10 nm, and all ranges and sub-ranges therebetween. In one or more embodiments, the article has a refractive index of about 1.7 or greater at the coated surface 101, which may include the capping layer. The capping layer 150 may formed using silane-based low-friction materials, including fluorosilane, alkyl silane, silsesquioxane, and the like, either by liquid deposition or vapor deposition methods. In one or more embodiments, the capping layer may comprise two or more materials or two or more sub-layers (e.g., 4 sub-layers or 6 sub-layers). The capping layer may provide an anti-reflective function especially where multiple sub-layers are utilized. The sub-layers may include different refractive indices and may include layers with high refractive indices (H) and low refractive indices (L) where "high" and "low" are with respect to one another and within known ranges for anti-reflective films. The sub-layers may be arranged so that high and low refractive index sub-layers alternate. The materials or sub-layers can include, for example $SiO_2$ or $SiO_xN_y$. In such embodiments, the one or more sub-layers can have a thickness each or combined in the range from about 4 nm to about 50 nm. In some embodiments, the capping layer 150 may include a silane-based low-friction sub-layer having a thickness in the range from about 0.1 nm to about 20 nm, disposed on underlying sub-layers of the capping layer (e.g., the $SiO_2$ and/or $SiO_xN_y$ layer(s)).

In some embodiments, the optical interference layer 130 may also comprise a crack mitigating layer. This crack mitigating layer may suppress or prevent crack bridging between the scratch resistant layer 140 and the substrate 110, thus modifying or improving the mechanical properties or strength of the article. Embodiments of crack mitigating layers are further described in U.S. patent application Ser. Nos. 14/052,055, 14/053,093 and 14/053,139, which are incorporated herein by reference. The crack mitigating layer may comprise crack blunting materials, crack deflecting materials, crack arresting materials, tough materials, or controlled-adhesion interfaces. The crack mitigating layer may comprise polymeric materials, nanoporous materials, metal oxides, metal fluorides, metallic materials, or other materials mentioned herein for use in either the optical interference layer 130 or the scratch resistant layer 140. The structure of the crack mitigating layer may be a multilayer structure, wherein the multilayer structure is designed to deflect, suppress, or prevent crack propagation while simultaneously providing the optical interference benefits described herein. The crack mitigating layer may include nanocrystallites, nanocomposite materials, transformation toughened materials, multiple layers of organic material, multiple layers of inorganic material, multiple layers of interdigitating organic and inorganic materials, or hybrid organic-inorganic materials. The crack mitigating layer may have a strain to failure that is greater than about 2%, or greater than about 10%. These crack mitigating layers can also be combined separately with the substrate, scratch resistant layer, and optical interference layer(s) described herein; it is not strictly required that the crack mitigating layer is simultaneously acting as an optical interference layer. In embodiments, the crack mitigating layer can perform its function in the presence or in the absence of an optical interference layer (and vice versa). The design of the optical interference layer can be adjusted, if needed, to accommodate the presence of a crack mitigating layer.

The crack mitigating layer may include tough or nanostructured inorganics, for example, zinc oxide, certain Al alloys, Cu alloys, steels, or stabilized tetragonal zirconia (including transformation toughened, partially stabilized, yttria stabilized, ceria stabilized, calcia stabilized, and magnesia stabilized zirconia); zirconia-toughened ceramics (including zirconia toughened alumina); ceramic-ceramic composites; carbon-ceramic composites; fiber- or whisker-reinforced ceramics or glass-ceramics (for example, SiC or $Si_3N_4$ fiber- or whisker-reinforced ceramics); metal-ceramic composites; porous or non-porous hybrid organic-inorganic materials, for example, nanocomposites, polymer-ceramic composites, polymer-glass composites, fiber-reinforced polymers, carbon-nanotube- or graphene-ceramic composites, silsesquioxanes, polysilsesquioxanes, or "ORMOSILs" (organically modified silica or silicate), and/or a variety of porous or non-porous polymeric materials, for example siloxanes, polysiloxanes, polyacrylates, polyacrylics, PI (polyimides), fluorinated polyimide, polyamides, PAI (polyamideimides), polycarbonates, polysulfones, PSU or PPSU (polyarylsulfones), fluoropolymers, fluoroelastomers, lactams, polycylic olefins, and similar materials, including, but not limited to PDMS (polydimethylsiloxane), PMMA (poly(methyl methacrylate)), BCB (benzocyclobutene), PEI (polyethyletherimide), poly(arylene ethers) such as PEEK (poly-ether-etherketone), PES (polyethersulfone) and PAR (polyarylate), PET (polyethylene terephthalate), PEN (polyethylene napthalate=poly(ethylene-2,6-napthalene dicarboxylate), FEP (fluorinated ethylene propylene), PTFE (polytetrafluoroethylene), PFA (perfluoroalkoxy polymer, e.g., trade names Teflon®, Neoflon®) and similar materials. Other suitable materials include modified polycarbonates, some versions of epoxies, cyanate esters, PPS (polyphenylsulfides), polyphenylenes, polypyrrolones, polyquinoxalines, and bismaleimides.

The physical and/or optical thicknesses of the layers of the optical film 120 can be adjusted to achieve desired optical and mechanical properties (e.g., hardness). For example, the scratch-resistant layer 140 may be can be made thinner, for example in the range from about 100 nm to about 500 nm, while still providing some resistance to scratch, abrasion, or damage events (including drop events of the article onto hard surfaces such as asphalt, cement, or sandpaper). The capping layer physical and/or optical thickness can also be adjusted. The capping layer may be included when even lower total reflection is desired. The capping layer may also be included to further tune color of the article. For example, the optical films described herein minimize color shift with changing incidence illumination angle in a* or b* coordinates, but may also exhibit a slight slope to the reflectance spectra. A capping layer 150 may be included in the optical film 120 and the physical and/or optical thickness of the capping layer may be adjusted slightly (e.g., from about 10 nm to about 14 nm) to provide an even flatter reflectance spectrum (or a reflectance spectrum with oscillations having even smaller amplitudes) across the optical wavelength regime.

The optical film 120 may be formed using various deposition methods such as vacuum deposition techniques, for example, chemical vapor deposition (e.g., plasma enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or non-reactive sputtering or laser ablation), thermal or e-beam evaporation and/or atomic layer deposition. One or more layers of the optical film 120 may include nano-pores or mixed-materials to provide specific refractive index ranges or values.

The physical thicknesses of the layers or sub-layers of the optical film 120 may vary by less than about 10 nm, less than about 5 nm, less than about 1 nm or less than about 0.5 nm (representing the range of six standard deviations from the target value) to achieve the maximum targeted repeatability (e.g., a* and b* variations no greater than +/−0.2 for reflected F2 illumination). In some embodiments, larger variations in physical thicknesses of the layers can be tolerated while still achieving the desired targets of the invention for some applications (e.g., a* and b* variations no greater than +/−2.0 for reflected F2 illumination).

High-angle optical performance may be improved in some embodiments by adding additional layers to the optical film 120 and/or the article 100. In some cases, these additional layers can extend the wavelengths at which the reflectance spectrum has low amplitude oscillations (e.g., into the near-IR wavelengths, such as to 800 nm, 900 nm, or even 1000 nm). This leads to lower oscillations and lower color at high incidence angles, because generally the entire reflectance spectra of the article shifts to shorter wavelengths at higher light incidence angles. In some cases, this extended-band performance can be achieved by adjusting the interference layer design, for example by allowing a higher oscillation amplitude to achieve a wider-wavelength-band of low oscillations, without necessarily adding more layers. This extended-band or wide-wavelength-band of low oscillations (correlated to an extended band of low reflectance for the interference layers) can also be useful in making the article tolerant to deposition non-uniformity, substrate curvature, substrate sculpting, or substrate shaping which causes shadowing during directional deposition processes, or other geometry factors that cause a substantially uniform relative shift in all layer thicknesses relative to the typically ideal target thicknesses.

EXAMPLES

Various embodiments will be further clarified by the following examples. Examples 1-9 used modeling to understand the reflectance spectra and color shift of articles that included an optical film with an optical interference layer, a scratch-resistant layer and a capping layer. The modeling was based on collected refractive index data from formed layers of various materials and a strengthened aluminoborosilicate ("ABS") glass substrate. Examples 10, 11, and Comparative Example 12 are experimentally fabricated multilayer working examples which further demonstrate the principles of modeling Examples 1-9.

The layers were formed by DC reactive sputtering, reactive DC and radio frequency (RF) sputtering, and e-beam evaporation onto silicon wafers. Some of the formed layers included $SiO_2$, $Nb_2O_5$, or $Al_2O_3$ and were deposited onto silicon wafers by DC reactive sputtering from a silicon, niobium or aluminum target (respectively) at a temperature of about 50° C. using ion assist. Layers formed in this manner are designated with the indicator "RS". Other layers including $SiO_2$ were deposited onto silicon wafers by e-beam evaporation by heating the wafer to 300° C. and without ion assist. Such layers are designated with the indicator "E".

Layers of Ta$_2$O$_5$ were deposited onto silicon wafers by e-beam evaporation by heating the wafer to 300° C. and without ion assist.

Layers of Si$_u$Al$_v$O$_x$N$_y$ were deposited onto silicon wafers by DC reactive sputtering combined with RF superimposed DC sputtering, with ion assist using a sputter deposition tool supplied by AJA-Industries. The wafer was heated to 200° C. during deposition and silicon targets having a 3 inch diameter and an aluminum targets having a 3 inch diameter were used. Reactive gases used included nitrogen and oxygen and argon was used as the inert gas. The RF power was supplied to the silicon target at 13.56 Mhz and DC power was supplied to the aluminum target. The resulting Si$_u$Al$_v$O$_x$N$_y$ layers had a refractive index at 550 nm of about 1.95 and a measured hardness of greater than about 15 GPa, using a Berkovitch indenter on the surface of the Si$_u$Al$_v$O$_x$N$_y$ layer being tested, as described herein.

The refractive indices (as a function of wavelength) of the formed layers of the optical film and the glass substrates were measured using spectroscopic ellipsometry. Tables 1-7 include the refractive indices and dispersion curves measured. The refractive indices thus measured were then used to calculate reflectance spectra and angular color shift for the various modeled Examples.

TABLE 1

Refractive indices and dispersion curve for a RS—SiO2 layer vs. wavelength.
Material SiO2—RS

| Wavelength (nm) | Refractive Index (n) | Extinction Coefficient (k) |
|---|---|---|
| 246.5 | 1.52857 | 0.0 |
| 275.2 | 1.51357 | 0.0 |
| 300.8 | 1.50335 | 0.0 |
| 324.7 | 1.49571 | 0.0 |
| 350.2 | 1.48911 | 0.0 |
| 375.8 | 1.48374 | 0.0 |
| 399.7 | 1.47956 | 0.0 |
| 425.2 | 1.47583 | 0.0 |
| 450.7 | 1.47269 | 0.0 |
| 476.3 | 1.47002 | 0.0 |
| 500.2 | 1.46788 | 0.0 |
| 525.7 | 1.46589 | 0.0 |
| 549.5 | 1.46427 | 0.0 |
| 575.0 | 1.46276 | 0.0 |
| 600.5 | 1.46143 | 0.0 |
| 625.9 | 1.46026 | 0.0 |
| 649.7 | 1.45928 | 0.0 |
| 675.1 | 1.45835 | 0.0 |
| 700.5 | 1.45751 | 0.0 |
| 725.9 | 1.45676 | 0.0 |
| 751.3 | 1.45609 | 0.0 |
| 775.0 | 1.45551 | 0.0 |
| 800.4 | 1.45496 | 0.0 |
| 850.9 | 1.45399 | 0.0 |
| 899.8 | 1.45320 | 0.0 |
| 950.2 | 1.45252 | 0.0 |
| 999.0 | 1.45195 | 0.0 |
| 1100.0 | 1.45100 | 0.0 |
| 1199.6 | 1.45028 | 0.0 |
| 1302.0 | 1.44971 | 0.0 |
| 1400.8 | 1.44928 | 0.0 |
| 1499.7 | 1.44892 | 0.0 |
| 1599.0 | 1.44863 | 0.0 |
| 1688.4 | 1.44841 | 0.0 |

TABLE 2

Refractive indices and dispersion curve for a Si$_u$Al$_v$O$_x$N$_y$ layer vs. wavelength.
Material SiAlON-195

| Wavelength (nm) | Refractive Index (n) | Extinction Coefficient (k) |
|---|---|---|
| 206.6 | 2.37659 | 0.21495 |
| 225.4 | 2.28524 | 0.11270 |
| 251.0 | 2.18818 | 0.04322 |
| 275.5 | 2.12017 | 0.01310 |
| 300.9 | 2.06916 | 0.00128 |
| 324.6 | 2.03698 | 0.0 |
| 350.2 | 2.01423 | 0.0 |
| 360.4 | 2.00718 | 0.0 |
| 371.2 | 2.00059 | 0.0 |
| 380.3 | 1.99562 | 0.0 |
| 389.9 | 1.99090 | 0.0 |
| 400.0 | 1.98640 | 0.0 |
| 410.5 | 1.98213 | 0.0 |
| 421.7 | 1.97806 | 0.0 |
| 430.5 | 1.97513 | 0.0 |
| 439.7 | 1.97230 | 0.0 |
| 449.2 | 1.96958 | 0.0 |
| 459.2 | 1.96695 | 0.0 |
| 469.6 | 1.96441 | 0.0 |
| 480.6 | 1.96197 | 0.0 |
| 492.0 | 1.95961 | 0.0 |
| 499.9 | 1.95808 | 0.0 |
| 512.3 | 1.95586 | 0.0 |
| 520.9 | 1.95442 | 0.0 |
| 529.9 | 1.95301 | 0.0 |
| 539.1 | 1.95165 | 0.0 |
| 548.6 | 1.95031 | 0.0 |
| 558.5 | 1.94900 | 0.0 |
| 568.7 | 1.94773 | 0.0 |
| 579.4 | 1.94649 | 0.0 |
| 590.4 | 1.94528 | 0.0 |
| 601.9 | 1.94410 | 0.0 |
| 613.8 | 1.94295 | 0.0 |
| 619.9 | 1.94239 | 0.0 |
| 632.6 | 1.94128 | 0.0 |
| 639.1 | 1.94074 | 0.0 |
| 652.6 | 1.93968 | 0.0 |
| 666.6 | 1.93864 | 0.0 |
| 681.2 | 1.93763 | 0.0 |
| 696.5 | 1.93665 | 0.0 |
| 712.6 | 1.93569 | 0.0 |
| 729.3 | 1.93477 | 0.0 |
| 746.9 | 1.93386 | 0.0 |
| 765.3 | 1.93299 | 0.0 |
| 784.7 | 1.93214 | 0.0 |
| 805.1 | 1.93131 | 0.0 |
| 826.6 | 1.93051 | 0.0 |
| 849.2 | 1.92973 | 0.0 |
| 873.1 | 1.92898 | 0.0 |
| 898.4 | 1.92825 | 0.0 |
| 925.3 | 1.92754 | 0.0 |
| 953.7 | 1.92686 | 0.0 |
| 999.9 | 1.92587 | 0.0 |
| 1050.7 | 1.92494 | 0.0 |
| 1107.0 | 1.92406 | 0.0 |
| 1169.7 | 1.92323 | 0.0 |
| 1239.8 | 1.92245 | 0.0 |
| 1319.0 | 1.92172 | 0.0 |
| 1408.9 | 1.92103 | 0.0 |
| 1512.0 | 1.92040 | 0.0 |
| 1631.4 | 1.91981 | 0.0 |
| 1771.2 | 1.91926 | 0.0 |
| 1999.8 | 1.91861 | 0.0 |

TABLE 3

Refractive indices and dispersion curve
for a strengthened aluminoborosilicate glass substrate vs. wavelength.
Material ABS glass

| Wavelength (nm) | Refractive Index (n) | Extinction Coefficient (k) |
| --- | --- | --- |
| 350.6 | 1.53119 | 0.0 |
| 360.7 | 1.52834 | 0.0 |
| 370.8 | 1.52633 | 0.0 |
| 380.8 | 1.52438 | 0.0 |
| 390.9 | 1.52267 | 0.0 |
| 400.9 | 1.52135 | 0.0 |
| 411.0 | 1.52034 | 0.0 |
| 421.0 | 1.51910 | 0.0 |
| 431.1 | 1.51781 | 0.0 |
| 441.1 | 1.51686 | 0.0 |
| 451.2 | 1.51600 | 0.0 |
| 461.2 | 1.51515 | 0.0 |
| 471.2 | 1.51431 | 0.0 |
| 481.3 | 1.51380 | 0.0 |
| 491.3 | 1.51327 | 0.0 |
| 501.3 | 1.51259 | 0.0 |
| 511.4 | 1.51175 | 0.0 |
| 521.4 | 1.51124 | 0.0 |
| 531.4 | 1.51082 | 0.0 |
| 541.5 | 1.51040 | 0.0 |
| 551.5 | 1.50999 | 0.0 |
| 561.5 | 1.50959 | 0.0 |
| 571.5 | 1.50918 | 0.0 |
| 581.6 | 1.50876 | 0.0 |
| 591.6 | 1.50844 | 0.0 |
| 601.6 | 1.50828 | 0.0 |
| 611.6 | 1.50789 | 0.0 |
| 621.7 | 1.50747 | 0.0 |
| 631.7 | 1.50707 | 0.0 |
| 641.7 | 1.50667 | 0.0 |
| 651.7 | 1.50629 | 0.0 |
| 661.7 | 1.50591 | 0.0 |
| 671.8 | 1.50555 | 0.0 |
| 681.8 | 1.50519 | 0.0 |
| 691.8 | 1.50482 | 0.0 |
| 701.8 | 1.50445 | 0.0 |
| 709.8 | 1.50449 | 0.0 |
| 719.8 | 1.50456 | 0.0 |
| 729.9 | 1.50470 | 0.0 |
| 739.9 | 1.50484 | 0.0 |
| 749.9 | 1.50491 | 0.0 |

TABLE 4

Refractive indices and dispersion curve
for a RS—$Al_2O_3$ layer vs. wavelength.
Material Al2O3—RS

| Wavelength (nm) | Refractive Index (n) | Extinction Coefficient (k) |
| --- | --- | --- |
| 251.3 | 1.76256 | 0.0 |
| 275.2 | 1.74075 | 0.0 |
| 300.8 | 1.72358 | 0.0 |
| 324.7 | 1.71136 | 0.0 |
| 350.2 | 1.70121 | 0.0 |
| 375.8 | 1.69321 | 0.0 |
| 401.3 | 1.68679 | 0.0 |
| 425.2 | 1.68185 | 0.0 |
| 450.7 | 1.67747 | 0.0 |
| 474.7 | 1.67402 | 0.0 |
| 500.2 | 1.67089 | 0.0 |
| 525.7 | 1.66823 | 0.0 |
| 549.5 | 1.66608 | 0.0 |
| 575.0 | 1.66408 | 0.0 |
| 600.5 | 1.66234 | 0.0 |
| 625.9 | 1.66082 | 0.0 |
| 649.7 | 1.65955 | 0.0 |
| 675.1 | 1.65835 | 0.0 |
| 700.5 | 1.65728 | 0.0 |
| 725.9 | 1.65633 | 0.0 |
| 749.7 | 1.65552 | 0.0 |
| 775.0 | 1.65474 | 0.0 |
| 800.4 | 1.65404 | 0.0 |
| 850.9 | 1.65282 | 0.0 |
| 899.8 | 1.65184 | 0.0 |
| 950.2 | 1.65098 | 0.0 |
| 999.0 | 1.65027 | 0.0 |
| 1100.0 | 1.64909 | 0.0 |
| 1199.6 | 1.64821 | 0.0 |
| 1302.0 | 1.64751 | 0.0 |
| 1400.8 | 1.64698 | 0.0 |
| 1499.7 | 1.64654 | 0.0 |
| 1599.0 | 1.64619 | 0.0 |
| 1688.4 | 1.64592 | 0.0 |

TABLE 5

Refractive indices and dispersion curve for an
E-$Ta_2O_5$ layer vs. wavelength.
Material Ta2O5-E

| Wavelength (nm) | Refractive Index (n) | Extinction Coefficient (k) |
| --- | --- | --- |
| 299.5 | 2.31978 | 0.01588 |
| 310.0 | 2.27183 | 0.00049 |
| 319.5 | 2.23697 | 0.0 |
| 329.7 | 2.20688 | 0.0 |
| 340.6 | 2.18080 | 0.0 |
| 350.2 | 2.16164 | 0.0 |
| 360.4 | 2.14448 | 0.0 |
| 369.0 | 2.13201 | 0.0 |
| 380.3 | 2.11780 | 0.0 |
| 389.9 | 2.10741 | 0.0 |
| 399.9 | 2.09780 | 0.0 |
| 410.5 | 2.08888 | 0.0 |
| 421.7 | 2.08059 | 0.0 |
| 430.5 | 2.07475 | 0.0 |
| 439.7 | 2.06920 | 0.0 |
| 449.2 | 2.06394 | 0.0 |
| 459.2 | 2.05892 | 0.0 |
| 469.6 | 2.05415 | 0.0 |
| 480.6 | 2.04960 | 0.0 |
| 488.1 | 2.04669 | 0.0 |
| 499.9 | 2.04248 | 0.0 |
| 512.3 | 2.03846 | 0.0 |
| 520.9 | 2.03588 | 0.0 |
| 529.8 | 2.03337 | 0.0 |
| 539.1 | 2.03094 | 0.0 |
| 548.6 | 2.02857 | 0.0 |
| 558.5 | 2.02627 | 0.0 |
| 568.7 | 2.02403 | 0.0 |
| 579.4 | 2.02186 | 0.0 |
| 590.4 | 2.01974 | 0.0 |
| 601.9 | 2.01768 | 0.0 |
| 613.8 | 2.01567 | 0.0 |
| 619.9 | 2.01469 | 0.0 |
| 632.6 | 2.01276 | 0.0 |
| 645.8 | 2.01088 | 0.0 |
| 659.5 | 2.00905 | 0.0 |
| 673.8 | 2.00726 | 0.0 |
| 688.8 | 2.00552 | 0.0 |
| 704.5 | 2.00382 | 0.0 |
| 729.3 | 2.00135 | 0.0 |
| 746.9 | 1.99975 | 0.0 |
| 774.9 | 1.99743 | 0.0 |
| 805.1 | 1.99518 | 0.0 |
| 826.6 | 1.99372 | 0.0 |
| 849.2 | 1.99230 | 0.0 |

TABLE 5-continued

Refractive indices and dispersion curve for an
E-Ta$_2$O$_5$ layer vs. wavelength.
Material Ta2O5-E

| Wavelength (nm) | Refractive Index (n) | Extinction Coefficient (k) |
|---|---|---|
| 898.4 | 1.98955 | 0.0 |
| 953.7 | 1.98692 | 0.0 |
| 999.9 | 1.98502 | 0.0 |
| 1050.7 | 1.98318 | 0.0 |
| 1107.0 | 1.98140 | 0.0 |
| 1148.0 | 1.98024 | 0.0 |
| 1192.2 | 1.97910 | 0.0 |
| 1239.8 | 1.97799 | 0.0 |
| 1291.5 | 1.97690 | 0.0 |
| 1347.7 | 1.97584 | 0.0 |
| 1408.9 | 1.97479 | 0.0 |
| 1476.0 | 1.97376 | 0.0 |
| 1549.8 | 1.97276 | 0.0 |

TABLE 6

Refractive indices and dispersion curve for an
E-SiO$_2$ layer vs. wavelength.
Material SiO2-E

| Wavelength (nm) | Refractive Index (n) | Extinction Coefficient (k) |
|---|---|---|
| 299.5 | 1.48123 | 0.00296 |
| 310.0 | 1.47856 | 0.00283 |
| 319.5 | 1.47636 | 0.00273 |
| 329.7 | 1.47424 | 0.00262 |
| 340.6 | 1.47221 | 0.00252 |
| 350.2 | 1.47057 | 0.00244 |
| 360.4 | 1.46899 | 0.00236 |
| 369.0 | 1.46776 | 0.00229 |
| 380.3 | 1.46628 | 0.00221 |
| 389.9 | 1.46513 | 0.00215 |
| 399.9 | 1.46401 | 0.00209 |
| 410.5 | 1.46292 | 0.00203 |
| 421.7 | 1.46187 | 0.00197 |
| 430.5 | 1.46110 | 0.00192 |
| 439.7 | 1.46035 | 0.00188 |
| 449.2 | 1.45961 | 0.00183 |
| 459.2 | 1.45890 | 0.00179 |
| 469.6 | 1.45820 | 0.00174 |
| 480.6 | 1.45752 | 0.00170 |
| 488.1 | 1.45708 | 0.00167 |
| 499.9 | 1.45642 | 0.00163 |
| 512.3 | 1.45579 | 0.00158 |
| 520.9 | 1.45537 | 0.00156 |
| 529.8 | 1.45497 | 0.00153 |
| 539.1 | 1.45457 | 0.00150 |
| 548.6 | 1.45418 | 0.00147 |
| 558.5 | 1.45379 | 0.00144 |
| 568.7 | 1.45341 | 0.00142 |
| 579.4 | 1.45304 | 0.00139 |
| 590.4 | 1.45268 | 0.00136 |
| 601.9 | 1.45233 | 0.00133 |
| 613.8 | 1.45198 | 0.00131 |
| 619.9 | 1.45181 | 0.00129 |
| 632.6 | 1.45147 | 0.00126 |
| 639.1 | 1.45130 | 0.00125 |
| 652.5 | 1.45098 | 0.00122 |
| 659.5 | 1.45082 | 0.00121 |
| 673.8 | 1.45050 | 0.00118 |
| 681.2 | 1.45035 | 0.00117 |
| 688.8 | 1.45019 | 0.00116 |
| 704.5 | 1.44989 | 0.00113 |
| 720.8 | 1.44960 | 0.00110 |
| 746.9 | 1.44917 | 0.00106 |
| 774.9 | 1.44876 | 0.00102 |
| 805.1 | 1.44836 | 0.00098 |
| 826.6 | 1.44811 | 0.00096 |
| 849.2 | 1.44786 | 0.00093 |

TABLE 6-continued

Refractive indices and dispersion curve for an
E-SiO$_2$ layer vs. wavelength.
Material SiO2-E

| Wavelength (nm) | Refractive Index (n) | Extinction Coefficient (k) |
|---|---|---|
| 898.4 | 1.44738 | 0.00088 |
| 953.7 | 1.44693 | 0.00083 |
| 999.9 | 1.44661 | 0.00079 |
| 1050.7 | 1.44631 | 0.00075 |
| 1107.0 | 1.44602 | 0.00071 |
| 1148.0 | 1.44584 | 0.00068 |
| 1192.2 | 1.44566 | 0.00066 |
| 1239.8 | 1.44549 | 0.00063 |
| 1291.5 | 1.44533 | 0.00061 |
| 1347.7 | 1.44517 | 0.00058 |
| 1408.9 | 1.44502 | 0.00056 |
| 1476.0 | 1.44488 | 0.00053 |
| 1549.8 | 1.44474 | 0.00050 |

TABLE 7

Refractive indices and dispersion curve for
an RS-Nb$_2$O$_5$ layer vs. wavelength.
Material Nb2O5-RS

| Wavelength (nm) | Refractive Index (n) | Extinction Coefficient (k) |
|---|---|---|
| 206.6 | 2.04389 | 0.66079 |
| 250.0 | 2.32991 | 1.05691 |
| 300.2 | 3.14998 | 0.45732 |
| 325.0 | 2.94490 | 0.12012 |
| 350.2 | 2.74715 | 0.02027 |
| 375.1 | 2.62064 | 0.00048 |
| 400.6 | 2.53696 | 0.0 |
| 425.3 | 2.48169 | 0.0 |
| 450.0 | 2.44210 | 0.0 |
| 475.0 | 2.41223 | 0.0 |
| 500.9 | 2.38851 | 0.0 |
| 525.4 | 2.37086 | 0.0 |
| 549.8 | 2.35647 | 0.0 |
| 575.3 | 2.34409 | 0.0 |
| 600.4 | 2.33392 | 0.0 |
| 624.6 | 2.32557 | 0.0 |
| 650.8 | 2.31779 | 0.0 |
| 675.7 | 2.31142 | 0.0 |
| 700.5 | 2.30583 | 0.0 |
| 725.1 | 2.30093 | 0.0 |
| 749.1 | 2.29665 | 0.0 |
| 774.9 | 2.29255 | 0.0 |
| 799.9 | 2.28898 | 0.0 |
| 849.2 | 2.28288 | 0.0 |
| 901.7 | 2.27749 | 0.0 |
| 999.9 | 2.26958 | 0.0 |
| 1102.1 | 2.26342 | 0.0 |
| 1203.7 | 2.25867 | 0.0 |
| 1298.3 | 2.25513 | 0.0 |
| 1400.9 | 2.25198 | 0.0 |
| 1502.8 | 2.24939 | 0.0 |
| 1599.8 | 2.24730 | 0.0 |
| 1698.4 | 2.24547 | 0.0 |
| 1796.9 | 2.24389 | 0.0 |
| 1892.9 | 2.24254 | 0.0 |
| 1999.7 | 2.24122 | 0.0 |
| 2066.4 | 2.24047 | 0.0 |

Example 1

Modeled Example 1 included an article having the same structure as shown in FIG. 6. Modeled Example 1 included a chemically strengthened alkali aluminoborosilicate glass substrate and an optical film disposed on the substrate. The optical film included an optical interference layer with three sets of sub-layers, a scratch-resistant layer disposed on the optical interference layer and a capping layer disposed on the scratch-resistant layer. The optical film materials and thicknesses of each layer, in the order arranged in the optical film, are provided in Table 8.

TABLE 8

Optical film attributes for modeled Example 1.

| Layer | | Material | Modeled Physical Thickness |
|---|---|---|---|
| Ambient medium | | Air | Immersed |
| Capping layer | | RS-SiO$_2$ | 9.5 nm |
| Scratch-resistant layer | | Si$_u$Al$_v$O$_x$N$_y$ | 2000 nm |
| Optical interference layer | 1$^{st}$ low RI sub-layer | RS-SiO$_2$ | 8.22 nm |
| | 2$^{nd}$ high RI sub-layer | Si$_u$Al$_v$O$_x$N$_y$ | 46.39 nm |
| | 1$^{st}$ low RI sub-layer | RS-SiO$_2$ | 29 nm |
| | 2$^{nd}$ high RI sub-layer | Si$_u$Al$_v$O$_x$N$_y$ | 27.87 nm |
| | 1$^{st}$ low RI sub-layer | RS-SiO$_2$ | 49.63 nm |
| | 2$^{nd}$ high RI sub-layer | Si$_u$Al$_v$O$_x$N$_y$ | 9.34 nm |
| Substrate | | ABS Glass | Immersed |

Figure 7:
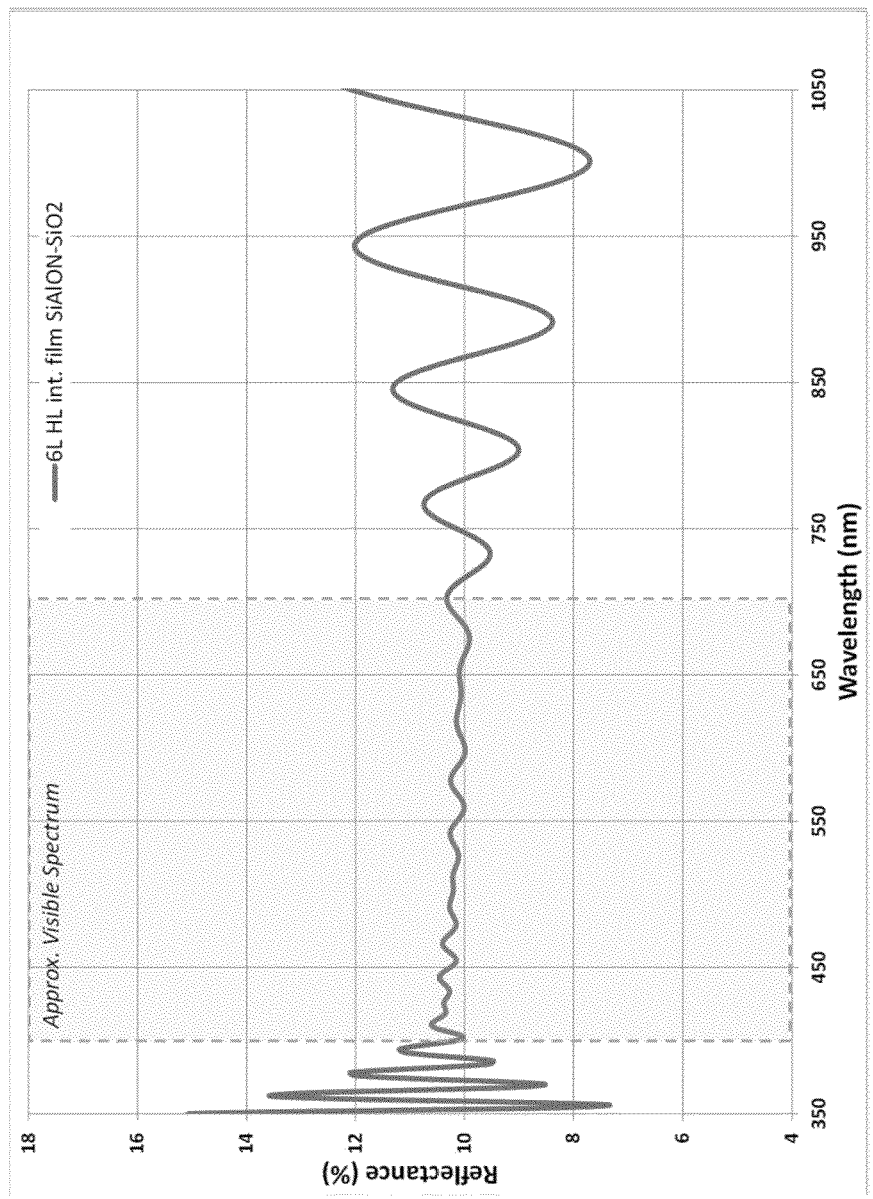
FIG. 7 is a calculated reflectance spectra for the article having an optical interference layer with three sub-layer sets, according to modeled Example 1.
Figure 8:
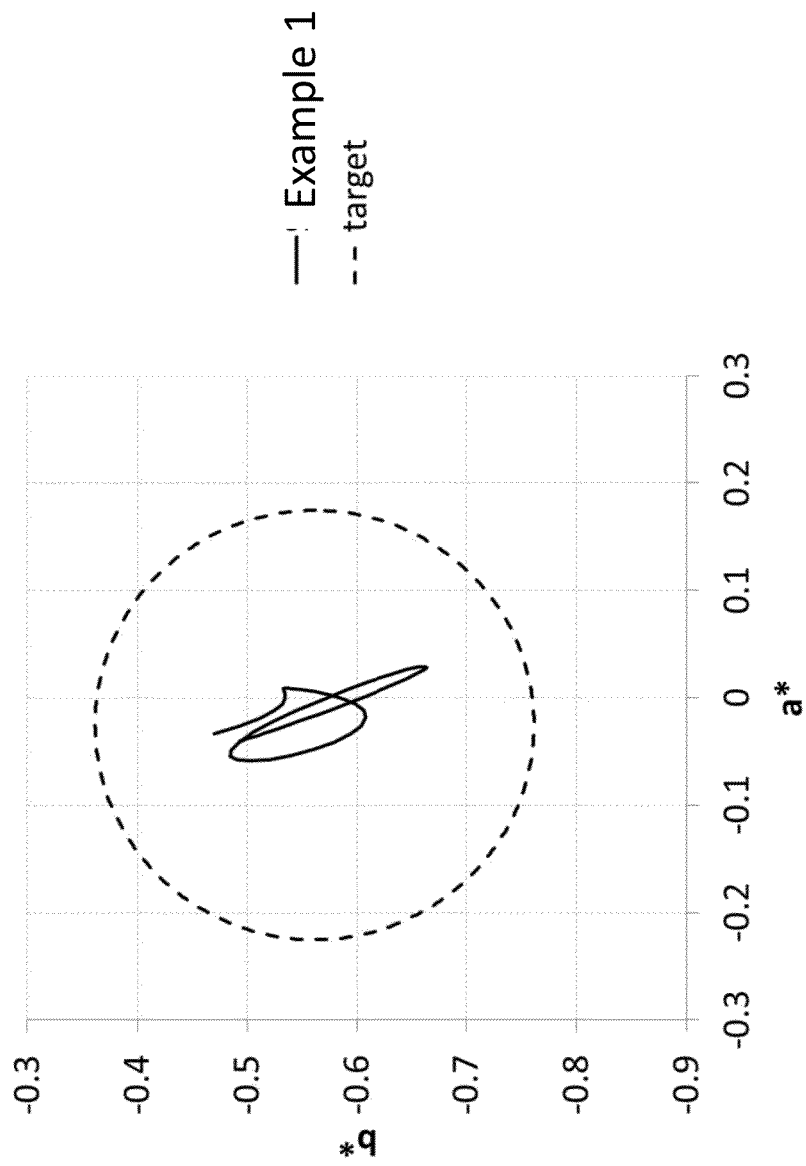
FIG. 8 is a graph showing the range of calculated a* and b* color shifts for modeled Example 1.

The calculated reflectance spectrum for modeled Example 1 is shown in FIG. 7. As shown in FIG. 7, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 8. FIG. 7 shows a target having a radius of 0.2, centered on the color coordinates of the substrate without the optical film disposed thereon, under F2 illumination.

Example 2

Figure 9:
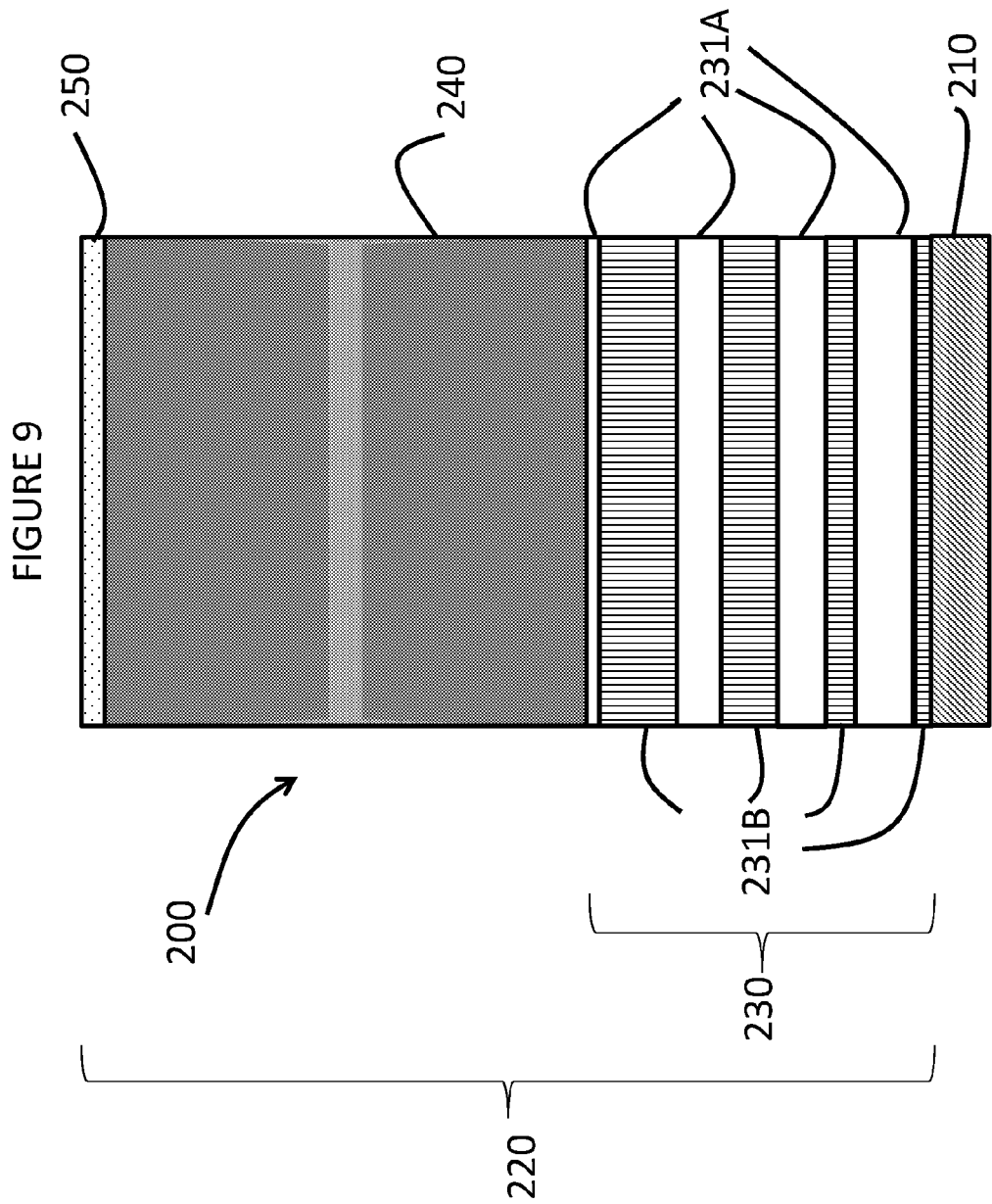
FIG. 9 is a schematic representation of the article according to modeled Example 2.

Modeled Example 2 included an article 200 with a chemically strengthened alkali aluminoborosilicate substrate 210 and an optical film 220 disposed on the substrate. The optical film 220 included an optical interference layer 230, a scratch-resistant layer 240 disposed on the optical interference layer, and a capping layer 250, as shown in FIG. 9. The optical interference layer 230 included four sets of sub-layers 231A, 231B. The optical film materials and thicknesses of each layer, in the order arranged in the optical film, are provided in Table 9.

TABLE 9

Optical film attributes for modeled Example 2.

| Layer | | Material | Modeled Thickness |
|---|---|---|---|
| Ambient medium | | Air | Immersed |
| Capping layer | | RS-SiO$_2$ | 9.5 nm |
| Scratch-resistant layer | | Si$_u$Al$_v$O$_x$N$_y$ | 2000 nm |
| Optical interference layer | 1$^{st}$ low RI sub-layer | RS-SiO$_2$ | 4.83 nm |
| | 2$^{nd}$ high RI sub-layer | Si$_u$Al$_v$O$_x$N$_y$ | 53.16 nm |
| | 1$^{st}$ low RI sub-layer | RS-SiO$_2$ | 19.63 nm |
| | 2$^{nd}$ high RI sub-layer | Si$_u$Al$_v$O$_x$N$_y$ | 38.29 nm |
| | 1$^{st}$ low RI sub-layer | RS-SiO$_2$ | 40.97 nm |
| | 2$^{nd}$ high RI sub-layer | Si$_u$Al$_v$O$_x$N$_y$ | 21.73 nm |
| | 1$^{st}$ low RI sub-layer | RS-SiO$_2$ | 54.88 nm |
| | 2$^{nd}$ high RI sub-layer | Si$_u$Al$_v$O$_x$N$_y$ | 7.05 nm |
| Substrate | | ABS Glass | Immersed |

Figure 10:
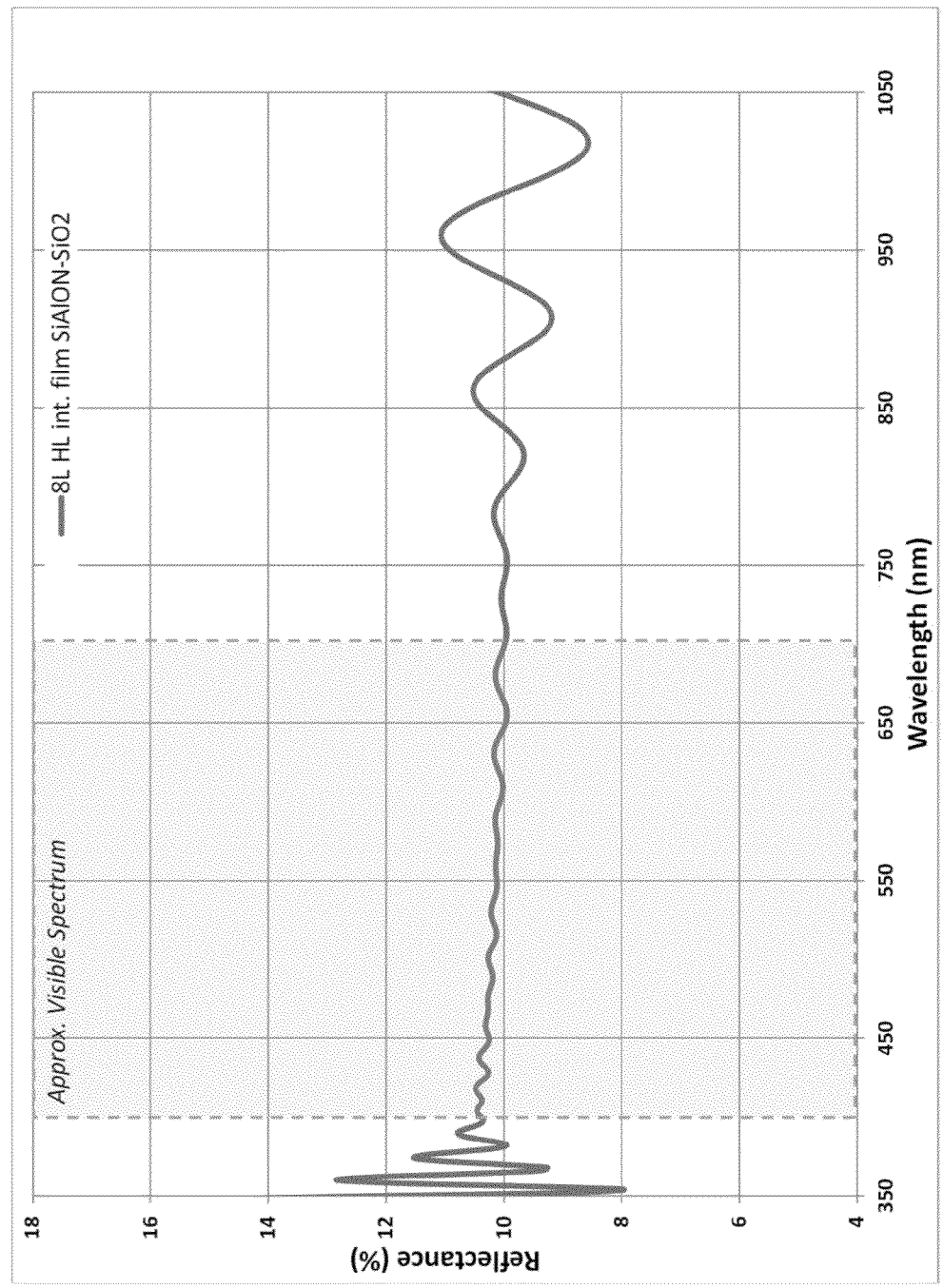
FIG. 10 is a calculated reflectance spectra for the article according to modeled Example 2.
Figure 11:
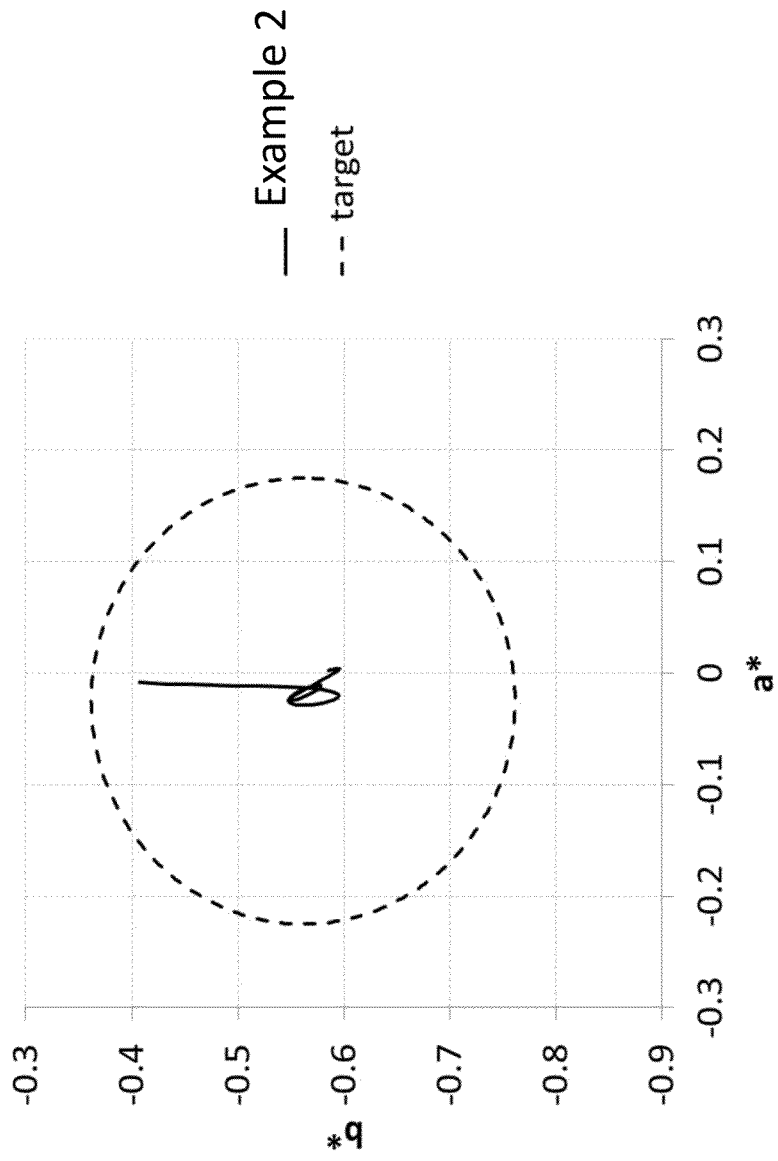
FIG. 11 is a graph showing the range of calculated a* and b* color shifts for modeled Example 2.

The calculated reflectance spectrum for the modeled Example 2 is shown in FIG. 10. As shown in FIG. 10, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 11. FIG. 11 shows a target having a radius of 0.2, centered on the color coordinates of the substrate without the optical film disposed thereon, under F2 illumination.

Example 3

Figure 12:
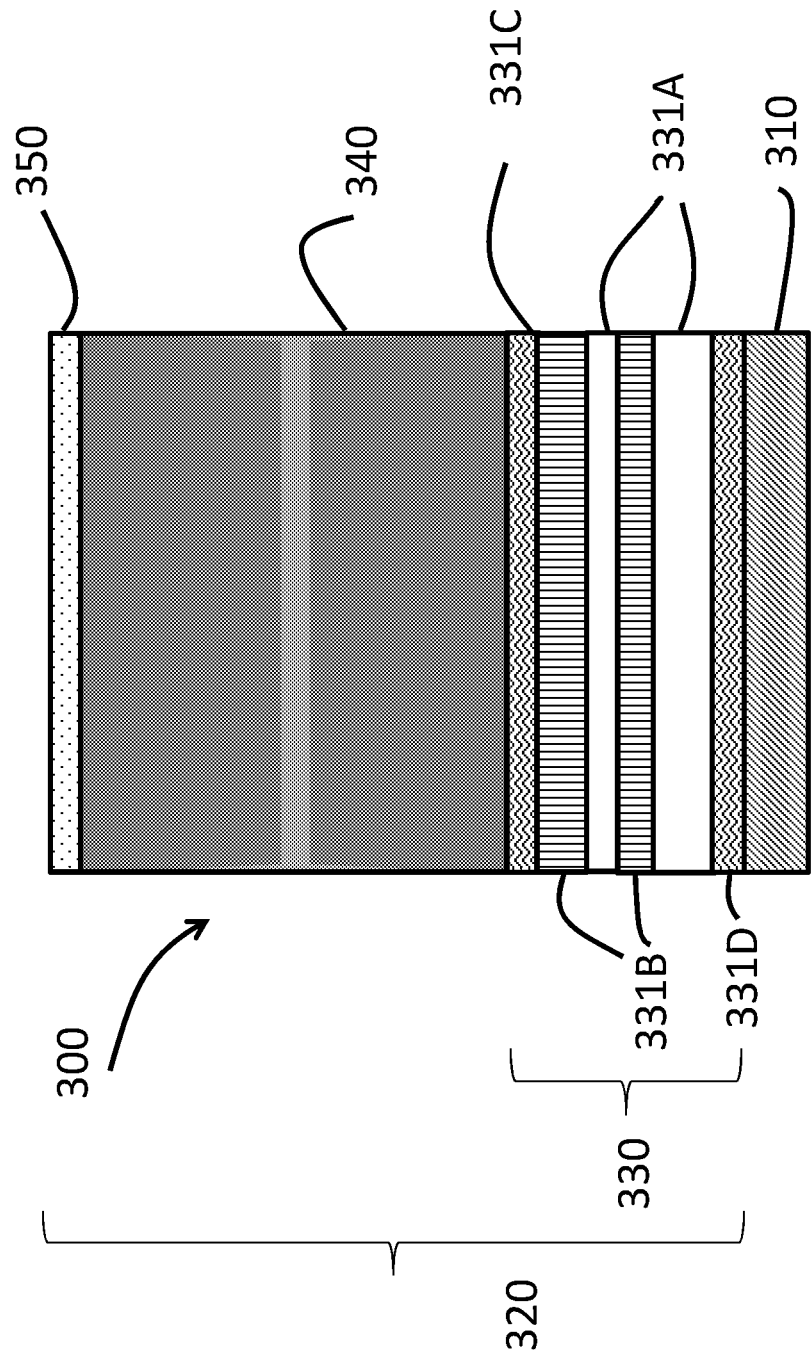
FIG. 12 is a schematic representation of the article according to modeled Example 3.

Modeled Example 3 included an article 300 with a chemically strengthened alkali aluminoborosilicate substrate 310 and an optical film 320 disposed on the substrate. The optical film 320 included an optical interference layer 330, a scratch resistant layer 340 disposed on the optical interference layer, and a capping layer 350 disposed on the scratch-resistant layer 250. The optical interference layer included two sets of sub-layers 331A, 331B, a third sub-layer 331C disposed between the plurality of sub-layers and the scratch-resistant layer, and a third sub-layer 331D disposed between the plurality of sub-layers and the substrate, as shown in FIG. 12. The optical film materials and thicknesses of each layer, in the order arranged in the optical film, are provided in Table 10.

TABLE 10

Optical film attributes for modeled Example 3.

| Layer | | Material | Modeled Thickness |
|---|---|---|---|
| Ambient medium | | Air | Immersed |
| Capping layer | | RS-SiO$_2$ | 9.5 nm |
| Scratch-resistant layer | | Si$_u$Al$_v$O$_x$N$_y$ | 2000 nm |
| Optical interference layer | Third sub-layer | RS-Al$_2$O$_3$ | 13.5 nm |
| | 2$^{nd}$ high RI sub-layer | Si$_u$Al$_v$O$_x$N$_y$ | 43.58 nm |
| | 1$^{st}$ low RI sub-layer | RS-SiO$_2$ | 28.85 nm |
| | 2$^{nd}$ high RI sub-layer | Si$_u$Al$_v$O$_x$N$_y$ | 27.48 nm |
| | 1$^{st}$ low RI sub-layer | RS-SiO$_2$ | 40.62 nm |
| | Third sub-layer | RS-Al$_2$O$_3$ | 27.26 nm |
| Substrate | | ABS Glass | Immersed |

Figure 13:
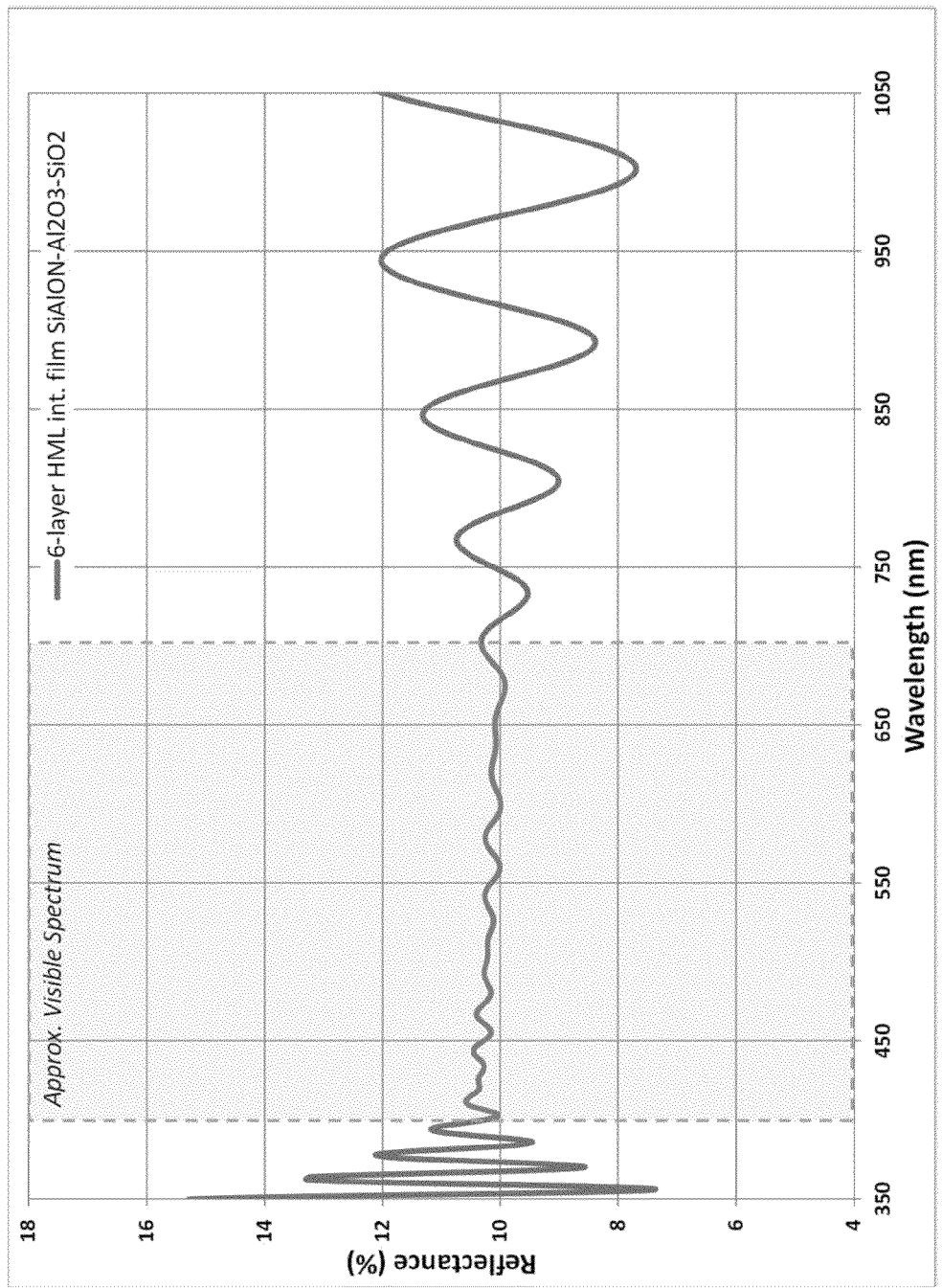
FIG. 13 is a calculated reflectance spectra for the article according to modeled Example 3.
Figure 14:
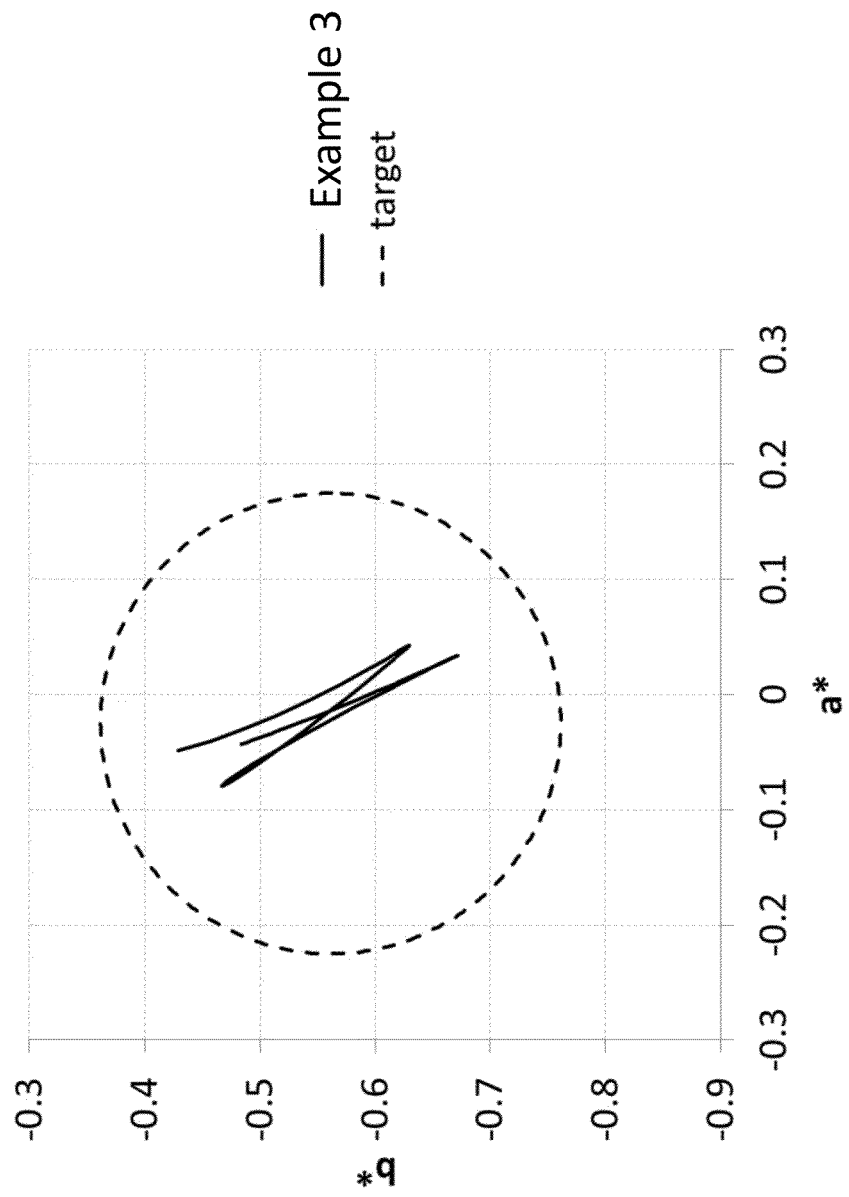
FIG. 14 is a graph showing the range of calculated a* and b* color shifts for modeled Example 3.

The calculated reflectance spectrum for the modeled Example 3 is shown in FIG. 13. As shown in FIG. 13, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 14. FIG. 14 shows a target having a radius of 0.2, centered on the color coordinates of the substrate without the optical film disposed thereon, under F2 illumination.

Example 4

Figure 15:
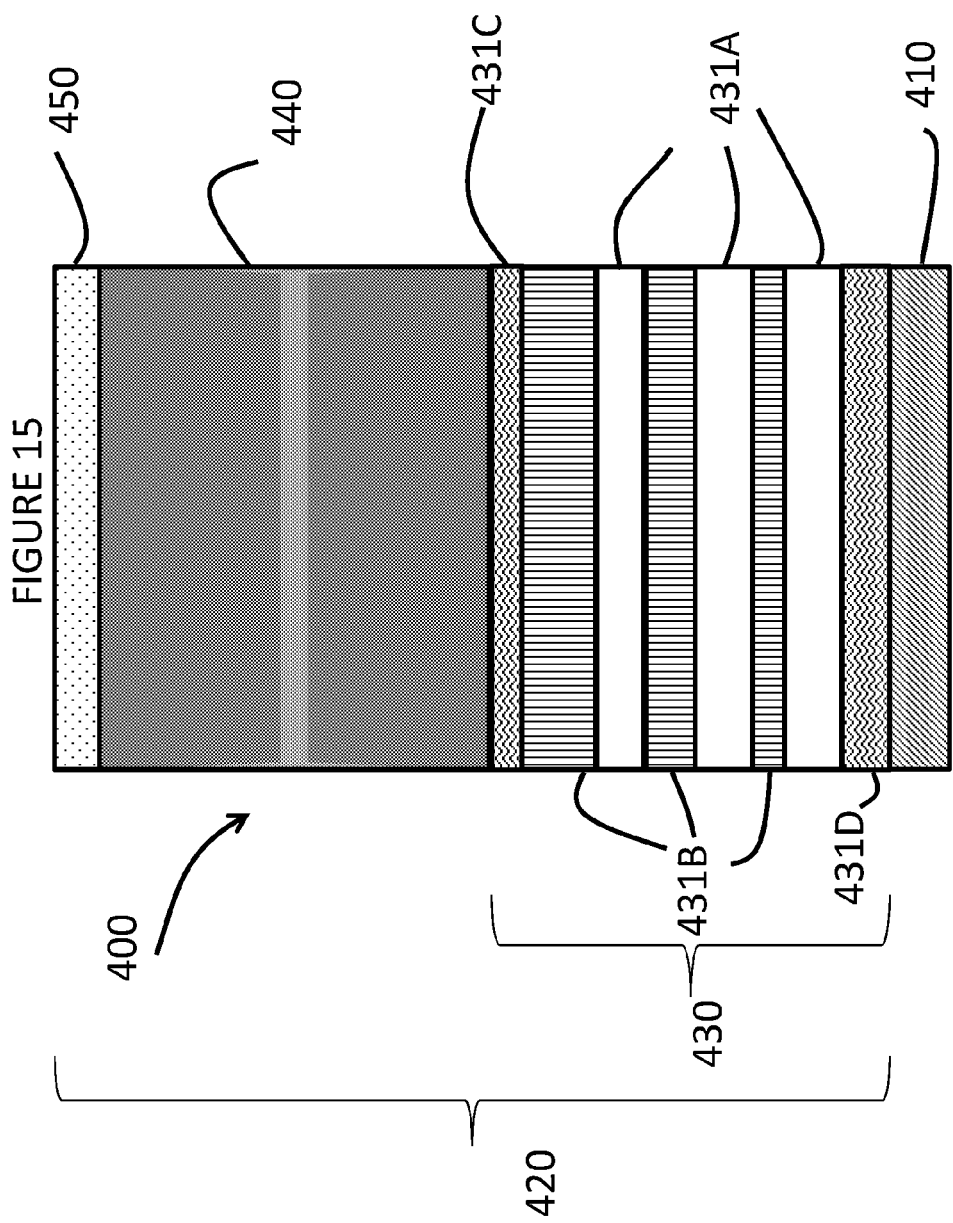
FIG. 15 is a schematic representation of the article according to modeled Example 4.

Modeled Example 4 included an article 400 with a chemically strengthened alkali aluminoborosilicate substrate 410 and an optical film 420 disposed on the substrate. The optical film 420 included an optical interference layer 430, a scratch resistant layer 440 disposed on the optical interference layer, and a capping layer 450 disposed on the scratch-resistant layer. The optical interference layer included three sets of sub-layers 431A, 431B, a third sub-layer 431C disposed between the plurality of sub-layers and the scratch-resistant layer, and a third sub-layer 431D disposed between the plurality of sub-layers and the substrate, as shown in FIG. 15. The optical film materials and thicknesses of each layer, in the order arranged in the optical film, are provided in Table 11.

TABLE 11

Optical film attributes for modeled Example 4.

| Layer | | Material | Modeled Thickness |
|---|---|---|---|
| Ambient medium | | Air | Immersed |
| Capping layer | | RS-SiO$_2$ | 9.5 nm |
| Scratch-resistant layer | | Si$_u$Al$_v$O$_x$N$_y$ | 2000 nm |
| Optical interference layer | Third sub-layer | RS-Al$_2$O$_3$ | 10.20 nm |
| | 2$^{nd}$ high RI sub-layer | Si$_u$Al$_v$O$_x$N$_y$ | 49.01 nm |
| | 1$^{st}$ low RI sub-layer | RS-SiO$_2$ | 23.30 nm |
| | 2$^{nd}$ high RI sub-layer | Si$_u$Al$_v$O$_x$N$_y$ | 35.04 nm |
| | 1$^{st}$ low RI sub-layer | RS-SiO$_2$ | 44.95 nm |
| | 2$^{nd}$ high RI sub-layer | Si$_u$Al$_v$O$_x$N$_y$ | 19.02 nm |
| | 1$^{st}$ low RI sub-layer | RS-SiO$_2$ | 50.45 nm |
| | Third sub-layer | RS-Al$_2$O$_3$ | 17.16 nm |
| Substrate | | ABS Glass | Immersed |

Figure 16:
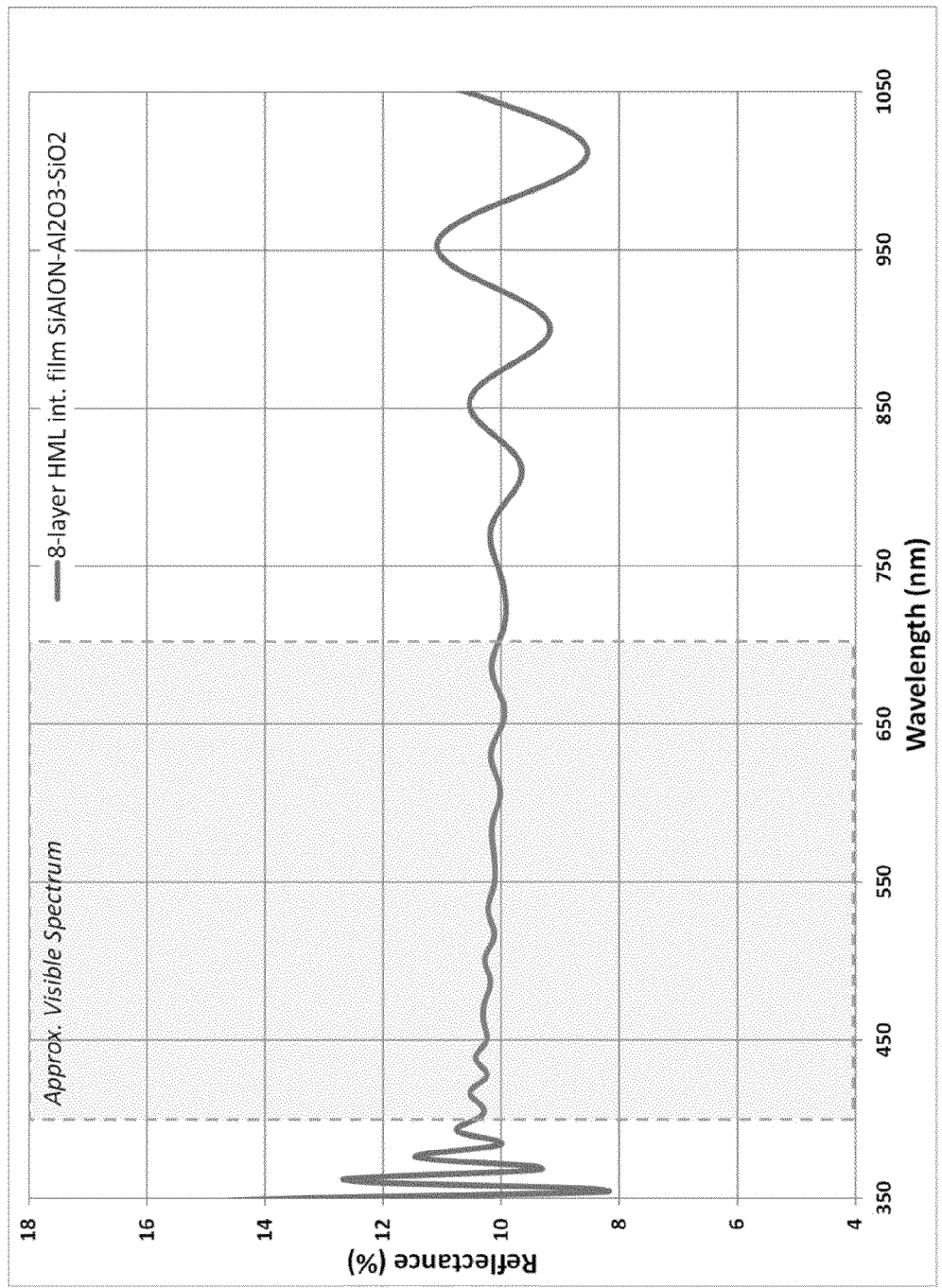
FIG. 16 is a calculated reflectance spectra for the article according to modeled Example 4.
Figure 17:
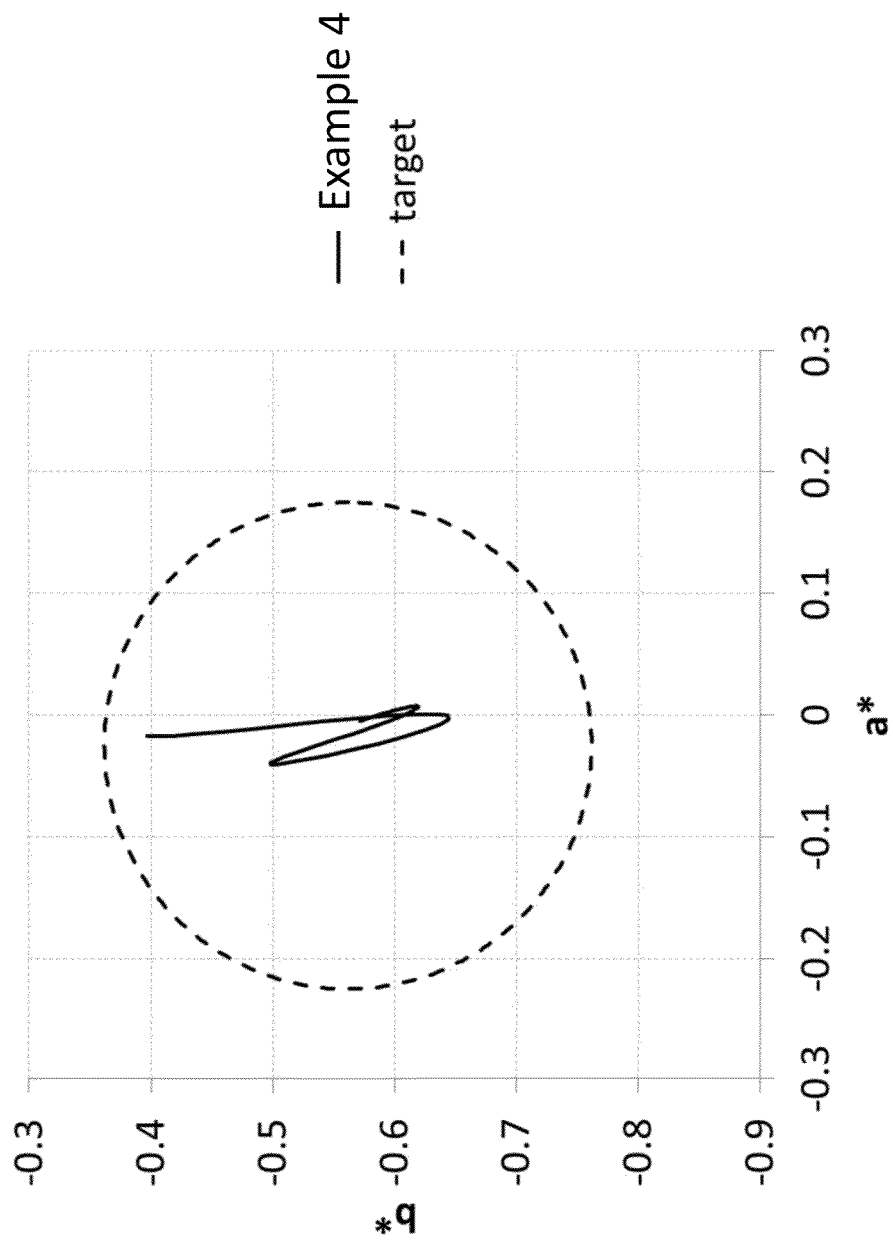
FIG. 17 is a graph showing the range of calculated a* and b* color shifts for modeled Example 4.

The calculated reflectance spectrum for the modeled Example 4 is shown in FIG. 16. As shown in FIG. 16, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 17. FIG. 17 shows a target having a radius of 0.2, centered on the color coordinates of the substrate without the optical film disposed thereon, under F2 illumination.

Example 5

Figure 18:
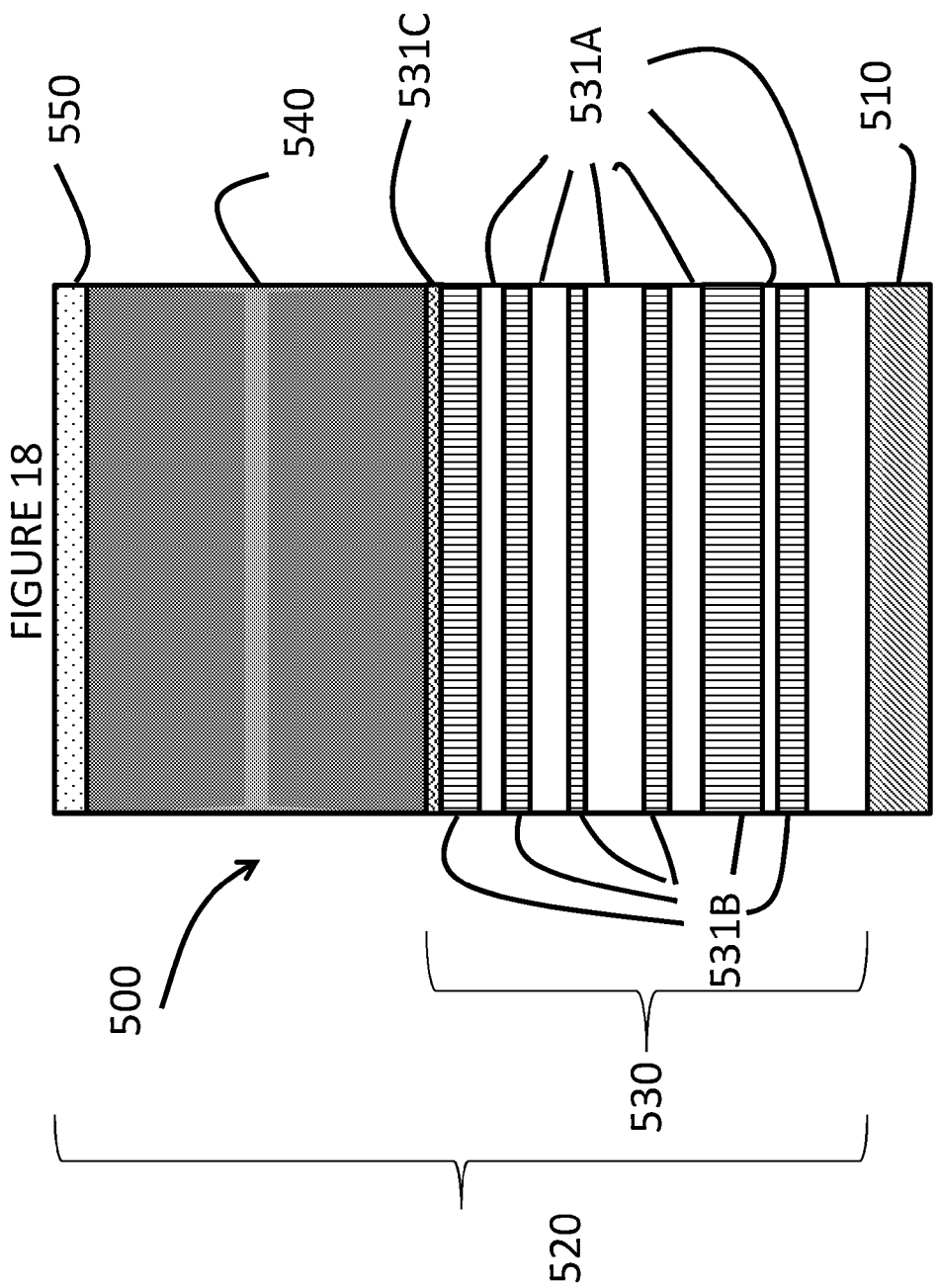
FIG. 18 is a schematic representation of the article according to modeled Example 5.

Modeled Example 5 included an article 500 with a chemically strengthened alkali aluminoborosilicate substrate 510 and an optical film 520 disposed on the substrate. The optical film 520 included an optical interference layer 530, a scratch resistant layer 540 disposed on the optical interference layer, and a capping layer 550 disposed on the scratch-resistant layer 550. The optical interference layer included six sets of sub-layers 531A, 531B and a third sub-layer 531C disposed between the plurality of sub-layers and the scratch-resistant layer, as shown in FIG. 18. The optical film materials and thicknesses of each layer, in the order arranged in the optical film, are provided in Table 12.

TABLE 12

Optical film attributes for modeled Example 5.

| Layer | | Material | Modeled Thickness |
|---|---|---|---|
| Ambient medium | | Air | Immersed |
| Capping layer | | RS-SiO$_2$ | 14 nm |
| Scratch-resistant layer | | Si$_u$Al$_v$O$_x$N$_y$ | 2000 nm |
| Optical interference layer | Third sub-layer | RS-Al$_2$O$_3$ | 7.05 nm |
| | 2$^{nd}$ high RI sub-layer | Si$_u$Al$_v$O$_x$N$_y$ | 54.65 nm |
| | 1$^{st}$ low RI sub-layer | RS-Al$_2$O$_3$ | 24.59 nm |
| | 2$^{nd}$ high RI sub-layer | Si$_u$Al$_v$O$_x$N$_y$ | 37.96 nm |
| | 1$^{st}$ low RI sub-layer | RS-Al$_2$O$_3$ | 52.53 nm |
| | 2$^{nd}$ high RI sub-layer | Si$_u$Al$_v$O$_x$N$_y$ | 17.48 nm |
| | 1$^{st}$ low RI sub-layer | RS-Al$_2$O$_3$ | 90.07 nm |
| | 2$^{nd}$ high RI sub-layer | Si$_u$Al$_v$O$_x$N$_y$ | 20.63 nm |
| | 1$^{st}$ low RI sub-layer | RS-Al$_2$O$_3$ | 38.15 nm |
| | 2$^{nd}$ high RI sub-layer | Si$_u$Al$_v$O$_x$N$_y$ | 84.11 nm |
| | 1$^{st}$ low RI sub-layer | RS-Al$_2$O$_3$ | 6.87 nm |
| | 2$^{nd}$ high RI sub-layer | Si$_u$Al$_v$O$_x$N$_y$ | 48.85 nm |
| | 1$^{st}$ low RI sub-layer | RS-Al$_2$O$_3$ | 81.63 nm |
| Substrate | | ABS Glass | Immersed |

Figure 19:
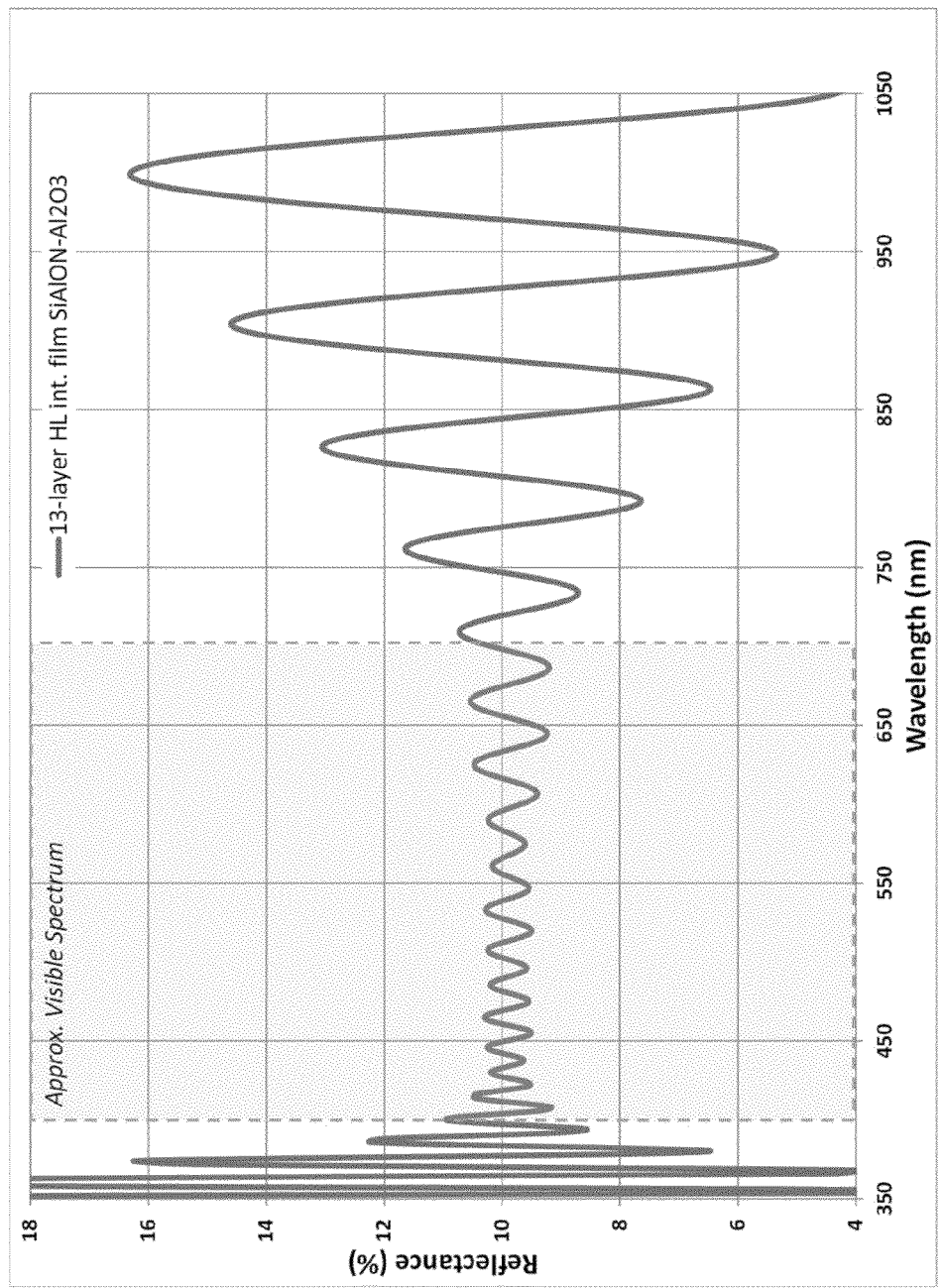
FIG. 19 is a calculated reflectance spectra for the article according to modeled Example 5.

The calculated reflectance spectrum for the modeled Example 5 is shown in FIG. 19. As shown in FIG. 19, the oscillations in the reflectance spectrum are small (i.e., less than about 1 percentage point over the optical wavelength regime), which would lead to a relatively low visible color shift when viewed at an incidence viewing angle in the range from about 0 degrees to about 60 degrees to normal incidence, under an illuminant.

Example 6

Figure 20:
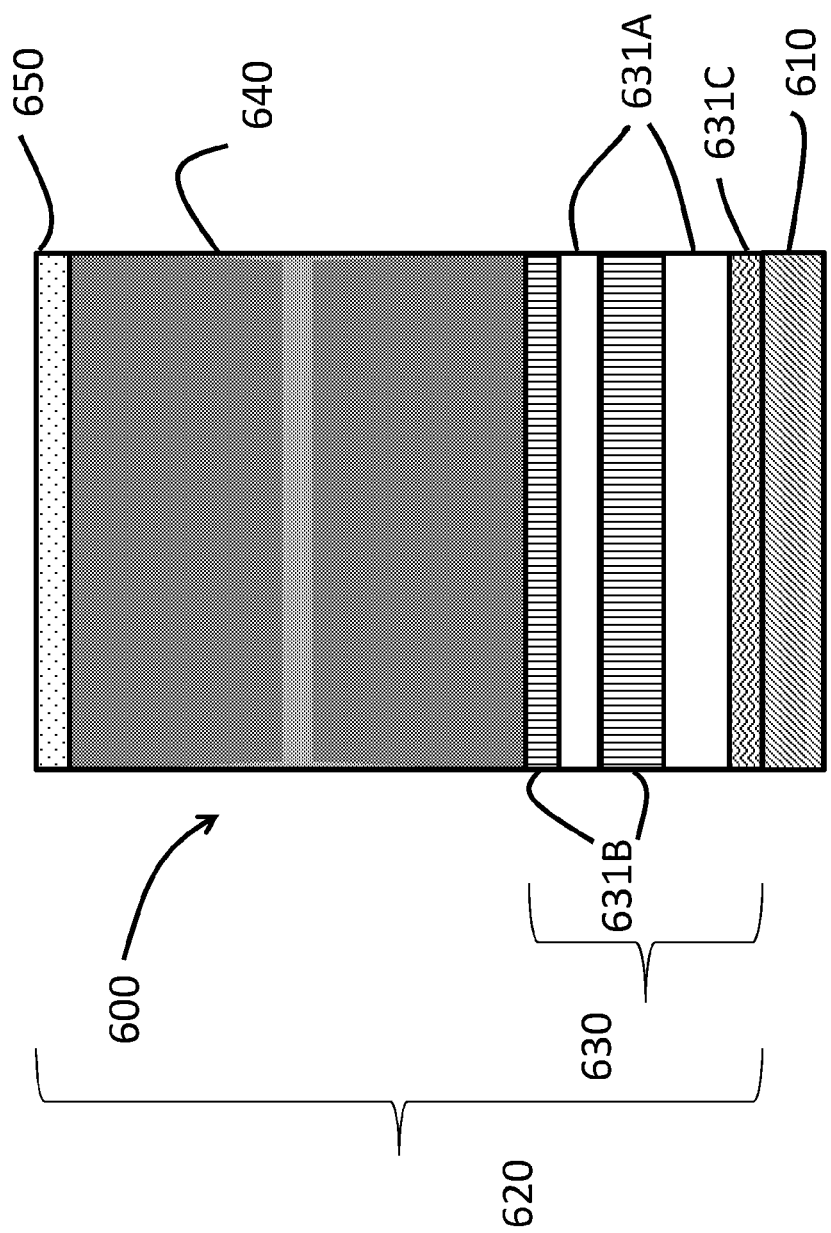
FIG. 20 is a schematic representation of the article according to modeled Example 6.

Modeled Example 6 included an article 600 with a chemically strengthened alkali aluminoborosilicate substrate 610 and an optical film 620 disposed on the substrate. The optical film 620 included an optical interference layer 630, a scratch resistant layer 640 disposed on the optical interference layer, and a capping layer 650 disposed on the scratch-resistant layer 650. The optical interference layer included two sets of sub-layers 631A, 631B and a third sub-layer 631C disposed between the plurality of sub-layers and the substrate, as shown in FIG. 20. The optical film materials and thicknesses of each layer, in the order arranged in the optical film, are provided in Table 13.

TABLE 13

Optical film attributes for modeled Example 6.

| Layer | | Material | Modeled Thickness |
|---|---|---|---|
| Ambient medium | | Air | Immersed |
| Capping layer | | RS-SiO$_2$ | 10 nm |
| Scratch-resistant layer | | i$_u$Al$_v$O$_x$N$_y$ | 2000 nm |
| Optical interference layer | 2$^{nd}$ high RI sub-layer | E-Ta$_2$O$_5$ | 15.27 nm |
| | 1$^{st}$ low RI sub-layer | E-SiO$_2$ | 19.35 nm |
| | 2$^{nd}$ high RI sub-layer | E-Ta$_2$O$_5$ | 32.53 nm |
| | 1$^{st}$ low RI sub-layer | E-SiO$_2$ | 43.18 nm |
| | Third sub-layer | E-Ta$_2$O$_5$ | 12.64 nm |
| Substrate | | ABS Glass | Immersed |

Figure 21:
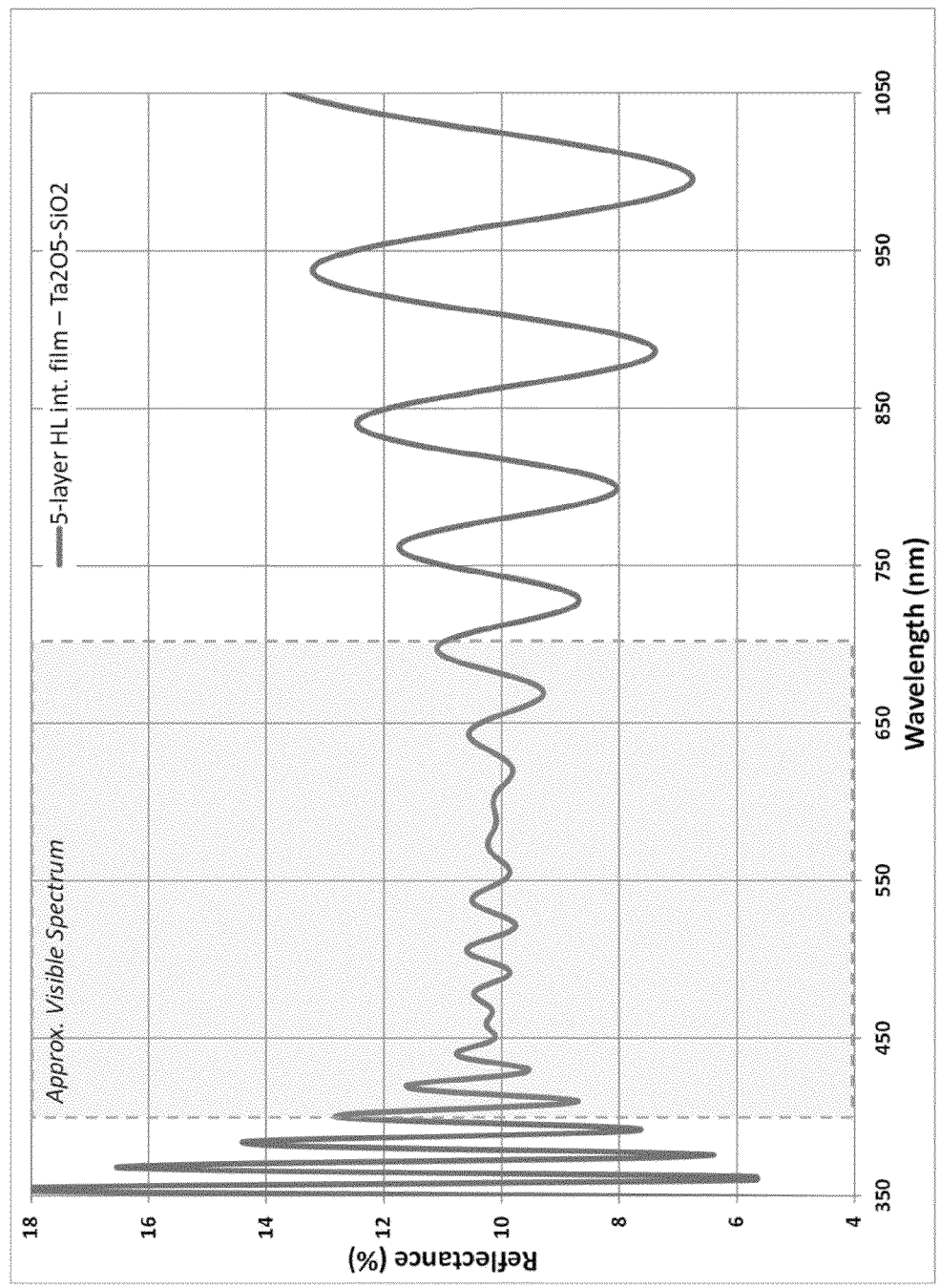
FIG. 21 is a calculated reflectance spectra for the article according to modeled Example 6.
Figure 26:
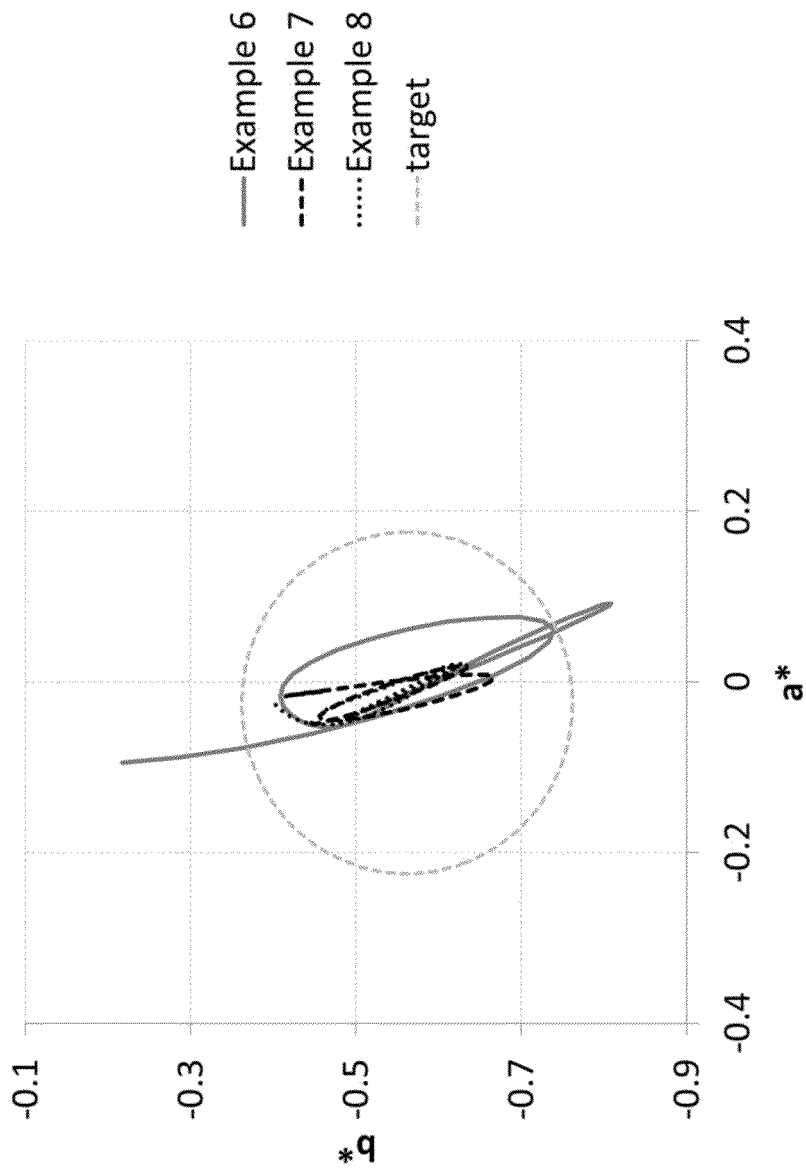
FIG. 26 is a graph showing the range of calculated a* and b* color shifts for modeled Examples 6-8.

The calculated reflectance spectrum for the modeled Example 6 is shown in FIG. 21. As shown in FIG. 21, the oscillations in the reflectance spectrum are small (i.e., less than about 1 percentage point over the optical wavelength regime), leading to relatively low calculated visible color shift for a 10 degree observer, over a range of incidence viewing angles from 60 degrees to normal incidence, under an F2 illuminant, as shown in FIG. 26. FIG. 26 shows a target having a radius of 0.2, centered on the color coordinates of the substrate without the optical film disposed thereon, under F2 illumination.

Example 7

Figure 22:
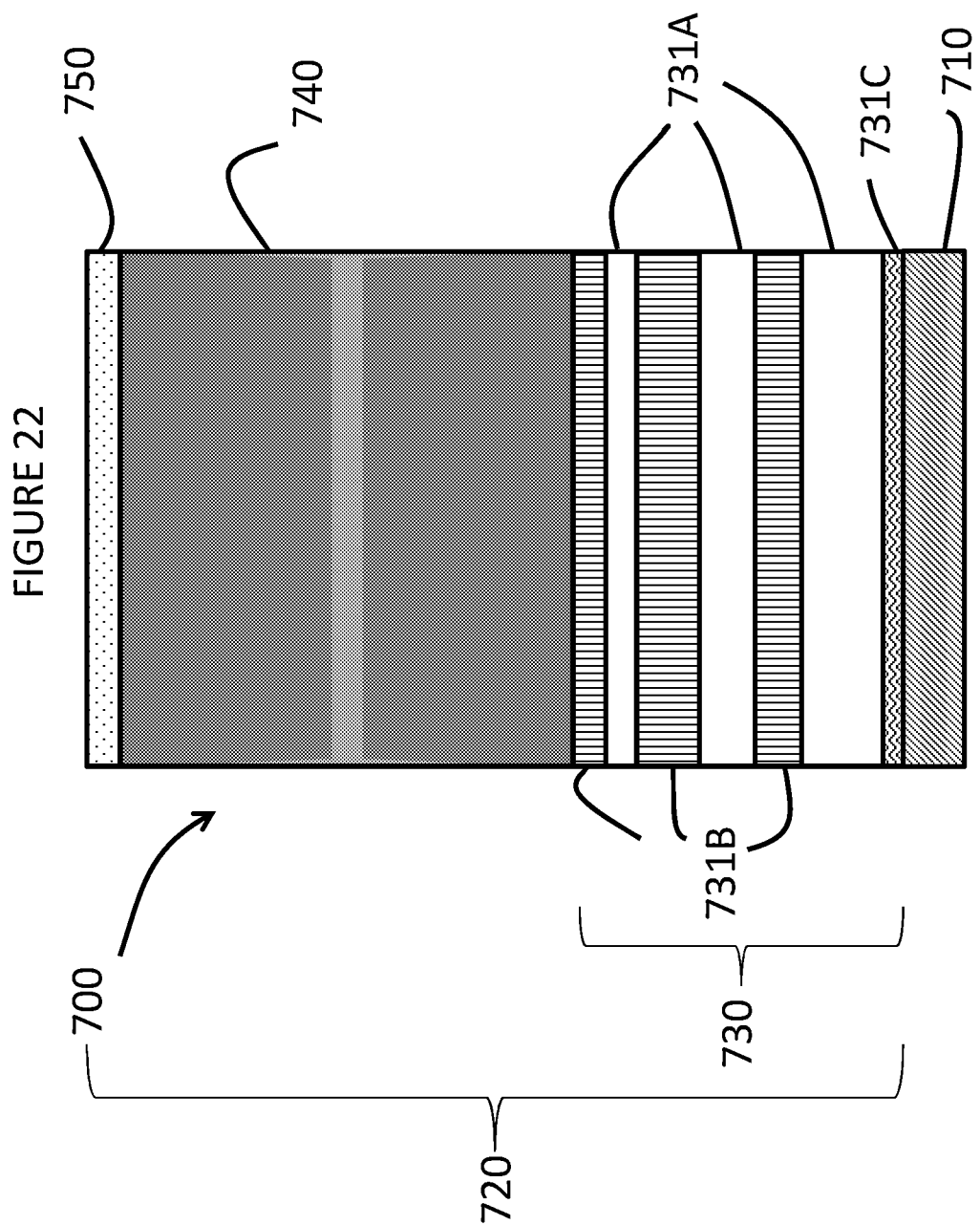
FIG. 22 is a schematic representation of the article according to modeled Example 7.

Modeled Example 7 included an article 700 with a chemically strengthened alkali aluminoborosilicate substrate 710 and an optical film 720 disposed on the substrate. The optical film 720 included an optical interference layer 730, a scratch resistant layer 740 disposed on the optical interference layer, and a capping layer 750 disposed on the scratch-resistant layer 750. The optical interference layer included three sets of sub-layers 731A, 731B, and a third sub-layer 731C between the plurality of sub-layers and the substrate, as shown in FIG. 22. The optical film materials and thicknesses of each layer, in the order arranged in the optical film, are provided in Table 14.

TABLE 14

Optical film attributes for modeled Example 7.

| Layer | | Material | Modeled Thickness |
|---|---|---|---|
| Ambient medium | | Air | Immersed |
| Capping layer | | RS-SiO$_2$ | 10 nm |
| Scratch-resistant layer | | Si$_u$Al$_v$O$_x$N$_y$ | 2000 nm |
| Optical interference layer | 2$^{nd}$ high RI sub-layer | E-Ta$_2$O$_5$ | 18.67 nm |
| | 1$^{st}$ low RI sub-layer | E-SiO$_2$ | 13.7 nm |
| | 2$^{nd}$ high RI sub-layer | E-Ta$_2$O$_5$ | 39.23 nm |
| | 1$^{st}$ low RI sub-layer | E-SiO$_2$ | 32.77 nm |
| | 2$^{nd}$ high RI sub-layer | E-Ta$_2$O$_5$ | 24.91 nm |
| | 1$^{st}$ low RI sub-layer | E-SiO$_2$ | 50.89 nm |
| | Third sub-layer | E-Ta$_2$O$_5$ | 8.39 nm |
| Substrate | | ABS Glass | Immersed |

The calculated reflectance spectrum for the modeled Example 7 is shown in FIG. 22. As shown in FIG. 22, the oscillations in the reflectance spectrum are small (i.e., less than about 0.5 percentage points over the optical wavelength regime and, in some cases, less than about 0.1 percentage points over the optical wavelength regime), leading to relatively low calculated visible color shift for a 10 degree observer, over a range of incidence viewing angles from 60 degrees to normal incidence, under an F2 illuminant, as shown in FIG. 26.

Example 8

Figure 23:
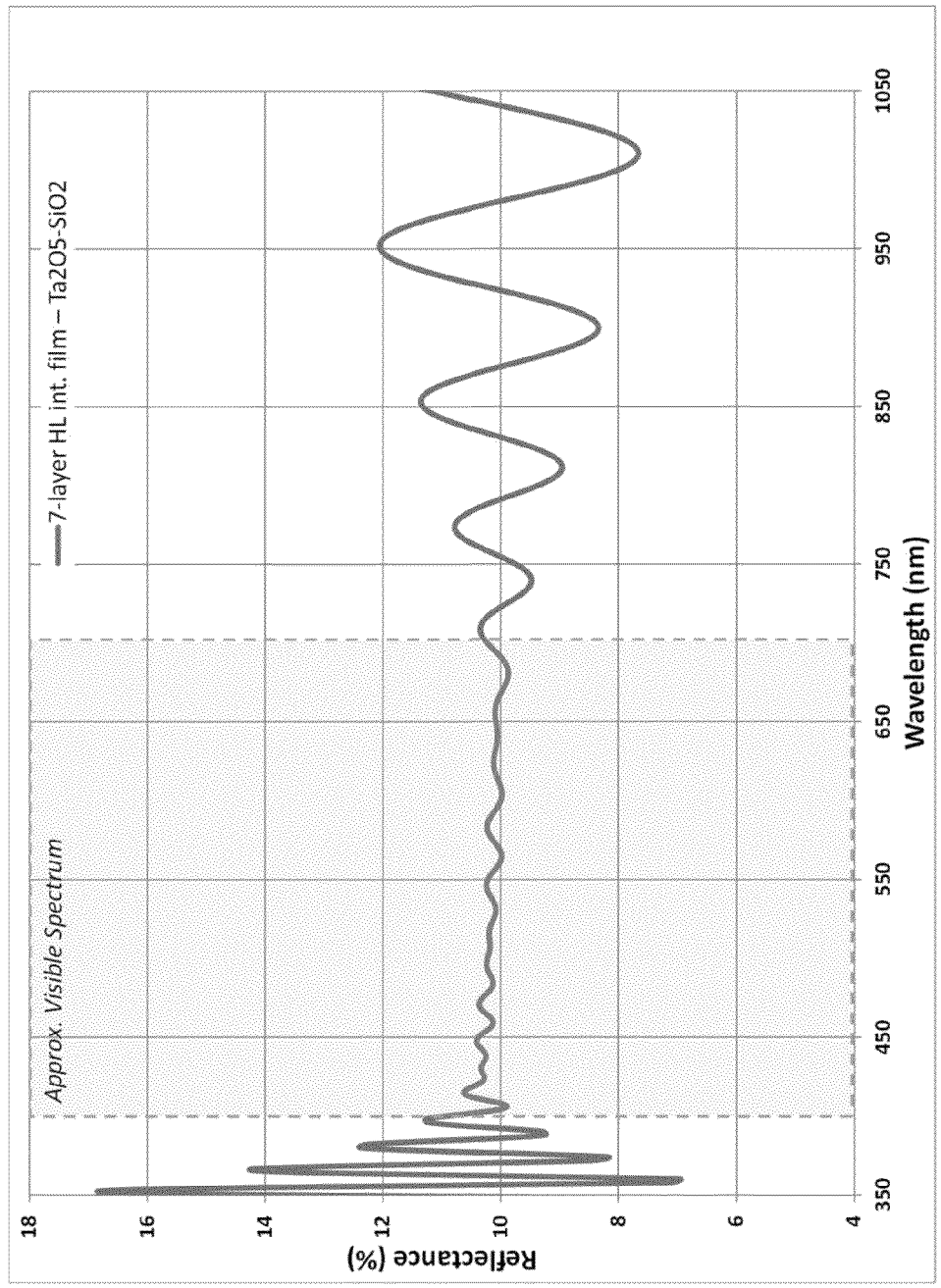
FIG. 23 is a calculated reflectance spectra for the article according to modeled Example 7.
Figure 24:
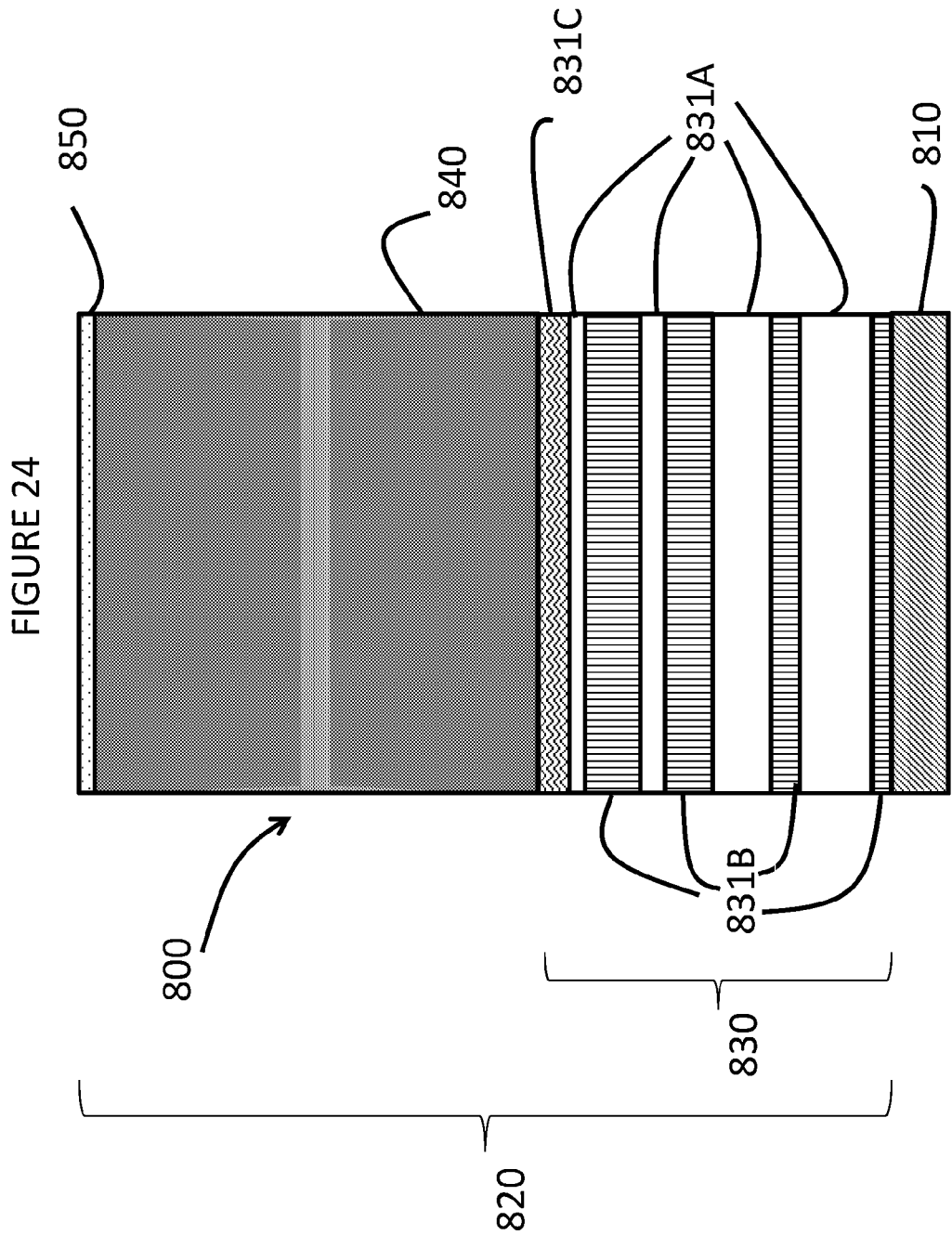
FIG. 24 is a schematic representation of the article according to modeled Example 8.

Modeled Example 8 included an article 800 with a chemically strengthened alkali aluminoborosilicate substrate 810 and an optical film 820 disposed on the substrate. The optical film 820 included an optical interference layer 830, a scratch resistant layer 840 disposed on the optical interference layer, and a capping layer 850 disposed on the scratch-resistant layer 840. The optical interference layer included four sets of sub-layers 831A, 831B, and a third sub-layer 831C disposed between the plurality of sub-layers and the scratch-resistant layer, as shown in FIG. 23. The optical film materials and thicknesses of each layer, in the order arranged in the optical film, are provided in Table 15.

TABLE 15

Optical film attributes for modeled Example 8.

| Layer | | Material | Modeled Thickness |
|---|---|---|---|
| Ambient medium | | Air | Immersed |
| Capping layer | | RS-SiO$_2$ | 10 nm |
| Scratch-resistant layer | | Si$_u$Al$_v$O$_x$N$_y$ | 2000 nm |
| Optical interference layer | Third sub-layer | E-Ta$_2$O$_5$ | 19.52 nm |
| | 1$^{st}$ low RI sub-layer | E-SiO$_2$ | 11.28 nm |
| | 2$^{nd}$ high RI sub-layer | E-Ta$_2$O$_5$ | 44.68 nm |
| | 1$^{st}$ low RI sub-layer | E-SiO$_2$ | 25.72 nm |
| | 2$^{nd}$ high RI sub-layer | E-Ta$_2$O$_5$ | 34.69 nm |
| | 1$^{st}$ low RI sub-layer | E-SiO$_2$ | 45.76 nm |
| | 2$^{nd}$ high RI sub-layer | E-Ta$_2$O$_5$ | 20.24 nm |
| | 1$^{st}$ low RI sub-layer | E-SiO$_2$ | 57.29 nm |
| | 2$^{nd}$ high sub-layer | E-Ta$_2$O$_5$ | 6.64 nm |
| Substrate | | ABS Glass | Immersed |

Figure 25:
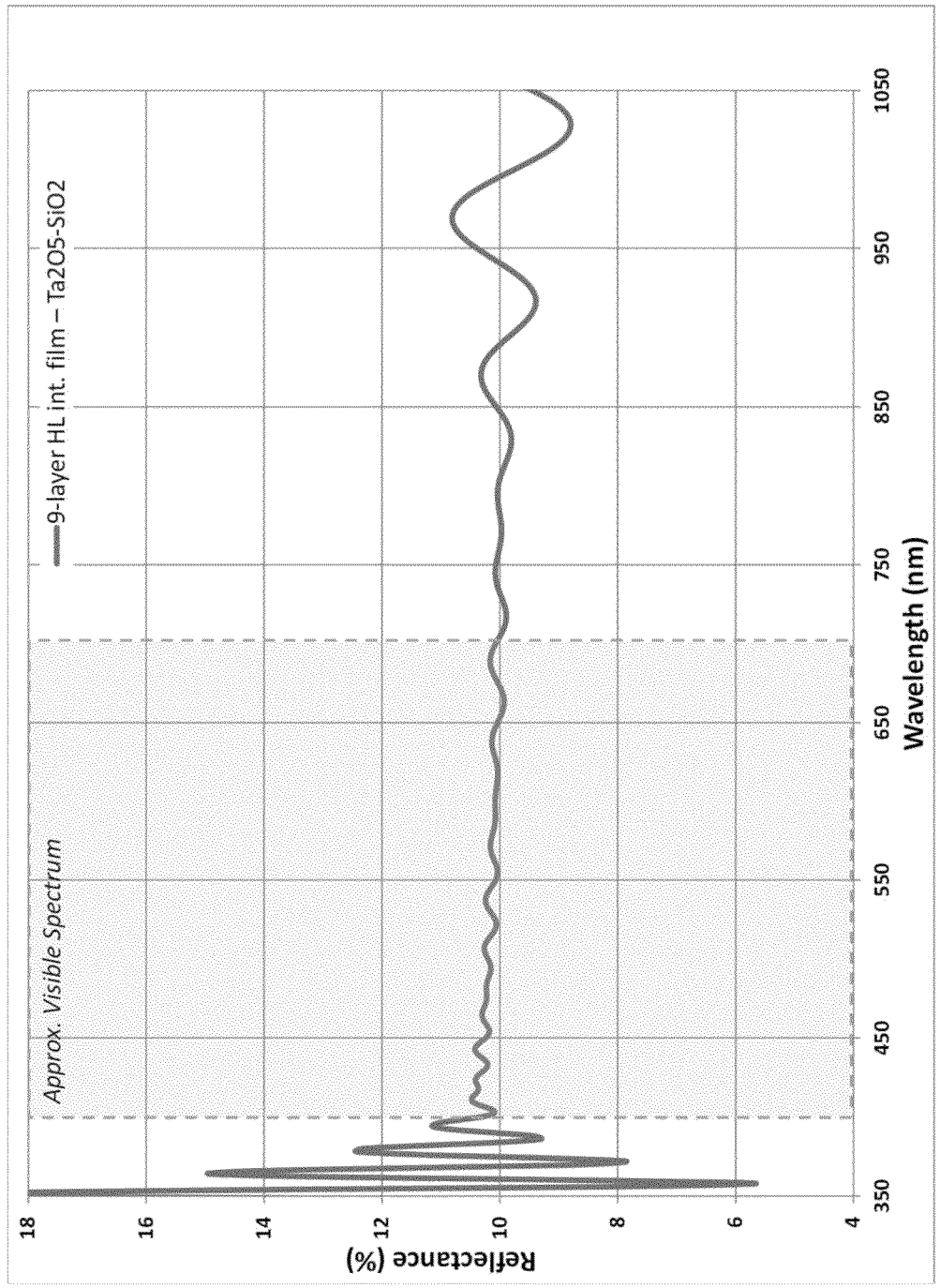
FIG. 25 is a calculated reflectance spectra for the article according to modeled Example 8.

The calculated reflectance spectrum for the modeled Example 8 is shown in FIG. 25. As shown in FIG. 25, the oscillations in the reflectance spectrum are small (i.e., less than about 0.25 percentage points over the optical wavelength regime and, in some cases, less than about 0.1 percentage points over the optical wavelength regime), leading to relatively low calculated visible color shift for a 10 degree observer, over a range of incidence viewing angles from 60 degrees to normal incidence, under an F2 illuminant, as shown in FIG. 26.

Example 9

Figure 27:
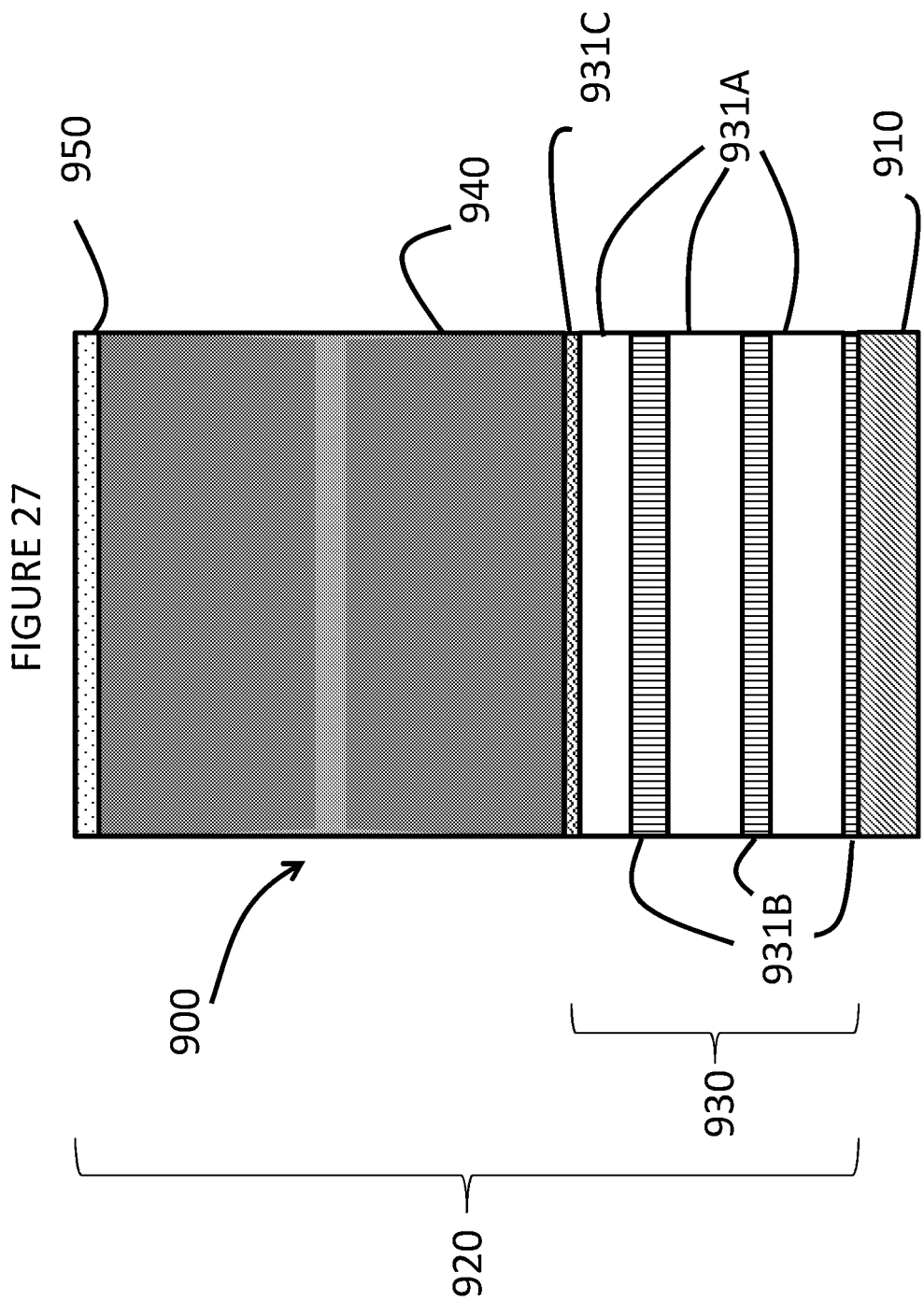
FIG. 27 is a schematic representation of the article according to modeled Example 9.

Modeled Example 9 included an article 900 with a chemically strengthened alkali aluminoborosilicate substrate 910 and an optical film 920 disposed on the substrate. The optical film 920 included an optical interference layer 930, a scratch resistant layer 940 disposed on the optical interference layer, and a capping layer 950 disposed on the scratch-resistant layer 950. The optical interference layer included three sets of sub-layers 931A, 931B, and a third sub-layer 931C between the plurality of sub-layers and the scratch-resistant layer, as shown in FIG. 27. The optical film materials and thicknesses of each layer, in the order arranged in the optical film, are provided in Table 16.

TABLE 16

Optical film attributes for modeled Example 9.

| Layer | | Material | Modeled Thickness |
|---|---|---|---|
| Ambient medium | | Air | Immersed |
| Capping layer | | RS-SiO$_2$ | 14 nm |
| Scratch-resistant layer | | Si$_u$Al$_v$O$_x$N$_y$ | 2000 nm |
| Optical interference layer | Third sub-layer | RS-Nb$_2$O$_5$ | 7.0 nm |
| | 1$^{st}$ low RI sub-layer | RS-SiO$_2$ | 23.02 nm |
| | 2$^{nd}$ high RI sub-layer | RS-Nb$_2$O$_5$ | 19.75 nm |
| | 1$^{st}$ low RI sub-layer | RS-SiO$_2$ | 41.60 nm |
| | 2$^{nd}$ high RI sub-layer | RS-Nb$_2$O$_5$ | 14.68 nm |
| | 1$^{st}$ low RI sub-layer | RS-SiO$_2$ | 57.14 nm |
| | 2$^{nd}$ high sub-layer | RS-Nb$_2$O$_5$ | 5.08 nm |
| Substrate | | ABS Glass | Immersed |

Figure 28:
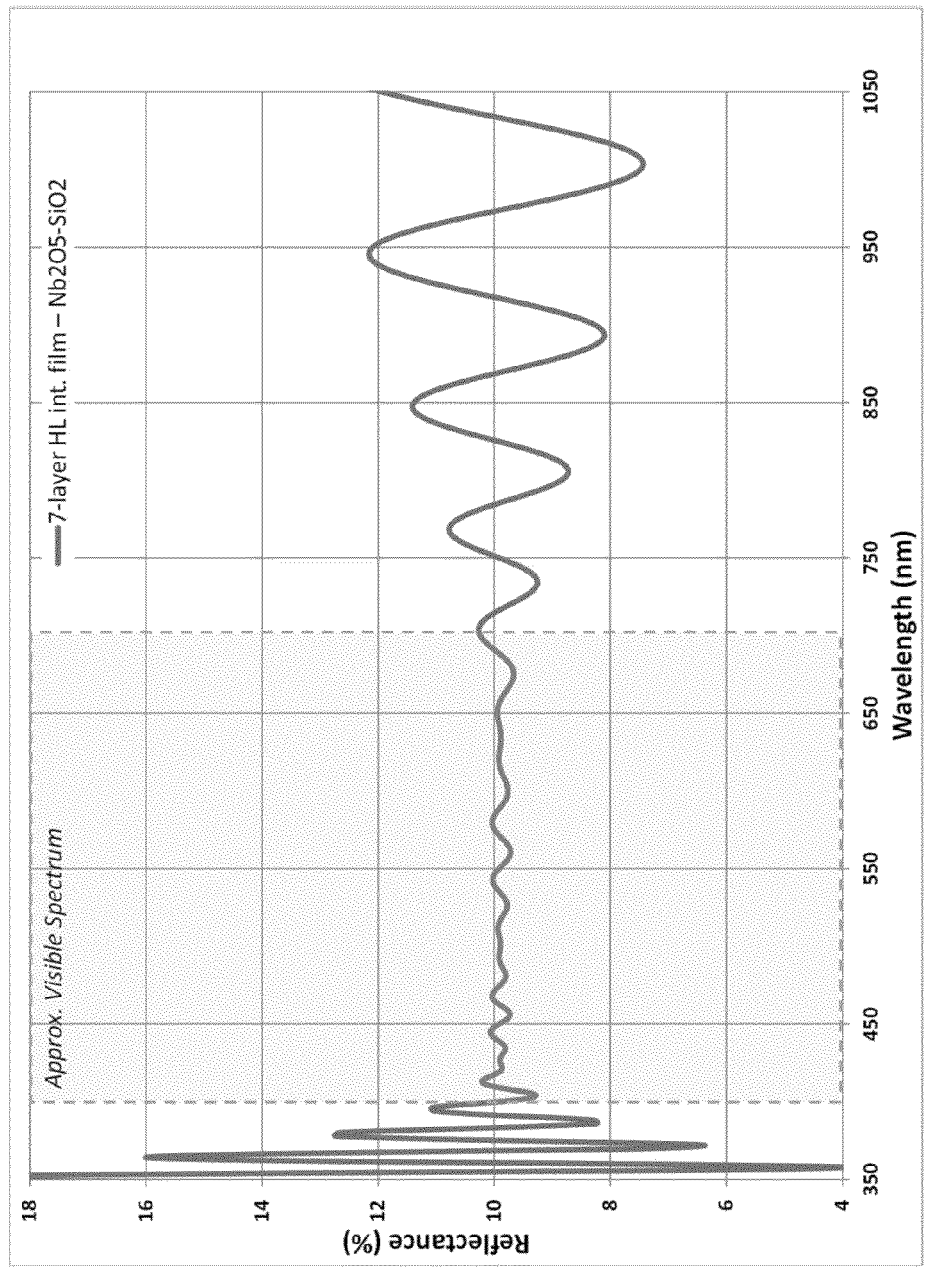
FIG. 28 is a calculated reflectance spectra for the article according to modeled Example 9.

The calculated reflectance spectrum for the modeled Example 9 is shown in FIG. 28. As shown in FIG. 28, the oscillations in the reflectance spectrum are small (i.e., less than about 1 percentage points over the optical wavelength regime and, in some cases, less than about 0.1 percentage points over the optical wavelength regime), which would lead to a relatively low visible color shift at an incidence viewing angle in the range from about 0 degrees to about 60 degrees to normal incidence, under an illuminant.

Examples 10-11 and Comparative Example 12

Example 10 was made and included a substrate, and an optical film disposed on the substrate. The substrate included a chemically strengthened ABS glass substrate having a compressive stress of about 900 MPa and a DOL of about 45 μm. As shown in Table 17, the optical film included an optical interference layer with six sub-layer sets. The six sub-layer sets included first low RI sub-layer of SiOxNy (having a refractive index value of about 1.49 at a wavelength of about 550 nm) and a second high RI sub-layer of AlO$_x$N$_y$ (having a refractive index value of about 2.0 at a wavelength of about 550 nm). The optical film also included an AlO$_x$N$_y$ scratch resistant layer. The optical interference layer of Example 10 was formed using reactive magnetron sputtering using an AJA-Industries sputter deposition tool using oxidizing and nitridizing environments. Sputter targets used included a 3" diameter silicon target and a 3" diameter aluminum target.

The first low RI layer was formed by supplying about 490 W RF to the silicon target. During formation of the first low RI layer, about 75 W RF and 50 W DC were supplied to the aluminum target; however, the aluminum shutter was closed to prevent deposition of aluminum. During deposition of the first low RI sub-layers, oxygen was flowed into the reactor at a flow rate of about 3.3 sccm, argon was flowed into the reactor at a flow rate of about 30 sccm and nitrogen gas was flowed into the reactor at a flow rate of about 30 sccm. The deposition times for the first low RI sub-layers were modified to provide the thicknesses shown in Tables 17 and 18.

The second high RI sub-layers were disposed using RF superimposed DC power directed at the aluminum target. About 300 W of DC power was supplied to the aluminum target and about 200 W of RF power was supplied to the Al target. During formation of the second high RI layer, RF power was supplied to the silicon target at about 50 W; however, the silicon shutter was closed to prevent deposition of silicon. During deposition of the second high RI sub-layers, oxygen was flowed into the reactor at a flow rate of 0.25 sccm, argon was flowed into the reactor at a flow rate of about 30 sccm and nitrogen gas was flowed into the rector at a rate of about 30 sccm. The deposition times for the second high RI sub-layers were modified to provide the thicknesses shown in Tables 17 and 18.

Table 17 also provides the refractive index values for the respective first low RI sub-layers, second high RI sub-layers and the scratch-resistant layer, at a wavelength of about 550 nm. The entire dispersion curves for these sub-layers are similar to analogous materials used in Modeled Examples 1-9 (whose refractive index dispersions were also measured experimentally). Dispersion curves used in Modeled Examples 1-9 can be shifted up or down slightly by a linear or scaled amount at each wavelength to arrive at the target refractive indices used in Examples 10 and 11 to very closely reproduce the actual dispersion curves of the materials in working Examples 10 and 11.

At each of the transitions between the first low RI sub-layers (SiOxNy) and the second high RI sub-layers (AlOxNy), both the silicon and aluminum shutters were closed for about 60 seconds, as the gas flows were transitioned to those required for the following sub-layer. During this transition, the powers and gas flows were adjusted The sputtering was maintained "on" but the sputtered material went onto the closed shutter. The power supplied to the silicon target was left at about 500 W in some cases to scavenge remnant oxygen, since the second high RI sub-layer utilized a low oxygen flow (as compared to the oxygen flow used to form the first low RI sub-layer). This process allowed the sputter targets to attain their desired powers, in the presence of the gases that were used for the various layers, prior to opening the shutters for a given sub-layer.

The scratch-resistant layer was formed using the same conditions as used to form the second high RI sub-layers. The resulting scratch-resistant layer combined with the optical interference layers as described exhibited a hardness of about 15 GPa, as measured using a Berkovitch indenter as described herein and a modulus of about 212 GPa as measured by known nanoindentation methods.

TABLE 17

Optical film target refractive indices and thicknesses for Example 10.

| Layer | Material | Target Refractive Index @550 nm | Target Thickness (nm) |
|---|---|---|---|
| Scratch-resistant layer | $AlO_xN_y$ | 2.00709 | 2000 |
| First low RI sub-layer | $SiO_xN_y$ | 1.49658 | 9.7 |
| Second high RI sub-layer | $AlO_xN_y$ | 2.00709 | 42.17 |
| First low RI sub-layer | $SiO_xN_y$ | 1.49658 | 30.27 |
| Second high RI sub-layer | $AlO_xN_y$ | 2.00709 | 24.68 |
| First low RI sub-layer | $SiO_xN_y$ | 1.49658 | 52.71 |
| Second high RI sub-layer | $AlO_xN_y$ | 2.00709 | 8.25 |
| Substrate | ABS glass | 1.51005 | |

TABLE 18

Sputtering process conditions used for Example 10.

| Layer | Material | Sputter Time (sec) | Si W RF | Si shutter | Al W RF | Al W DC | Al shutter | $O_2$ flow | Ar flow | $N_2$ flow |
|---|---|---|---|---|---|---|---|---|---|---|
| Scratch-resistant layer | $AlO_xN_y$ | 32756.6 | 50 | closed | 200 | 300 | open | 3.3 | 30 | 30 |
| First low RI sub-layer | $SiO_xN_y$ | 121.9 | 490 | open | 75 | 50 | closed | 0.25 | 30 | 30 |
| Second high RI sub-layer | $AlO_xN_y$ | 710.3 | 50 | closed | 200 | 300 | open | 3.3 | 30 | 30 |
| First low RI sub-layer | $SiO_xN_y$ | 448.3 | 490 | open | 75 | 50 | closed | 0.25 | 30 | 30 |
| Second high RI sub-layer | $AlO_xN_y$ | 440.6 | 50 | closed | 200 | 300 | open | 3.3 | 30 | 30 |
| First low RI sub-layer | $SiO_xN_y$ | 804.2 | 490 | open | 75 | 50 | closed | 0.25 | 30 | 30 |
| Second high RI sub-layer | $AlO_xN_y$ | 104.3 | 50 | closed | 200 | 300 | open | 3.3 | 30 | 30 |
| Substrate | ABS glass | | | | | | | | | |
| Total Time: | | 35523.0 | | | | | | | | |

Example 11 was formed using the same equipment and similar reactive sputtering processes as Example 10; however Example 11 included $Si_uAl_vO_xN_y$ in the second high RI sub-layers and as the scratch resistant layer, which had a refractive index at a wavelength of about 550 nm of about 1.998. The same substrate was used in Example 11 as was used in Example 10. The optical film design for Example 11 and sputtering process conditions used to form Example 11 are shown in Tables 19 and 20.

Example 11 was measured for hardness using a Berkovitch diamond indenter and an indentation depth of about 100 nm, as described herein, and the article of Exhibit 11 had a measured hardness of 21 GPa. Example 11 also exhibited an elastic modulus of 237 GPa.

TABLE 19

Optical film target refractive indices and thicknesses for Example 11.

| Layer | Material | Target Refractive Index @550 nm | Target Thickness (nm) |
|---|---|---|---|
| Scratch-resistant layer | $Si_uAl_vO_xN_y$ | 1.99823 | 2000 |
| First low RI sub-layer | $SiO_xN_y$ | 1.49594 | 11.8 |
| Second high RI sub-layer | $Si_uAl_vO_xN_y$ | 1.99823 | 45.4 |
| First low RI sub-layer | $SiO_xN_y$ | 1.49594 | 33.6 |
| Second high RI sub-layer | $Si_uAl_vO_xN_y$ | 1.99823 | 27.5 |
| First low RI sub-layer | $SiO_xN_y$ | 1.49594 | 56.5 |
| Second high RI sub-layer | $Si_uAl_vO_xN_y$ | 1.99823 | 10.1 |
| Substrate | ABS glass | 1.51005 | |

TABLE 20

Sputtering process conditions for Example 11.

| Layer | Material | Sputter Time (sec) | Si W RF | Si shutter | Al W RF | Al W DC | Al shutter | O2 flow | Ar flow | N2 flow |
|---|---|---|---|---|---|---|---|---|---|---|
| Scratch-resistant layer | $Si_uAl_vO_xN_y$ | 18340.0 | 500 | open | 200 | 300 | open | 3.3 | 30 | 30 |
| First low RI sub-layer | $SiO_xN_y$ | 135.0 | 500 | open | 50 | 50 | closed | 0.5 | 30 | 30 |
| Second high RI sub-layer | $Si_uAl_vO_xN_y$ | 440.0 | 500 | open | 200 | 300 | open | 3.3 | 30 | 30 |
| First low RI sub-layer | $SiO_xN_y$ | 385.0 | 500 | open | 50 | 50 | closed | 0.5 | 30 | 30 |
| Second high RI sub-layer | $Si_uAl_vO_xN_y$ | 275.0 | 500 | open | 200 | 300 | open | 3.3 | 30 | 30 |
| First low RI sub-layer | $SiO_xN_y$ | 640.0 | 500 | open | 50 | 50 | closed | 0.5 | 30 | 30 |
| Second high RI sub-layer | $Si_uAl_vO_xN_y$ | 195.0 | 500 | open | 200 | 300 | open | 3.3 | 30 | 30 |
| Substrate | ABS glass | | | | | | | | | |
| | Total time: | 20410.0 | | | | | | | | |

Comparative Example 12 was formed using the same substrate as Examples 10 and 11, but film disposed on the substrate was formed by reactive sputtering using a Shincron rotary drum coater. The film of Comparative Example 12 included a single optical interference layer disposed between a scratch-resistant layer and the glass substrate. Comparative Example 12 included the following structure: glass substrate/ 115 nm optical interference layer of $Al_2O_3$/2000 nm scratch-resistant layer of $AlO_xN_y$/32 nm capping layer of $SiO_2$.

Figure 29:
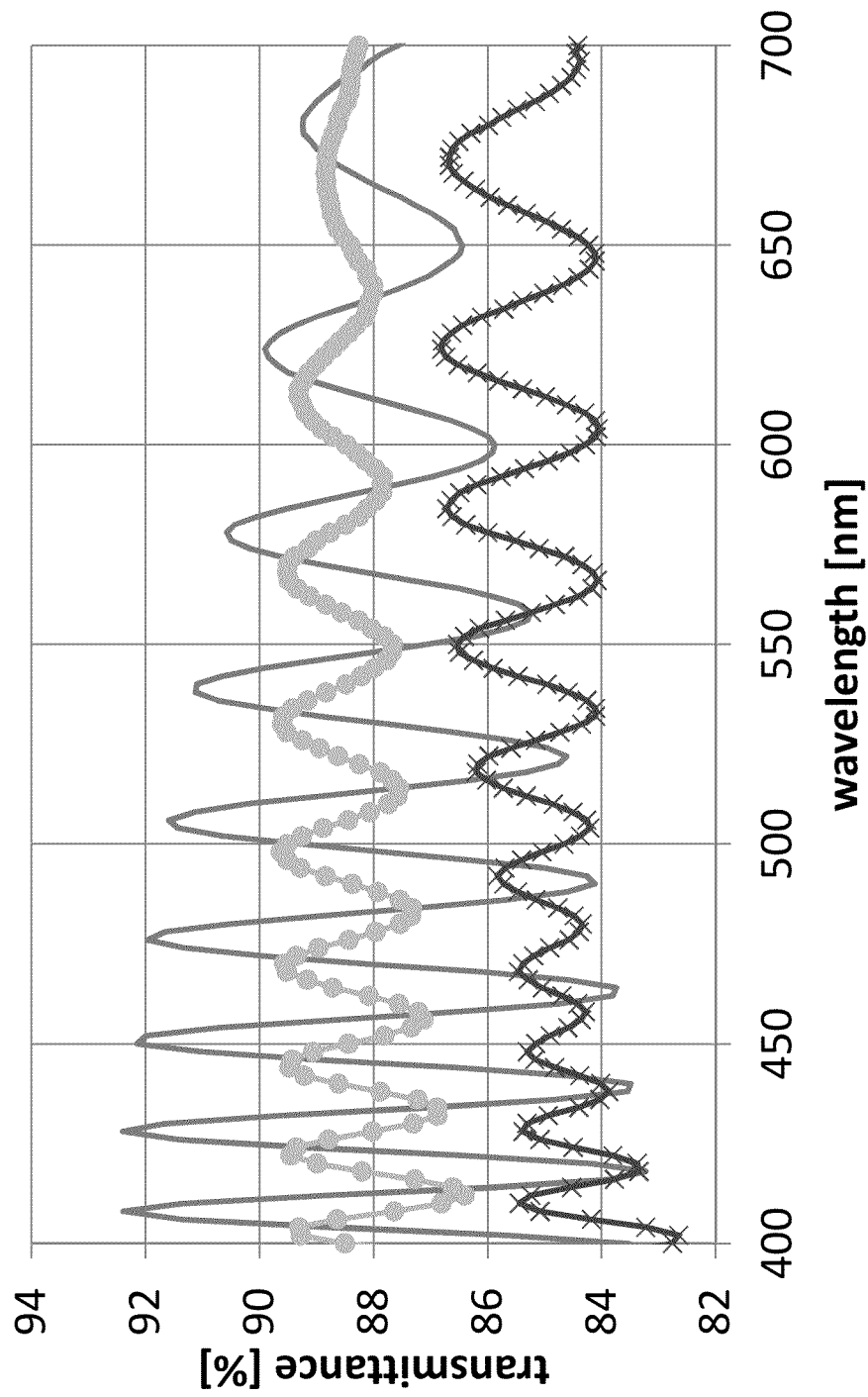
FIG. 29 shows the measured transmittance spectra for articles according to Examples 10-11 and Comparative Example 12.
Figure 30:
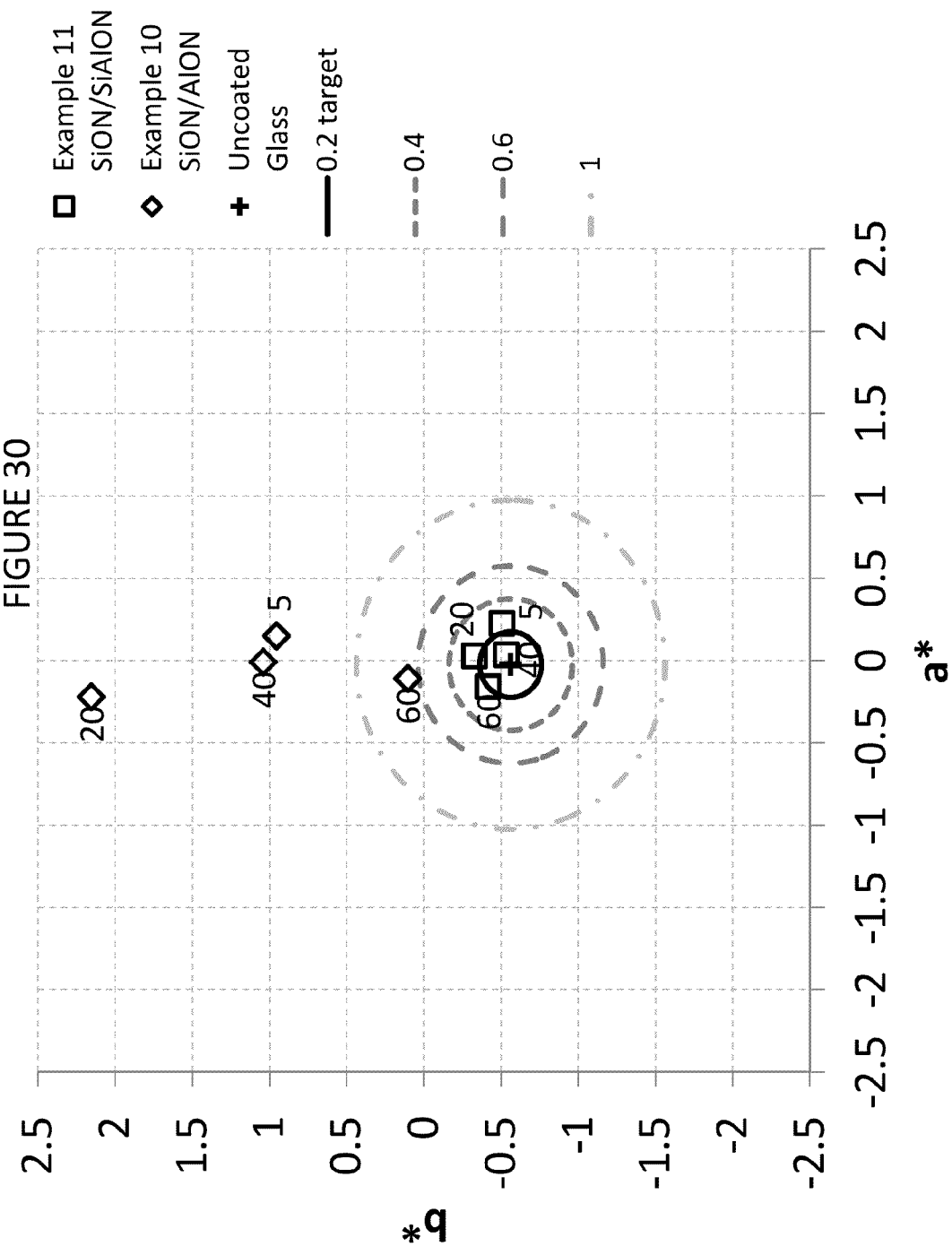
FIG. 30 shows the measured reflected color coordinates for Examples 10-11 and bare glass at different incident illumination angles.
Figure 31:
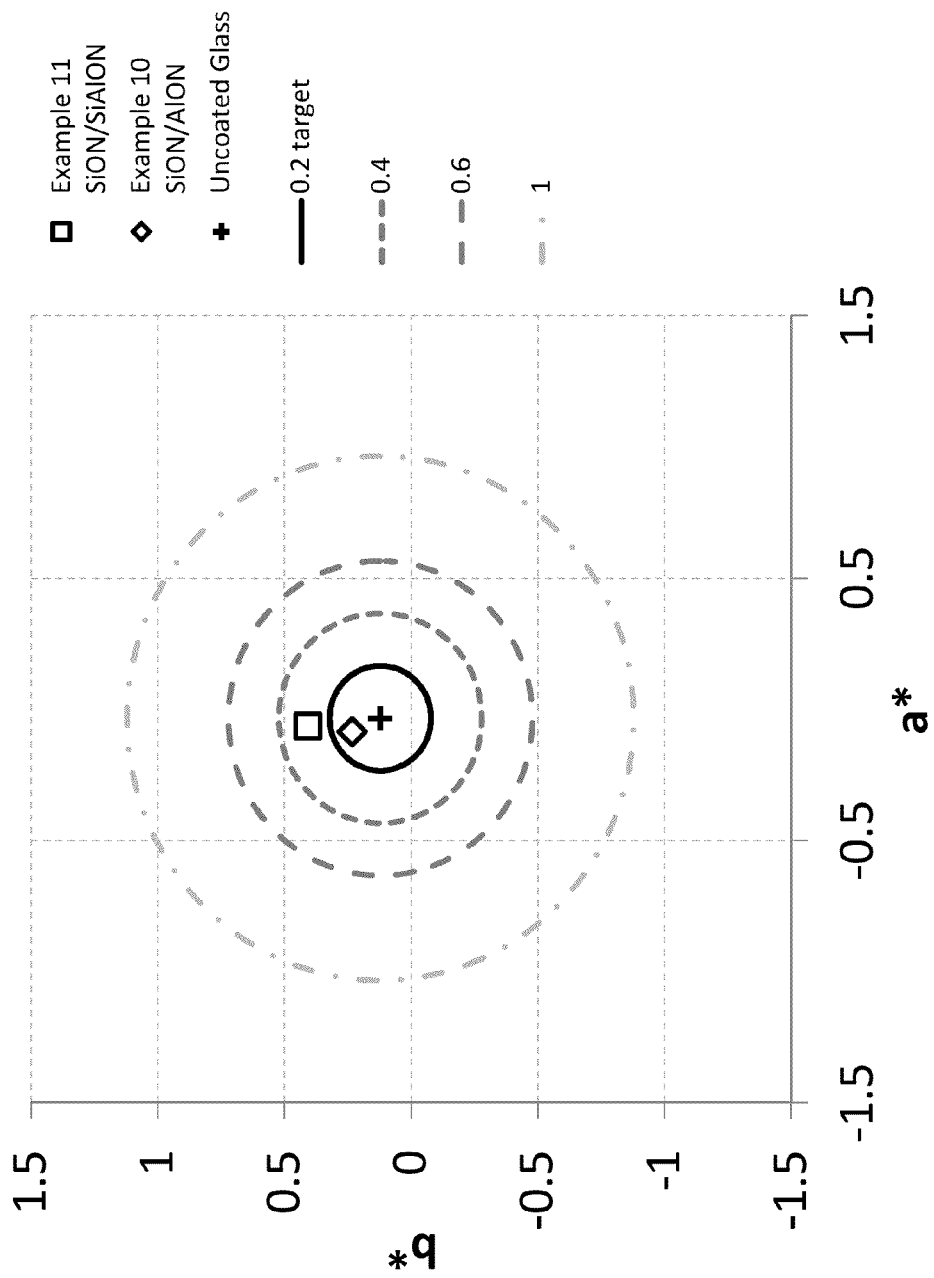
FIG. 31 shows the measured transmitted light color coordinates for Examples 10-11 at an incident illumination angle of 5 degrees.

The optical properties of Examples 10 and 11 and Comparative Example 12 are summarized in FIGS. 29-31. FIG. 29 shows the transmittance spectra for Examples 10-11 and Comparative Example 12. FIG. 30 shows the measured reflected light color coordinates for Examples 10-11 with F2 illumination at different incident illumination angles (e.g., 5, 20, 40, and 60 degrees). FIG. 31 shows the measured transmitted light color coordinates for Examples 10-11 with D65 illumination at an incident illumination angle of 5 degrees. Circular target lines are shown in FIGS. 30 and 31 as guides for the eye.

The oscillation amplitudes in transmittance for Example 10 was measured as less than about 3 percentage points for any 50 nm or 100 nm wavelength range segment, within the broader wavelength range from about 450 nm to about 650 nm, or from about 400 nm to about 700 nm. As shown in FIG. 30, the maximum variation in reflected color coordinates for Example 10 under F2 illumination with measurement incident illumination angle varying from 5 to 60 degrees was less than +/−1.5 in b* color coordinate and less than +/−0.5 in a* color coordinate. As shown in FIG. 31, the transmitted color coordinates for Example 10 under D65 illumination at 5 degree incident illumination angle varies from the uncoated glass color coordinates by less than +/−0.2 in b* color coordinate and less than +/−0.1 in a* color coordinate.

The oscillation amplitudes in transmittance for Example 11 was measured as less than about 3 percentage points for any 50 nm or 100 nm wavelength range segment, within the broader wavelength range from about 450 nm to about 650 nm, or from about 400 nm to about 700 nm. In some instances, the oscillation amplitude was even less than 2 percentage points from some 50 nm or 100 nm wavelength range segments. As shown in FIG. 30, the maximum variation in reflected color coordinates for Example 11 under F2 illumination with measurement incident illumination angle varying from 5 to 60 degrees is less than +/−0.4 in both a* and b* color coordinates. As shown in FIG. 31, the transmitted color coordinates for Example 11 under D65 illumination at 5 degrees varies from the uncoated glass color coordinates by less than +/−0.4 in b* color coordinate and less than +/−0.1 in a* color coordinate.

The oscillation amplitudes in transmittance for Comparative Example 12 were comparatively large, as shown in FIG. 29. From this data, it can be predicted that the color coordinates a* and b* would vary substantially under the same illuminants and the same incident illumination angles as used to evaluate Examples 10 and 11.

The absolute color coordinates for Examples 10 and 11 could be further tuned by adding a capping layer (e.g., a capping layer having a thickness in the range from about 5 nm to about 25 nm of SiO$_2$ or SiO$_x$N$_y$), as shown in the modeled Examples. The range of color variation and reflectance/transmittance oscillations seen in Examples 10 and 11 is in a low and useful range, although the color variation is somewhat larger than that seen in the modeled Examples. This difference between the modeled Examples 1-9 and Examples 10-11 is believed to be a function of layer thickness and index variations encountered during the reactive RF sputtering process. There are a variety of methods known in the art for forming the optical films of Examples 10-11 and described herein, which were not used in these experiments, which could further improve the control of the experimentally fabricated layer and sub-layer thicknesses and refractive indices. Exemplary methods include slower deposition rates for the thinnest layers in the optical film, optical or quartz crystal thickness monitoring of layer or sub-layer thickness during deposition, plasma emission or mass spectrometric monitoring of the gas composition in the chamber during deposition; and other known techniques used to control layer thickness and composition in thin film deposition.

The optical interference layers used in the Examples were designed to minimize reflection between the scratch-resistant layer and the substrate, thus reducing reflectance oscillation for the entire article. The reduced reflectance oscillation (or reflectance oscillations having reduced amplitudes), provided low observed color and low color shifts at different incidence viewing angles under multiple illumination sources, including illumination sources with sharp wavelength spikes such as CIE F2 and F10 illumination. The scratch-resistant layer exhibited a hardness of greater than about 15 GPa when measured using a Berkovitch indenter, as described herein, and in some cases even greater than 20 GPa.

Example 13

Figure 32:
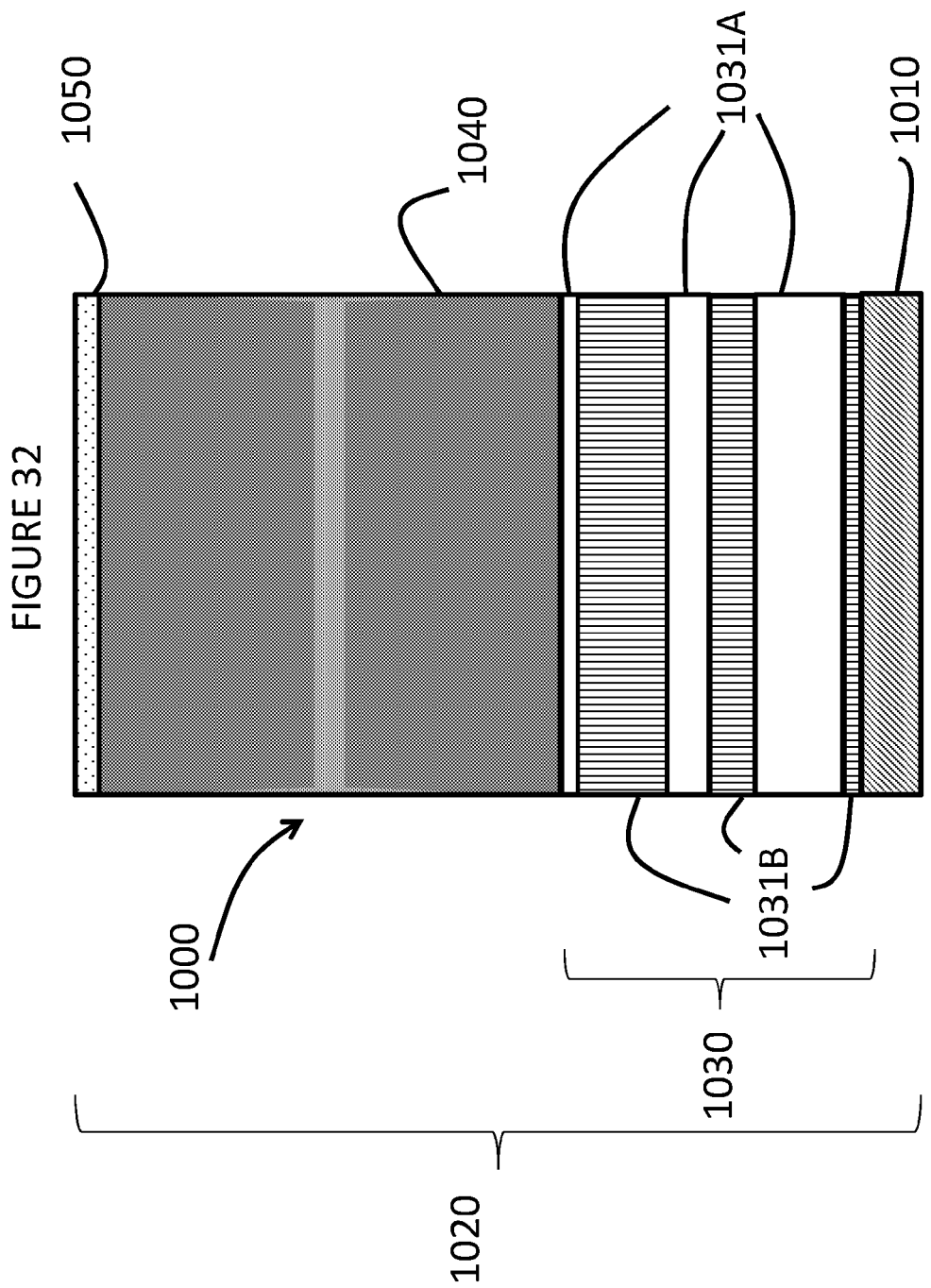
FIG. 32 is a schematic representation of the article according to modeled Example 13.

Modeled Example 13 included an article 1000 with a chemically strengthened glass substrate 1010 and an optical film 1020 disposed on the substrate. The optical film 1020 included an optical interference layer 1030, a scratch resistant layer 1040 disposed on the optical interference layer, and a capping layer 1050 disposed on the scratch-resistant layer 1040. The optical interference layer included three sets of sub-layers 1031A, 1031B, between the substrate and the scratch-resistant layer, as shown in FIG. 32. The optical film materials and thicknesses of each layer, in the order arranged in the optical film, are provided in Table 21.

TABLE 21

Optical film attributes for modeled Example 13.

| Layer | | Material | Modeled Thickness |
|---|---|---|---|
| Ambient medium | | Air | Immersed |
| Capping layer | | SiO$_2$ | 10 nm |
| Scratch-resistant layer | | lO$x$N$y$ | 2000 nm |
| Optical interference layer | 1$^{st}$ low RI sub-layer | SiO$_2$ | 10 nm |
| | 2$^{nd}$ high RI sub-layer | AlO$x$N$y$ | 50 nm |
| | 1$^{st}$ low RI sub-layer | SiO$_2$ | 25 nm |
| | 2$^{nd}$ high RI sub-layer | AlO$x$N$y$ | 25 nm |
| | 1$^{st}$ low RI sub-layer | SiO$_2$ | 50 nm |
| | 2$^{nd}$ high sub-layer | AlO$x$N$y$ | 10 nm |
| Substrate | | ABS Glass | Immersed |

Example 13 has symmetrical optical interference layer. In one or more embodiments, the optical interference layer may be modified to have different sub-layers and sub-layers with different thicknesses so long as the symmetry is preserved.

It will be apparent to those skilled in the art that various modifications and variations can be made without departing from the spirit or scope of the invention.

What is claimed is:

1. An article comprising:
   a substrate having a surface and comprising a glass, a glass-ceramic, or single-crystal sapphire; and
   an optical film disposed on the substrate surface forming a coated surface, the optical film comprising a scratch-resistant layer and an optical interference layer disposed between the scratch-resistant layer and the substrate;
   wherein the article comprises a hardness of about 14 GPa or greater, as measured by indenting the coated surface with a Berkovitch indenter to form an indent having an indentation depth of at least about 100 nm from the surface of the coated surface, and
   wherein the article comprises an average transmission of 85% or greater; and wherein the article comprises a color shift of about 2 or less, when viewed at an incident illumination angle in the range from about 2 degrees to about 60 degrees from normal incidence, under an International Commission on Illumination illuminant selected from the group consisting of A series illuminants, B series illuminants, C series illuminants, D series illuminants, and F series illuminants,
   wherein color shift is calculated using the equation $\sqrt{((a^*_2-a^*_1)^2+(b^*_2-b^*_1)^2)}$, with $a^*_1$, and $b^*_1$ representing the coordinates of the article when viewed at normal incidence and $a^*_2$, and $b^*_2$ representing the coordinates of the article when viewed at the incident illumination angle.

2. The article of claim 1, wherein the optical interference layer comprises a first low refractive index RI sub-layer and a second high RI sub-layer.

3. The article of claim 2, wherein the difference between the refractive index of the first low RI sub-layer and the refractive index of the second high RI sub-layer is about 0.01 or greater.

4. The article of claim 1, wherein the optical interference layer comprises a plurality of sub-layer sets, the plurality of sub-layer sets comprising a first low RI sub-layer and a second high RI sub-layer.

5. The article of claim 4, wherein the optical interference layer further comprises a third sub-layer disposed between at least one of:
   the plurality of sub-layer sets and the scratch-resistant layer; and
   the substrate and the plurality of sub-layer sets, and
   wherein the third sub-layer has a RI between the refractive index of the first low RI sub-layer and the refractive index of the second high RI sub-layer.

6. The article of claim 4, wherein the optical interference film comprises up to about 10 sub-layer sets.

7. The article of claim 4, wherein at least one of the first low RI sub-layer and the second high RI sub-layer comprises an optical thickness (n*d) in the range from about 2 nm to about 200 nm.

8. The article of claim 1, wherein the optical interference layer comprises a thickness of about 800 nm or less.

9. The article of claim 1, wherein the optical interference layer comprises an average light reflection of about 0.5% or less over the optical wavelength regime.

10. The article of claim 1, wherein the article comprises an average transmittance or average reflectance having an average oscillation amplitude of about 5 percentage points or less over the optical wavelength regime.

11. The article of claim 1, wherein the article comprises a hardness of about 16 GPa or greater as measured by indenting the coated surface with a Berkovitch indenter to form an indent having an indentation depth of at least about 100 nm from the surface of the coated surface.

12. The article of claim 1, wherein the article exhibits a surface hardness of about 14 GPa or greater, as measured on the coated surface by indenting the coated surface with a Berkovitch indenter to form an indent having an indentation depth of at least about 100 nm from the surface of the coated surface.

13. The article of claim 1, wherein the substrate is selected from the group consisting of soda lime glass, alkali aluminosilicate glass, alkali containing borosilicate glass and alkali aluminoborosilicate glass.

14. The article of claim 13, wherein the substrate is chemically strengthened and comprises a compressive stress (CS) layer with a surface CS of at least 250 MPa extending within the chemically strengthened glass from a surface of the chemically strengthened glass to a depth of layer (DOL) of at least about 10 μm.

15. An article comprising:
a substrate comprising a substrate surface and comprising a glass, a glass-ceramic, or single-crystal sapphire; and
an optical film disposed-on the substrate surface forming a coated surface,
wherein the optical film comprises a scratch-resistant layer and an optical interference layer disposed between the scratch-resistant layer and the substrate, the optical interference layer comprising at least one set of sub-layers, the set of sub-layers comprising a first low RI sub-layer and a second high RI sub-layer,
wherein the article comprises a hardness in the range from about 14 GPa to about 50 GPa as measured by indenting the coated surface with a Berkovitch indenter to form an indent having an indentation depth of at least about 100 nm from the surface of the coated surface,
wherein the article comprises an average transmission of 85% or greater; and wherein the article comprises a color shift of less than about 2, when viewed at an incident illumination angle in the range from about 2 degrees to about 60 degrees from normal incidence under an International Commission on Illumination illuminant and F series illuminants, and
wherein color shift is calculated using the equation $\sqrt{((a^*_2-a^*_1)^2+(b^*_2-b^*_1)^2)}$ with $a^*_1$, and $b^*_1$ representing the coordinates of the article when viewed at normal incidence and $a^*_2$, and $b^*_2$ representing the coordinates of the article when viewed at the incident illumination angle.

16. The article of claim 15, wherein the first low RI sub-layer comprises at least one of $SiO_2$, $Al_2O_3$, $GeO_2$, $SiO$, $AlO_xN_y$, $SiO_xN_y$, $Si_uAl_vO_xN_y$, $MgO$, $MgF_2$, $BaF_2$, $CaF_2$, $DyF_3$, $YbF_3$, $YF_3$, and $CeF_3$, and wherein the second high RI sub-layer comprises at least one of $Si_uAl_vO_xN_y$, $Ta_2O_5$, $Nb_2O_5$, $AlN$, $Si_3N_4$, $Alo_xN_y$, $SiO_xN_y$, $HfO_2$, $TiO_2$, $ZrO_2$, $Y_2O_3$, $Al_2O_3$, and $MoO_3$.

17. The article of claim 15, wherein the scratch-resistant layer comprises at least one of $AlN$, $Si_3N_4$, $AlO_xN_y$, $SiO_xN_y$, $Al_2O_3$, $SixCy$, $Si_xO_yC_z$, $ZrO_2$, $TiO_xN_y$, diamond, diamond-like carbon, and $Si_uAl_vO_xN_y$.

18. The article of claim 15, wherein the article further comprises a crack mitigating layer.

19. The article of claim 1, wherein the substrate comprises a curved substrate.

20. The article of claim 15, wherein the substrate comprises a curved substrate.

21. The article of claim 1, wherein the substrate comprises a Young's modulus in the range from about 30 GPa to about 120 GPa.

22. The article of claim 15, wherein the substrate comprises a Young's modulus in the range from about 30 GPa to about 120 GPa.

23. The article of claim 1, wherein the substrate comprises a refractive index in the range from about 1.45 to about 1.55.

24. The article of claim 15, wherein the substrate comprises a glass or a glass ceramic.

25. The article of claim 24, wherein the substrate comprises a refractive index in the range from about 1.45 to about 1.55.

26. The article of claim 1, wherein the incident illumination angle is in the range from about 5 degrees to about 30 degrees and the illuminant comprises an International Commission on Illumination F series illuminants.

27. The article of claim 15, wherein the incident illumination angle is in the range from about 30 degrees to about 60 degrees.

* * * * *